United States Patent
Zhu et al.

(10) Patent No.: US 11,689,496 B2
(45) Date of Patent: Jun. 27, 2023

(54) DOMAIN NAME SYSTEM QUERY METHOD AND COMMUNICATION APPARATUS

(71) Applicant: Huawei Technologies Co., Ltd., Shenzhen (CN)

(72) Inventors: Fangyuan Zhu, Beijing (CN); Yan Li, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/675,301

(22) Filed: Feb. 18, 2022

(65) Prior Publication Data

US 2022/0174032 A1 Jun. 2, 2022

Related U.S. Application Data

(63) Continuation of application No. PCT/CN2020/110009, filed on Aug. 19, 2020.

(30) Foreign Application Priority Data

Aug. 20, 2019 (CN) .......................... 201910770920.4
Sep. 27, 2019 (CN) .......................... 201910926424.3

(51) Int. Cl.
*H04L 61/4541* (2022.01)
*H04L 61/4511* (2022.01)
(Continued)

(52) U.S. Cl.
CPC ...... *H04L 61/4511* (2022.05); *H04L 61/5007* (2022.05); *H04L 67/141* (2013.01); *H04L 67/146* (2013.01)

(58) Field of Classification Search
USPC ....................................................... 709/245
See application file for complete search history.

(56) References Cited

U.S. PATENT DOCUMENTS

| 6,920,498 B1 | 7/2005 | Gourlay et al. |
| 2008/0159312 A1* | 7/2008 | Tuononen ............... H04W 8/26 370/401 |

(Continued)

FOREIGN PATENT DOCUMENTS

| CN | 103581299 A | 2/2014 |
| CN | 105100174 A | 11/2015 |

(Continued)

OTHER PUBLICATIONS

3GPP TS 29.303 V15.5.0, "3rd Generation Partnership Project; Technical Specification Group Core Network and Terminals; Domain Name System Procedures; Stage 3 (Release 15)," Mar. 2019, 78 pages.

(Continued)

*Primary Examiner* — Jude Jean Gilles
(74) *Attorney, Agent, or Firm* — Conley Rose, P.C.

(57) ABSTRACT

A domain name system query method in which: a first network element receives a DNS query request including a first domain name from a terminal apparatus; the first network element sends first request information which comprises location information of the terminal apparatus and the first domain name to a second network element; the second network element determines, based on the first request information, an IP address and feeds back the IP address to the first network element; and the first network element sends the IP address to the terminal apparatus. When a terminal apparatus performs domain name query, a core network element determines an IP address of an application server based on location information of the terminal apparatus and a queried domain name. In this way, the terminal apparatus obtains an IP address of an application server close to the terminal apparatus, thereby improving service access efficiency of the terminal apparatus.

27 Claims, 30 Drawing Sheets

(51) Int. Cl.
  *H04L 61/5007* (2022.01)
  *H04L 67/141* (2022.01)
  *H04L 67/146* (2022.01)

(56) References Cited

U.S. PATENT DOCUMENTS

| | | | | |
|---|---|---|---|---|
| 2010/0313024 | A1* | 12/2010 | Weniger | H04L 63/0823 |
| | | | | 380/278 |
| 2011/0182183 | A1* | 7/2011 | Perkins | H04L 61/4511 |
| | | | | 370/235 |
| 2016/0191416 | A1 | 6/2016 | Moon | |
| 2020/0162589 | A1* | 5/2020 | Vijayadharan | H04L 47/24 |
| 2020/0252367 | A1 | 8/2020 | Yang et al. | |

FOREIGN PATENT DOCUMENTS

| | | |
|---|---|---|
| CN | 105847353 A | 8/2016 |
| CN | 107113343 A | 8/2017 |
| CN | 107438115 A | 12/2017 |
| CN | 107786678 A | 3/2018 |
| CN | 109640319 A | 4/2019 |
| CN | 109729181 A | 5/2019 |
| CN | 109819066 A | 5/2019 |
| CN | 110086895 A | 8/2019 |
| JP | 2004304235 A | 10/2004 |
| WO | 2013164007 A1 | 11/2013 |
| WO | 2019144935 A1 | 8/2019 |

OTHER PUBLICATIONS

3GPP TS 23.501 V16.1.0, "3rd Generation Partnership Project; Technical Specification Group Services and System Aspects; System Architecture for the 5G System; Stage 2 (Release 16)," Jun. 2019, 367 pages.

Rosenberg, J., et al., "STUN—Simple Traversal of User Datagram Protocol (UDP) Through Network Address Translators (NATs).," RFC 3489, Mar. 2003, 47 pages.

C. Contavalli, et al., "Client Subnet in DNS Queries," RFC 7871, May 2016, 30 pages.

3GPP TS 23.502 V16.1.1, Jun. 2019, "3rd Generation Partnership Project; Technical Specification Group Services and System Aspects; Procedures for the 5G System; Stage 2 (Release 16)," 494 pages.

* cited by examiner

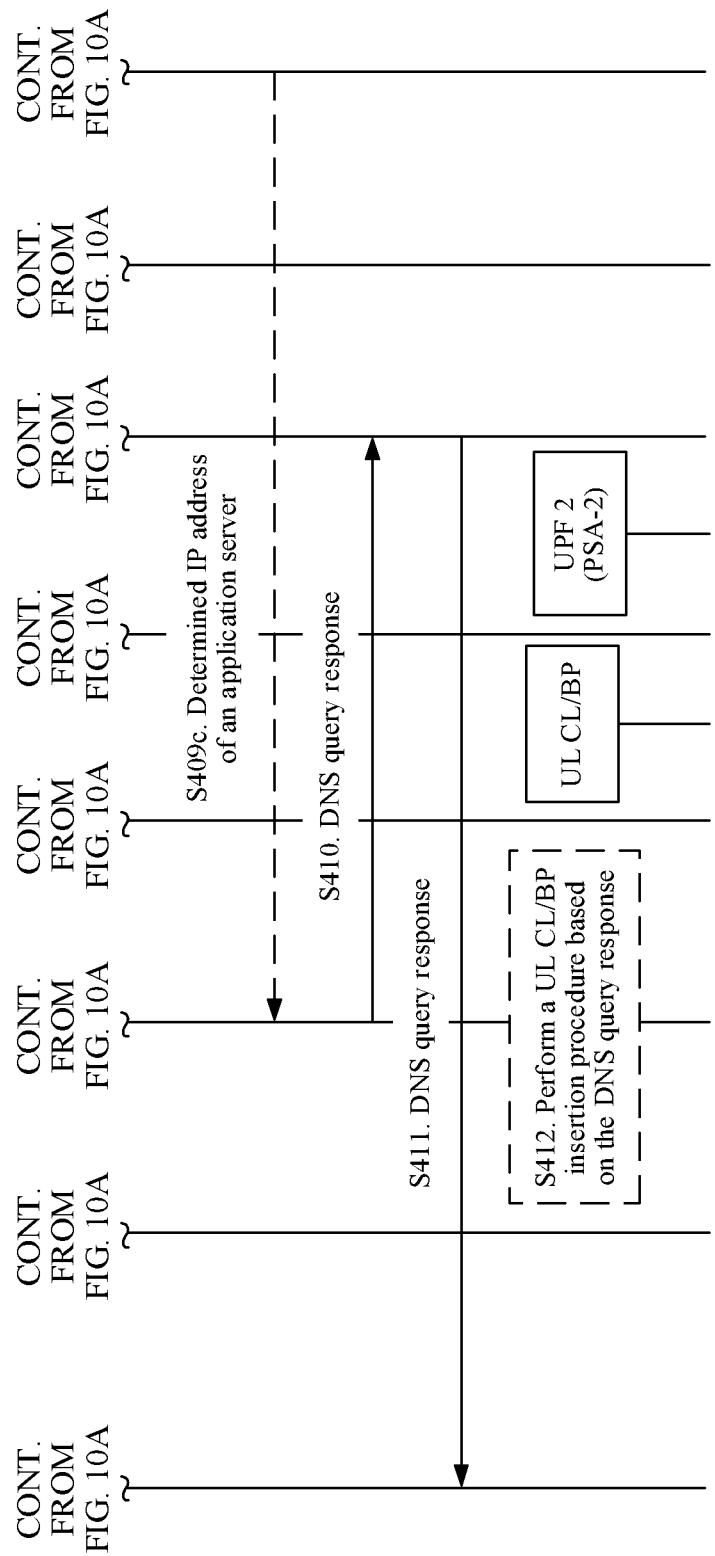

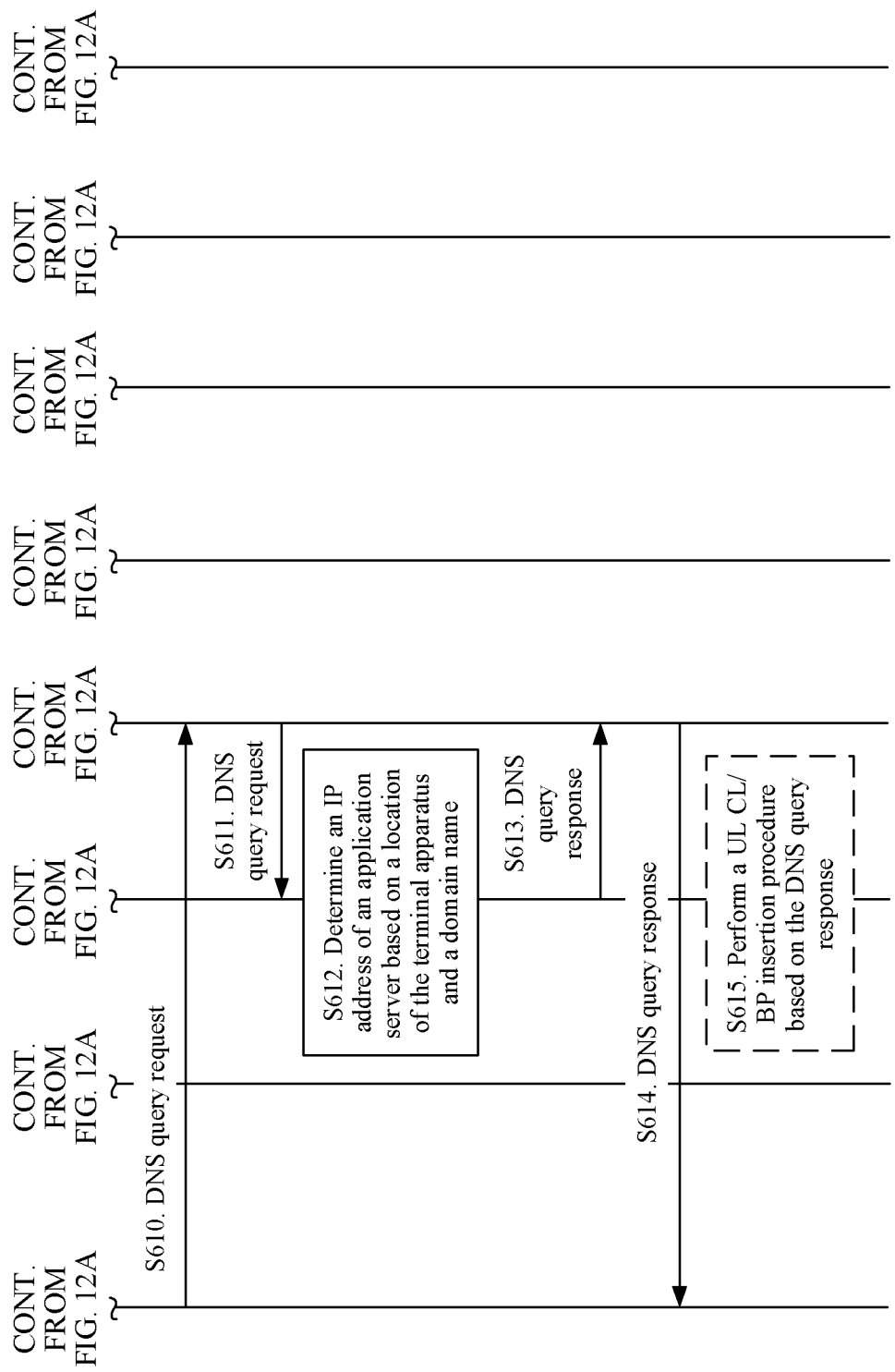

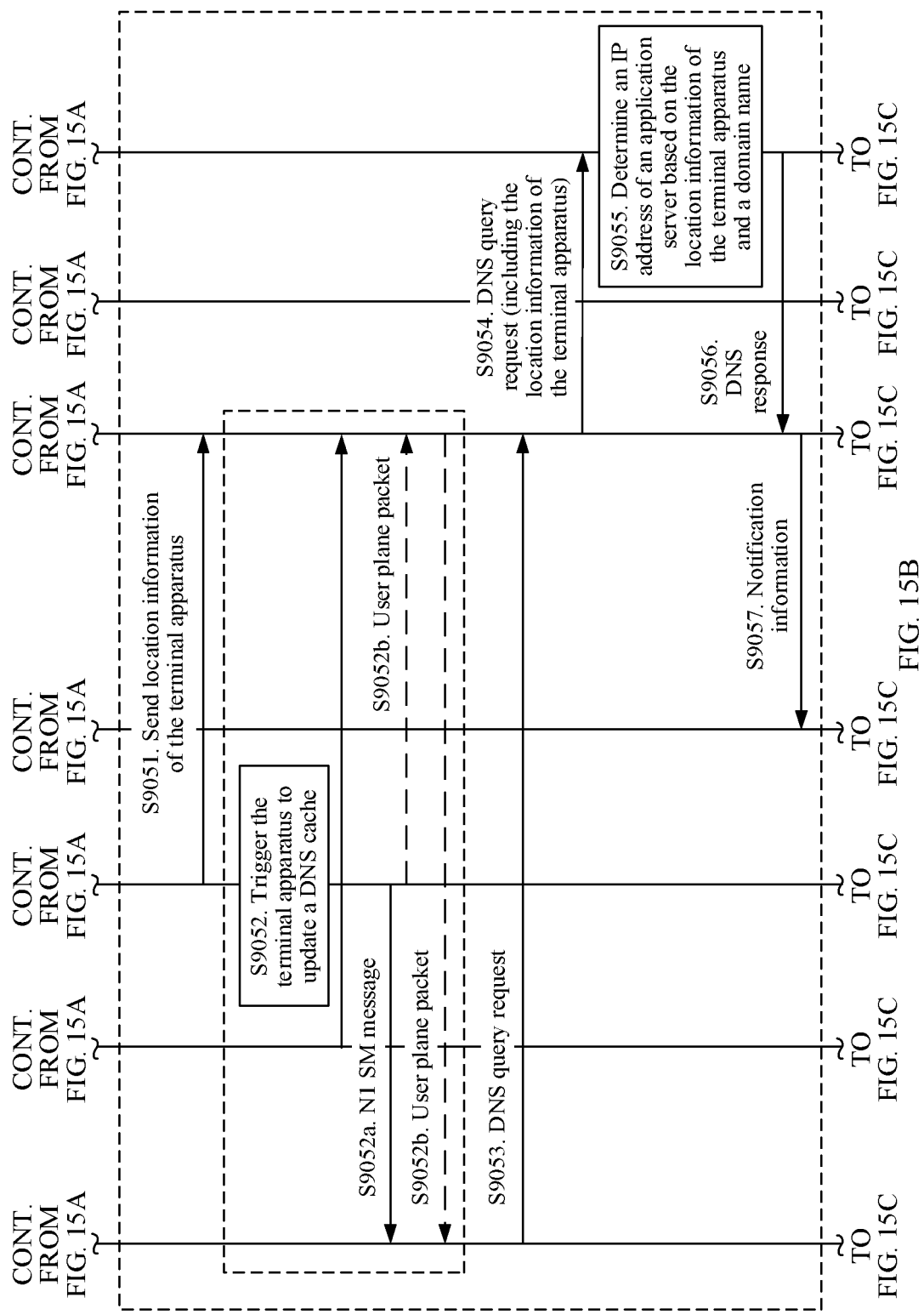

DOMAIN NAME SYSTEM QUERY METHOD AND COMMUNICATION APPARATUS

CROSS-REFERENCE TO RELATED APPLICATIONS

This is a continuation of International Patent Application No. PCT/CN2020/110009, filed on Aug. 19, 2020, which claims priority to Chinese Patent Application No. 201910926424.3, filed on Sep. 27, 2019, which claims priority to Chinese Patent Application No. 201910770920.4, filed on Aug. 20, 2019. All of the aforementioned patent applications are hereby incorporated by reference in their entireties.

TECHNICAL FIELD

This application relates to the communication field, and more specifically, to a domain name system query method and a communication apparatus.

BACKGROUND

As there are more mobile terminal (for example, mobile phone) users, service functions supported by various mobile terminals keep increasing. For example, functions such as instant messaging, securities, web page browsing, and file download have gradually been mainstream applications on terminal apparatuses, especially smartphones. In an internet access process, a terminal apparatus needs to query an Internet Protocol (IP) address corresponding to a domain name of a uniform resource locator (URL), to send packets. This is done by querying a domain name system (DNS) server.

The terminal apparatus may send a domain name resolution request to the DNS server, where the domain name resolution request carries the domain name. The DNS server returns the IP address corresponding to the domain name, and the terminal apparatus may access the domain name using the IP address.

Mobile edge computing (MEC) is a technology that deeply integrates an access network and an internet service based on a 5th generation (5G) evolution architecture. With the MEC, an application server (AS) and some service processing and resource scheduling functions of a mobile broadband (MBB) core network are deployed at a network edge close to the access network. Services are processed in the proximity of users, to provide reliable and ultra-low latency service experience. In current DNS query, a terminal apparatus sends a domain name resolution request (DNS query request) to a DNS server through a user plane function (UPF) network element connected to an MEC platform. However, because application servers deployed on different MEC platforms and providing a same service have a same domain name, and these application servers have different IP addresses, it is an urgent problem to be resolved that how the DNS server determines to return an IP address of an application server closest to the terminal apparatus to the terminal apparatus so that the terminal apparatus can access a local service nearby. In addition, after the DNS server returns the IP address of the application server closest to the terminal apparatus to the terminal apparatus, how to selectively route service traffic to an MEC platform on which the application server is located also needs a corresponding solution.

SUMMARY

This application provides a domain name system query method and a communication apparatus. When a terminal apparatus performs domain name query, a core network element determines an IP address of a corresponding application server based on location information of the terminal apparatus and a queried domain name. The IP address of the application server corresponds to both a location of the terminal apparatus and the queried domain name. In this way, the terminal apparatus can obtain an IP address of an application server closest to the terminal apparatus and access a service nearby, thereby improving service access efficiency of the terminal apparatus, reducing a service access delay of the terminal apparatus, and improving communication efficiency.

According to a first aspect, a domain name system query method is provided, and the method may be performed by a first network element or by a chip used in the first network element. For example, the first network element may be a user plane function network element or a session management network element. For example, the method is performed by the first network element. The method includes: The first network element receives a DNS query request from a terminal apparatus, where the DNS query request includes a first domain name, and where the DNS query request is used to request an IP address corresponding to the first domain name; the first network element sends first request information to a second network element, where the first request information includes location information of the terminal apparatus and the first domain name; the first network element receives first response information sent by the second network element in response to the first request information, where the first response information includes the IP address; and the first network element sends the IP address to the terminal apparatus.

According to the domain name system query method provided in the first aspect, the first network element adds the location information of the terminal apparatus into the DNS query request and sends the DNS query request to the second network element, and the second network element determines, based on the location information of the terminal apparatus and a requested domain name, an IP address of an application server corresponding to both a location of the terminal apparatus and the requested domain name, and feeds back the IP address to the terminal apparatus. In this way, the terminal apparatus accesses a service nearby via the application server. This avoids a problem that a service is limited or some services cannot be accessed when the terminal apparatus accesses services via an application server that is far from the terminal apparatus, improving service access quality of the terminal apparatus. In addition, because the terminal apparatus can access the service nearby, a service access delay of the terminal apparatus is reduced, and communication efficiency is improved.

In a possible implementation of the first aspect, the DNS query request further includes a destination address, the destination address is an address of a DNS server, and the first request information further includes the destination address.

In a possible implementation of the first aspect, the first network element is a user plane function network element, the second network element is any one of a policy control function network element, an application function network element, or the DNS server, and the method further includes: The first network element sends first notification information to a session management network element, where the first notification information is used by the session management network element to select a first traffic steering node or a first protocol data unit (PDU) session anchor (PSA) for the terminal apparatus, or where the first notification information is used by the session management network element to determine the location information of the terminal apparatus. The first notification information includes one or more of the first domain name, the IP address corresponding to the first domain name, or the destination address (an address of the DNS server). This implementation improves accuracy of sending the notification information by the user plane function network element to the session management network element, prevents a waste of communication resources, and improves communication efficiency.

In a possible implementation of the first aspect, the first network element is a session management network element, the second network element is any one of a policy control function network element, an application function network element, or the DNS server, and the method further includes: The first network element selects a first traffic steering node or a first PDU session anchor (PSA) for the terminal apparatus based on any one of the first domain name, the destination address, and the IP address corresponding to the first domain name, where the destination address is the address of the DNS server. In this implementation, after the traffic steering node and the PSA are inserted, the terminal apparatus may access, via the PSA, an application server corresponding to the first domain name. This can optimize a data transmission route, reduce a data transmission delay, and improve data transmission efficiency.

In a possible implementation of the first aspect, the first network element is the user plane function network element, the second network element is any one of the policy control function network element, the application function network element, or the DNS server, and the method further includes: The first network element receives the location information of the terminal apparatus sent by the session management network element. This implementation can reduce complexity of obtaining the location information of the terminal apparatus by the first network element, is easy to implement, and improves accuracy of the obtained location information of the terminal apparatus.

In a possible implementation of the first aspect, the method further includes: The first network element receives a first rule sent by the session management network element, where any one of the first domain name, the destination address, or the IP address corresponding to the first domain name meets the first rule, and where the destination address is the address of the DNS server. This implementation improves accuracy of sending the notification information by the user plane function network element to the session management network element, reduces a delay in notifying the session management network element by the user plane function network element, reduces signaling overheads, and improves resource utilization.

In a possible implementation of the first aspect, the location information of the terminal apparatus includes at least one of a tracking area identity (TAI) of the terminal apparatus, a data network access identifier (DNAI), identification information of a fourth network element, or a first IP address. The DNAI is used to identify a location of the application server corresponding to the first domain name, or the DNAI is used to identify a location of a management platform on which the application server corresponding to the first domain name is located. The fourth network element includes the user plane function network element or a radio access network element, and the user plane function network element is a user plane function network element connected to the management platform on which the application server corresponding to the first domain name is located. The user plane function network element may access the management platform on which the application server corresponding to the first domain name is located. The radio access network element is a radio access network element currently accessed by the terminal apparatus. The first IP address points to the management platform on which the application server corresponding to the first domain name is located, and the location of the management platform corresponds to the location of the terminal apparatus.

This implementation can improve accuracy of the location information of the terminal apparatus, such that the location information more precisely reflects the actual location of the terminal apparatus.

According to a second aspect, a domain name system query method is provided, and the method may be performed by a third network element or by a chip used in the third network element. For example, the first network element may be any one of a policy control function network element, an application function network element, a session management network element, or a DNS server. For example, the method is performed by the third network element. The method includes: The third network element receives a first domain name and location information of a terminal apparatus; and the third network element determines, based on at least the first domain name and the location information of the terminal apparatus, an IP address corresponding to the first domain name, where the IP address corresponds to a location of the terminal apparatus.

According to the domain name system query method provided in the second aspect, the third network element determines, based on the location of the terminal apparatus and a requested domain name, an IP address of an application server corresponding to both the location of the terminal apparatus and a requested domain name, and feeds back the IP address to the terminal apparatus. In this way, the terminal apparatus can access a service nearby via the application server. This avoids a problem that a service is limited or some services cannot be accessed when the terminal apparatus accesses services via an application server that is far from the terminal apparatus, improving service access quality of the terminal apparatus. In addition, because the terminal apparatus can access the service nearby, a service access delay of the terminal apparatus is reduced, and communication efficiency is improved.

In a possible implementation of the second aspect, that the third network element determines, based on at least the first domain name and the location information of the terminal apparatus, an IP address corresponding to the first domain name includes: The third network element determines, the IP address based on the first domain name, the location information of the terminal apparatus, and first information, where the first information includes at least one domain name, a deployment location of an application corresponding to each domain name in the at least one domain name, and an IP address corresponding to the deployment location of the application, optionally, the first information may further include a correspondence between a first IP address and a deployment location of an MEC platform or a deployment location of an application server, and the at least one domain name includes the first domain name; and the third network element sends the IP address.

In a possible implementation of the second aspect, the third network element is any one of a session management network element, a policy control function network element, an application function network element, or a DNS server, and the third network element stores the first information. In this implementation, the third network element stores the first information, such that the third network element quickly and accurately determines the IP address of the application server corresponding to both the location of the terminal apparatus and the requested domain name. This improves efficiency of determining the IP address by the third network element.

In a possible implementation of the second aspect, the third network element is a DNS server, and the method further includes: The third network element receives the location information of the terminal apparatus sent by a policy control function network element or an application function network element.

In a possible implementation of the second aspect, the third network element is the DNS server, and that the third network element receives a first domain name includes: The third network element receives second request information sent by a session management network element or a user plane function network element, where the second request information includes the first domain name.

In a possible implementation of the second aspect, the second request information further includes the location information of the terminal apparatus.

In a possible implementation of the second aspect, the location information of the terminal apparatus includes at least one of a TAI of the terminal apparatus, a DNAI, identification information of a fourth network element, or a first IP address. The DNAI is used to identify a location of an application server corresponding to the first domain name, or the DNAI is used to identify a location of a management platform on which the application server corresponding to the first domain name is located. The fourth network element includes the user plane function network element or a radio access network element, and the user plane function network element is a user plane function network element connected to the management platform on which the application server corresponding to the first domain name is located. The user plane function network element may access the management platform on which the application server corresponding to the first domain name is located. The radio access network element is a radio access network element currently accessed by the terminal apparatus. The first IP address points to the management platform on which the application server corresponding to the first domain name is located, and the location of the management platform corresponds to the location of the terminal apparatus.

According to a third aspect, a domain name system query method is provided, where the method includes: A session management network element receives second information from a policy control function network element or an application function network element, where the second information includes at least one domain name and location information of an application server corresponding to each domain name in the at least one domain name; and the session management network element determines, based on the second information and a first domain name sent by a terminal apparatus, location information of an application server corresponding to the first domain name, where the at least one domain name includes the first domain name.

According to the domain name system query method provided in the third aspect, the session management network element determines, based on the obtained second information and the received first domain name, the location information of the application server corresponding to the first domain name. Therefore, the session management network element or a DNS server determines, based on the location information of the application server, an IP address of an application server corresponding to both a location of the terminal apparatus and a requested domain name, and feeds back the IP address to the terminal apparatus. In this way, the terminal apparatus can access a service nearby via the application server. This avoids a problem that a service is limited or some services cannot be accessed when the terminal apparatus accesses services via an application server that is far from the terminal apparatus, improving service access quality of the terminal apparatus.

In a possible implementation of the third aspect, the method further includes: The session management network element sends the location information of the application server corresponding to the first domain name to the DNS server.

The location information of the application server corresponding to the first domain name is used by the DNS server to determine an IP address of the application server corresponding to the first domain name.

In a possible implementation of the third aspect, the location information of the application server corresponding to the first domain name includes a DNAI or a first IP address; and the first IP address points to a location of the application server corresponding to the first domain name.

In a possible implementation of the third aspect, the second information further includes an IP address of the application server corresponding to each domain name in the at least one domain name. The method further includes: The session management network element determines, based on the second information, the IP address of the application server corresponding to the first domain name; and the session management network element sends the IP address to the terminal apparatus.

According to a fourth aspect, a communication apparatus is provided. The apparatus includes units configured to perform the steps in any one of the first aspect or the possible implementations of the first aspect.

According to a fifth aspect, a communication apparatus is provided. The apparatus includes units configured to perform the steps in any one of the second aspect or the possible implementations of the second aspect.

According to a sixth aspect, a communication apparatus is provided. The apparatus includes units configured to perform the steps in any one of the third aspect or the possible implementations of the third aspect.

In a design, the communication apparatus is a communication chip. The communication chip may include an input circuit or interface configured to send information or data, and an output circuit or interface configured to receive information or data.

In another design, the communication apparatus is a communication device (for example, a terminal apparatus, an access network device, or a core network device). The communication apparatus may include a transmitter configured to send information or data, and a receiver configured to receive information or data.

According to a seventh aspect, a communication apparatus is provided. The apparatus includes at least one processor and a memory. The at least one processor obtains a program or instructions in the memory. The at least one processor is configured to execute the program or the instructions to enable the communication apparatus to perform the method according to any one of the first aspect or the possible implementations of the first aspect.

According to an eighth aspect, a communication apparatus is provided. The apparatus includes at least one processor and a memory. The at least one processor obtains a program or instructions in the memory. The at least one processor is configured to execute the program or the instructions to enable the communication apparatus to perform the method according to any one of the second aspect or the possible implementations of the second aspect.

According to a ninth aspect, a communication apparatus is provided. The apparatus includes at least one processor and a memory. The at least one processor obtains a program or instructions in the memory. The at least one processor is configured to execute the program or the instructions to enable the communication apparatus to perform the method according to any one of the third aspect or the possible implementations of the third aspect.

According to a tenth aspect, a communication apparatus is provided. The apparatus includes at least one processor and an interface circuit. The interface circuit is used by the at least one processor to obtain a program or instructions in at least one memory. The at least one processor is configured to execute the program or the instructions to enable the communication apparatus to perform the method according to any one of the first aspect or the possible implementations of the first aspect.

According to an eleventh aspect, a communication apparatus is provided. The apparatus includes at least one processor and an interface circuit. The interface circuit is used by the at least one processor to obtain a program or instructions in at least one memory. The at least one processor is configured to execute the program or the instructions to enable the communication apparatus to perform the method according to any one of the second aspect or the possible implementations of the second aspect.

According to a twelfth aspect, a communication apparatus is provided. The apparatus includes at least one processor and an interface circuit. The interface circuit is used by the at least one processor to obtain a program or instructions in at least one memory. The at least one processor is configured to execute the program or the instructions to enable the communication apparatus to perform the method according to any one of the third aspect or the possible implementations of the third aspect.

According to a thirteenth aspect, a processor is provided, and includes an input circuit, an output circuit, and a processing circuit. The processing circuit is configured to: receive a signal through the input circuit, and transmit a signal through the output circuit, such that the processor performs the method according to any one of the first aspect to the third aspect, or the possible implementations of the first aspect to or the third aspect.

In an implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Implementations of the processor and the circuits are not limited in the embodiments of this application.

According to a fourteenth aspect, a user plane function network element or a session management network element is provided. The user plane function network element or the session management network element includes the communication apparatus provided in the seventh aspect, the communication apparatus provided in the ninth aspect, or the communication apparatus provided in the eleventh aspect.

According to a fifteenth aspect, a policy control function network element, an application function network element, a session management network element, or a DNS server is provided. The policy control function network element, the application function network element, the session management network element, or the DNS server includes the communication apparatus provided in the eighth aspect, the communication apparatus provided in the tenth aspect, or the communication apparatus provided in the twelfth aspect.

According to a sixteenth aspect, a communication system is provided, and includes the communication apparatus provided in the seventh aspect and the communication apparatus provided in the eighth aspect, the communication apparatus provided in the ninth aspect and the communication apparatus provided in the tenth aspect, the communication apparatus provided in the eleventh aspect and the communication apparatus provided in the twelfth aspect, or the network element provided in the fourteenth aspect and the network element provided in the fifteenth aspect.

In a possible design, the communication system may further include the terminal apparatus and/or the access network device in the solutions provided in the embodiments of this application.

According to a seventeenth aspect, a computer program product is provided. The computer program product includes a computer program. When the computer program is executed by a processor, the computer program is used to perform the method according to any one of the first aspect or the possible implementations of the first aspect, the method according to any one of the second aspect or the possible implementations of the second aspect, or the method according to any one of the third aspect or the possible implementations of the third aspect.

According to an eighteenth aspect, a computer-readable storage medium is provided, where the computer-readable storage medium stores a computer program. When the computer program is executed, the computer program is used to perform the method according to any one of the first aspect or the possible implementations of the first aspect, the method according to any one of the second aspect or the possible implementations of the second aspect, or the method according to any one of the third aspect or the possible implementations of the third aspect.

According to the solutions provided in this application, when a terminal apparatus performs domain name query, a core network element determines an IP address of a corresponding application server based on location information of the terminal apparatus and a queried domain name. The IP address of the application server corresponds to both a location of the terminal apparatus and the queried domain name. In this way, the terminal apparatus can obtain an IP address of an application server closest to the terminal apparatus and access a service nearby, thereby improving service access efficiency of the terminal apparatus, reducing a service access delay of the terminal apparatus, and improving communication efficiency.

BRIEF DESCRIPTION OF DRAWINGS

FIG. 10A and FIG. 10B are a schematic interaction diagram of still another domain name system query method according to an embodiment of this application;

FIG. 12A and FIG. 12B are a schematic interaction diagram of still another domain name system query method according to an embodiment of this application;

FIG. 15A to FIG. 15C are a schematic interaction diagram of still another domain name system query method according to an embodiment of this application;

DESCRIPTION OF EMBODIMENTS

The following describes the technical solutions in this application with reference to the accompanying drawings.

The technical solutions of the embodiments of this application may be applied to various communication systems, such as a global system for mobile communications (GSM), a code-division multiple access (CDMA) system, a wideband code-division multiple access (WCDMA) system, a General Packet Radio Service (GPRS) system, a Long-Term Evolution (LTE) system, an LTE frequency-division duplex (FDD) system, an LTE time-division duplex (TDD) system, a universal mobile telecommunication system (UMTS), a Worldwide Interoperability for Microwave Access (WiMAX) communication system, a future 5th generation (5G) system, or a new radio (NR) system.

Figure 1:
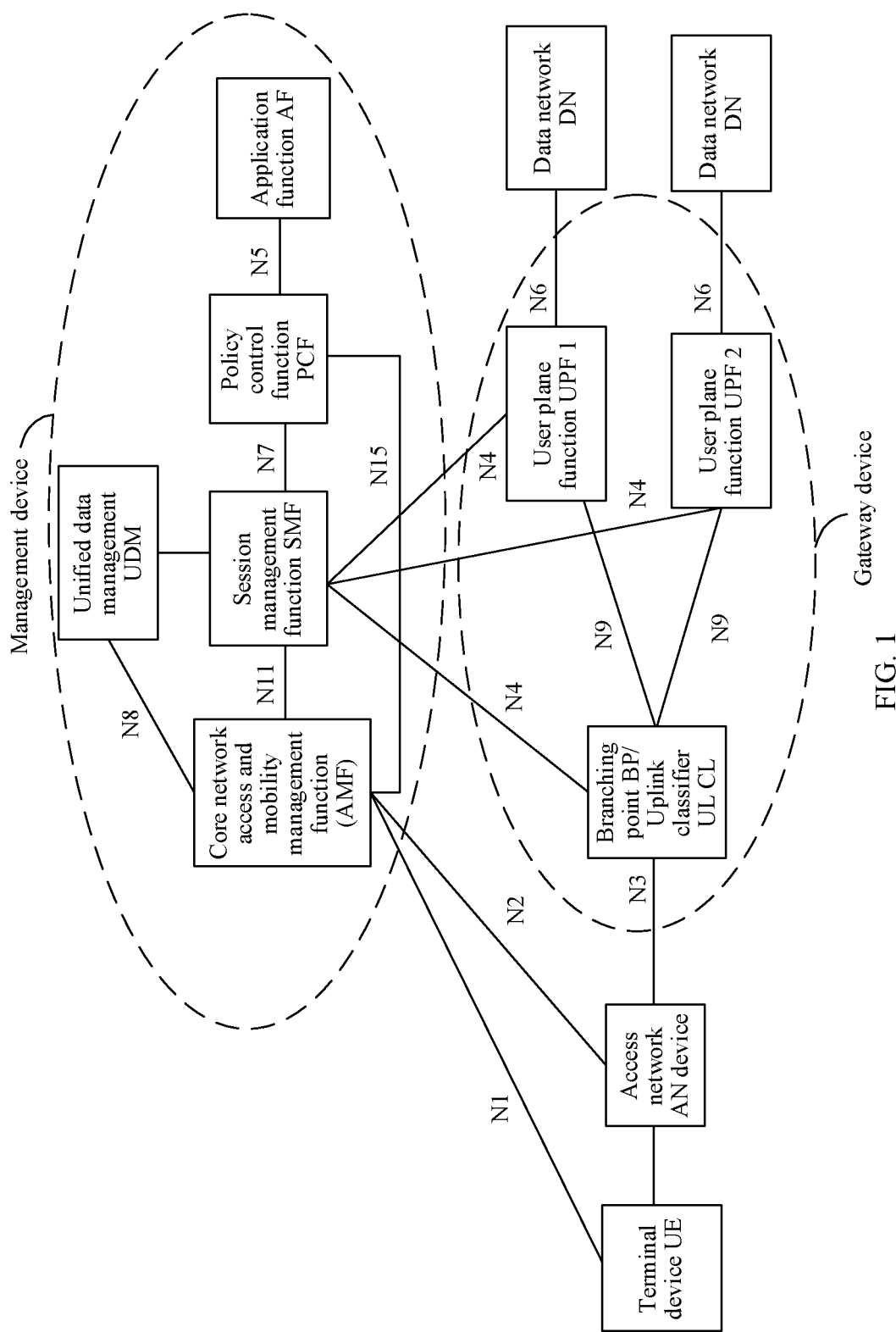
FIG. 1 is a schematic diagram of an architecture of a wireless communication system to which an embodiment of this application is applicable.

FIG. 1 is a schematic block diagram of an architecture of a wireless communication system to which an embodiment of this application is applicable. As shown in FIG. 1, the architecture of the system includes a terminal apparatus, an access network device, a management device, a gateway device, and a data network (DN). The terminal apparatus in FIG. 1 may be configured to connect, through a radio air interface, to the access network device deployed by an operator, and then connect to the data network via the gateway device. The access network device is mainly configured to implement functions such as a radio physical layer function, resource scheduling and radio resource management, radio access control, and mobility management. The management device is mainly configured to perform device registration, security authentication, mobility management, location management, and the like of the terminal apparatus. The gateway device is mainly configured to: establish a channel with the terminal apparatus, and forward a data packet between the terminal apparatus and an external data network through the channel. The data network may correspond to a plurality of different service domains, such as an IP multimedia subsystem (IMS), the internet, an IP television (IPTV), and other operator service domains, and is mainly configured to provide a plurality of data services for the terminal apparatus. The data network may include network devices such as a server (including a server providing a multicast service), a router, and a gateway. A terminal that expects to receive an IP multicast service packet needs to request, according to a group management protocol, to join/leave a multicast IP address corresponding to a multicast service, to start/end receiving the multicast service. There are the Internet group management protocol (IGMP) in IP version 4 (IPv4), and the multicast listener discovery (MLD) protocol in IP version 6 (IPv6). It should be noted that, FIG. 1 is merely an example diagram of the architecture. The architecture of the network may further include other function units or function network elements, in addition to the function units shown in FIG. 1. This is not limited in the embodiments of this application.

When the communication network shown in FIG. 1 is a 5G network, the foregoing terminal apparatus may be a user equipment (UE), for example, a mobile phone or a computer, or may be a cellular phone, a cordless phone, a Session Initiation Protocol (SIP) phone, a smartphone, a wireless local loop (WLL) station, a personal digital assistant (PDA), a computer, a laptop computer, a handheld communication device, a handheld computing device, a satellite wireless device, a wireless modem card, a television set-top box (STB), customer premises equipment (CPE), and/or another device for communication on a wireless system. The foregoing access network device may be an access network (AN)/radio access network (RAN) device, and is a network including a plurality of 5G-AN/5G-RAN nodes. The 5G-AN/5G-RAN node may be an access node (e.g., an access point (AP)), a next generation NodeB (e.g., NR NodeB, gNB), a gNB in which a centralized unit (CU) is separated from a distributed unit (DU), a transmission reception point (TRP), a transmission point (TP), or another access node. The management device may include a unified data management (UDM) network element, an access and mobility management function (AMF), a session management function (SMF), a policy control function (PCF), an application function (AF), and the like. The gateway device may include function units such as a user plane function (UPF), a branching point (BP), and an uplink (UL) classifier (CL). These function units may work independently, or may be integrated together to implement some control functions. For example, the AMF, the SMF, and the PCF may be integrated together as the management device, to implement access control and mobility management functions such as access authentication, security encryption, and location registration of the terminal apparatus, session management functions such as establishment, release, and modification of a user plane transmission path, and a function of analyzing some slice (slice)-related data (for example, congestion) and terminal apparatus-related data. The UPF, serving as the gateway device, mainly completes functions such as routing and forwarding of user plane data, for example, is responsible for data packet filtering, data transmission/forwarding, rate control, charging information generation, and the like for the terminal apparatus. In addition, in the 5G system, to selectively route service traffic to the data network, the session management network element may control a data path of a protocol data unit (PDU) session. In this way, the PDU session and the data network may correspond to a plurality of interfaces, that is, a plurality of session anchors may exist for a same PDU session. A user plane function (UPF) terminating these interfaces is referred to as a PDU session anchor (PSA) or an anchor UPF. Each anchor of the PDU session may further provide a different ingress to the same DN. In addition, one or more UPF network elements are inserted between the access network device and different PSAs to implement traffic steering of uplink data to the different PSAs. The inserted UPF network element may be a branching point (BP) or an uplink classifier (UL CL). It is uniformly noted herein that the BP or the UL CL may also be referred to as a traffic steering UPF network element.

In the 5G network shown in FIG. 1, function units may establish a connection through a next-generation (NG) network interface for communication. For example, the terminal apparatus establishes an air interface connection to the RAN device through a new radio (NR) interface, for user plane data and control plane signaling transmission; the terminal apparatus may establish a control plane signaling connection to the AMF through an NG interface 1 (N1); the AN/RAN device, for example, a next-generation NodeB (NR NodeB, gNB), may establish a user plane data connection to the traffic steering UPF through an NG interface 3 (N3); the AN/RAN device may establish a control plane signaling connection to the AMF through an NG interface 2 (N2); the traffic steering UPF may establish a user plane data connection to the anchor UPF through an NG interface 9 (N9); the traffic steering UPF and the anchor UPF may establish a control plane signaling connection to the SMF through an NG interface 4 (N4); the anchor UPF may exchange user plane data with the data network through an NG interface 6 (N6); the AMF may establish a control plane signaling connection to the SMF through an NG interface 11 (N11); the SMF may establish a control plane signaling connection to the PCF through an NG interface 7 (N7). It should be noted that, FIG. 1 is merely an example diagram of the architecture. The architecture of the network may further include other function units or function network elements, in addition to the function units shown in FIG. 1. This is not limited in the embodiments of this application.

When the communication network shown in FIG. 1 is a 4G network, for the terminal apparatus, refer to the related descriptions of the terminal apparatus in FIG. 1, and details are not described herein again. The access network device may be a NodeB (NB), an evolved NodeB (eNB), a TRP, a TP, an AP, or another access unit. The core network device may include management devices such as a mobility management entity (MME) and a policy and charging rules function (PCRF), and gateway devices such as a serving gateway (SGW), a packet data network (PDN) gateway (PGW), and a local gateway (LGW).

It should be understood that a name of an interface between network elements in this application is merely an example, and the interface between the network elements may have another name. The name of the interface is not limited in this application.

A terminal apparatus in the embodiments of this application may be user equipment, an access terminal, a subscriber unit, a subscriber station, a mobile station, a mobile station, a remote station, a remote terminal, a mobile device, a user terminal, a terminal, a wireless communication device, a user agent, or a user apparatus. The terminal apparatus may alternatively be a cellular phone, a cordless phone, a session initiation protocol (Session Initiation Protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal apparatus in a future 5G network, a terminal apparatus in a future evolved public land mobile network (PLMN), or the like. This is not limited in the embodiments of this application.

The access network device in the embodiments of this application may be a device configured to communicate with the terminal apparatus and the core network device. The access network device may be a base transceiver station (BTS) in a global system for mobile communications (GSM) or in a code-division multiple access (CDMA) system, or may be a NodeB (NB) in a wideband code-division multiple access (WCDMA) system, or may be an evolved NodeB (eNB or eNodeB) in an LTE system, or may be a radio controller in a cloud radio access network (CRAN) scenario. Alternatively, the access network device may be a relay station, an access point, a vehicle-mounted device, a wearable device, a network device in a future 5G network, an access network device in a future evolved PLMN network, or the like. This is not limited in the embodiments of this application.

As there are more mobile terminal (for example, mobile phone) users, service functions supported by various mobile terminals keep increasing. For example, functions such as instant messaging, securities, web page browsing, and file download have gradually become mainstream applications on terminal apparatuses, especially smartphones. In an internet access process, a mobile terminal needs to query an IP address corresponding to a domain name of a uniform resource locator (URL), to send packets. This is done by querying a domain name system (DNS) server.

The DNS server is a distributed host information database, and provides mapping and translation between a domain name and an IP address. A domain name may be resolved into a corresponding IP address using the DNS server. The terminal apparatus can access a domain name using a domain name resolution service provided by the DNS server.

A domain name access process is as follows: That the terminal apparatus accesses a domain name A is used as an example. When the terminal apparatus accesses the domain name A, the terminal apparatus queries whether an IP address of an application server corresponding to the domain name A exists in a cache of the terminal apparatus. If the IP address exists, the terminal apparatus may directly obtain the IP address, and access the domain name A using the IP address. If the IP address does not exist, the terminal apparatus may send a domain name resolution request to the DNS server, where the domain name resolution request carries the domain name A. The DNS server returns an IP address corresponding to the domain name A, and the terminal apparatus may access the domain name A using the IP address.

In addition, after obtaining the IP address corresponding to the domain name, the terminal apparatus generates and caches a DNS caching record. The DNS caching record represents a correspondence between the domain name and the IP address. In addition, the terminal apparatus maintains corresponding time to live (TTL) for each cached DNS caching record. The TTL of the DNS caching record is a time period during which the DNS caching record is stored in the cache of the terminal apparatus. In this way, if the terminal apparatus needs to access a domain name in a DNS caching record again within the TTL of the DNS caching record, the terminal apparatus may directly obtain, based on the DNS caching record, an IP address corresponding to the domain name. If the TTL of the DNS caching record is exceeded, and the terminal apparatus needs to access the domain name again, the terminal apparatus obtains, through resolution by the DNS server, the IP address corresponding to the domain name.

For a PDU session in a 5G system, an uplink classifier (UL CL) may be used to implement that a plurality of session anchors exist for a same PDU session, or Internet Protocol version 6 (IPv6) multi-homing may be used to implement that a plurality of session anchors exist for a same PDU session.

In a PDU session scenario in which a plurality of PSAs are implemented using a UL CL, the SMF may insert a UL CL into a data path of the PDU session. The UL CL is a function provided by the UPF, and is intended to perform local traffic routing on some services using a flow filter provided by the SMF. The terminal apparatus neither perceives the UL CL nor participates in addition or deletion of the UL CL. The UL CL forwards uplink services to different PDU session anchors based on service detection and forwarding rules provided by the SMF. (For example, a UPF 1 and a UPF 2 in FIG. 1 are two different anchors of a PDU session). In addition, the UL CL aggregates downlink data flows destined for the terminal apparatus, that is, aggregates service data flows from different PDU session anchors (for example, the UPF 1 and the UPF 2 in FIG. 1) to a downlink destined for the terminal apparatus.

In a PDU session scenario in which a plurality of PSAs are implemented using a BP, the PDU session is referred to as a multi-homing PDU session. The multi-homing PDU session can access the DN via a plurality of PDU session anchors (for example, the UPF 1 and the UPF 2 in FIG. 1). User plane data is branched at one UPF and routed to different PDU session anchors. A UPF that supports this function is referred to as a branching point (BP). The branching point forwards uplink service data flows to different PDU session anchors, and aggregates downlink service data flows destined for the terminal apparatus. Multi-homing is applicable only to an IPv6 PDU session, and the PDU session may be associated with a plurality of IPv6 prefixes.

Figure 2:
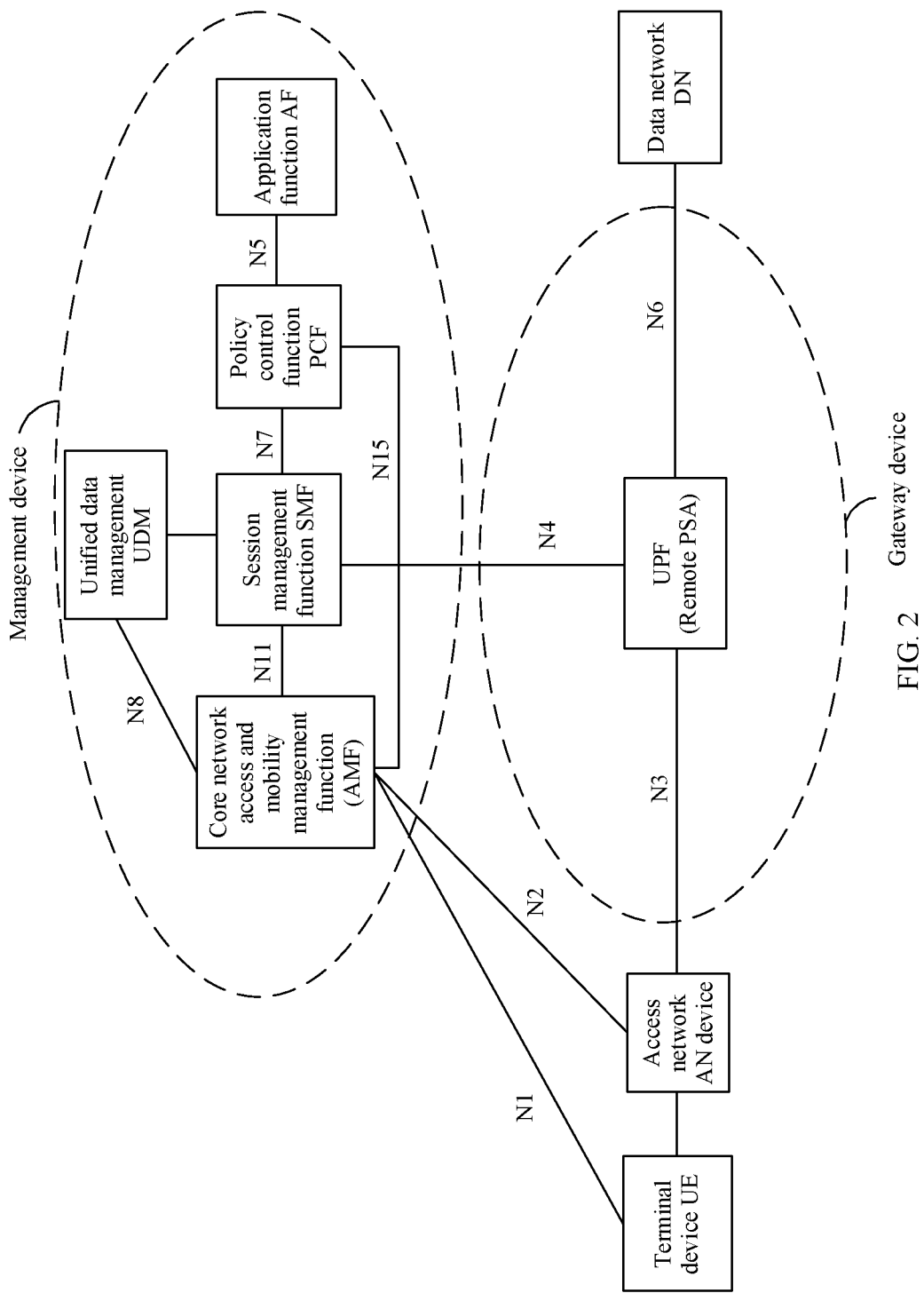
FIG. 2 is a schematic architectural diagram of another wireless communication system to which an embodiment of this application is applicable.
Figure 3:
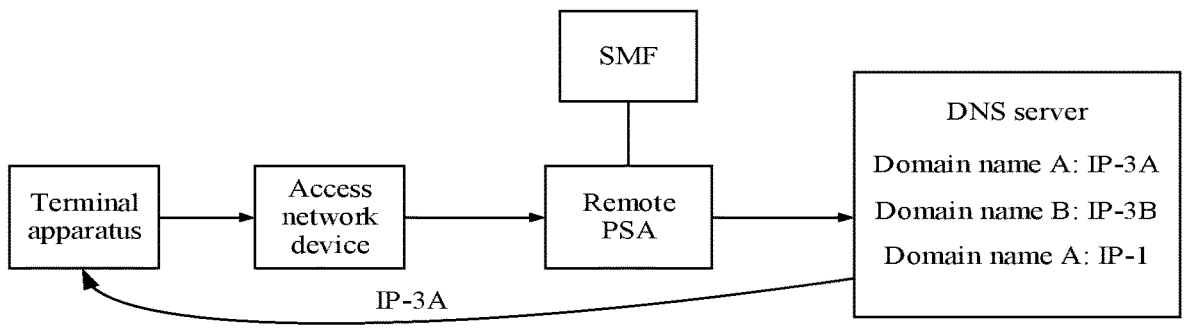
FIG. 3 is a schematic diagram of a domain name access process of a terminal apparatus after initial session establishment is completed.

Insertion of the UL CL/BP may be performed during initial establishment of a PDU session, or may be performed at any moment after the initial establishment of the PDU session is completed. If no UL CL/BP is inserted during initial establishment of a PDU session of the terminal apparatus, there is only one session anchor PSA when the PDU session is initially established, and the PSA may be referred to as a remote PSA, as shown in FIG. 2. FIG. 2 is a schematic block diagram of an architecture of a wireless communication system in which there is only a remote PSA. A difference from FIG. 1 lies in that, the gateway device includes only one UPF serving as a session anchor, and is used for communication between the terminal apparatus and the data network and the like. During initial establishment of a PDU session, the core network selects a PSA based on a location of the terminal apparatus to select an optimal anchor UPF. However, because the terminal apparatus is mobile, a location of the remote PSA cannot represent a current physical location of the terminal apparatus. Based on FIG. 2, FIG. 3 is a schematic diagram of a domain name access process of a terminal apparatus after initial session establishment is completed. As shown in FIG. 3, it is assumed that an address assigned by the core network to the terminal apparatus during the initial establishment of the PDU session is IP-3. When the terminal apparatus requests, via the remote PSA, a DNS to query a domain name A, the remote PSA sends a DNS query request (query) of the terminal apparatus to the DNS server. The domain name A may correspond to a plurality of application servers, which are deployed in different locations. For example, the application servers corresponding to the domain name A are deployed on two different MEC platforms: an MEC platform 1 and an MEC platform 2. IP addresses of the two application servers are IP-3A and IP-1. The application server whose address is IP-3A is deployed on the MEC platform 1, and the MEC platform 1 is deployed closer to the remote PSA. The application server whose address is IP-1 is deployed on the MEC platform 2, and the MEC platform 2 is deployed closer to the current location of the terminal apparatus. Because the DNS server does not perceive the current location of the terminal apparatus, the DNS server returns, according to address affinity and based on the requested domain name A, the IP address of the application server "closer" to the remote PSA after receiving the DNS query request of the terminal apparatus from the remote PSA. Therefore, the DNS server returns an address (for example, IP-3A in FIG. 3) of the application server deployed on the MEC platform 1. In this case, the terminal apparatus cannot obtain the IP address of the application server deployed on the MEC platform 2 closer to the terminal apparatus. As a result, the terminal apparatus cannot access a service nearby via the application server deployed on the MEC platform 2, and services of some services accessed by the terminal apparatus are limited or some services cannot be accessed. In addition, because the terminal apparatus can access a service only via a remote application server, this increases a delay in accessing the service by the terminal apparatus, and reduces communication efficiency.

In view of this, this application provides a domain name system query method. When a terminal apparatus performs domain name query, a core network element determines an IP address of a corresponding application server based on location information of the terminal apparatus and a queried domain name. The IP address of the application server corresponds to both a location of the terminal apparatus and the queried domain name. In this way, the terminal apparatus can obtain an IP address of an application server closest to the terminal apparatus and access a service nearby, thereby improving service access efficiency of the terminal apparatus, reducing a service access delay of the terminal apparatus, and improving communication efficiency.

Figure 4:
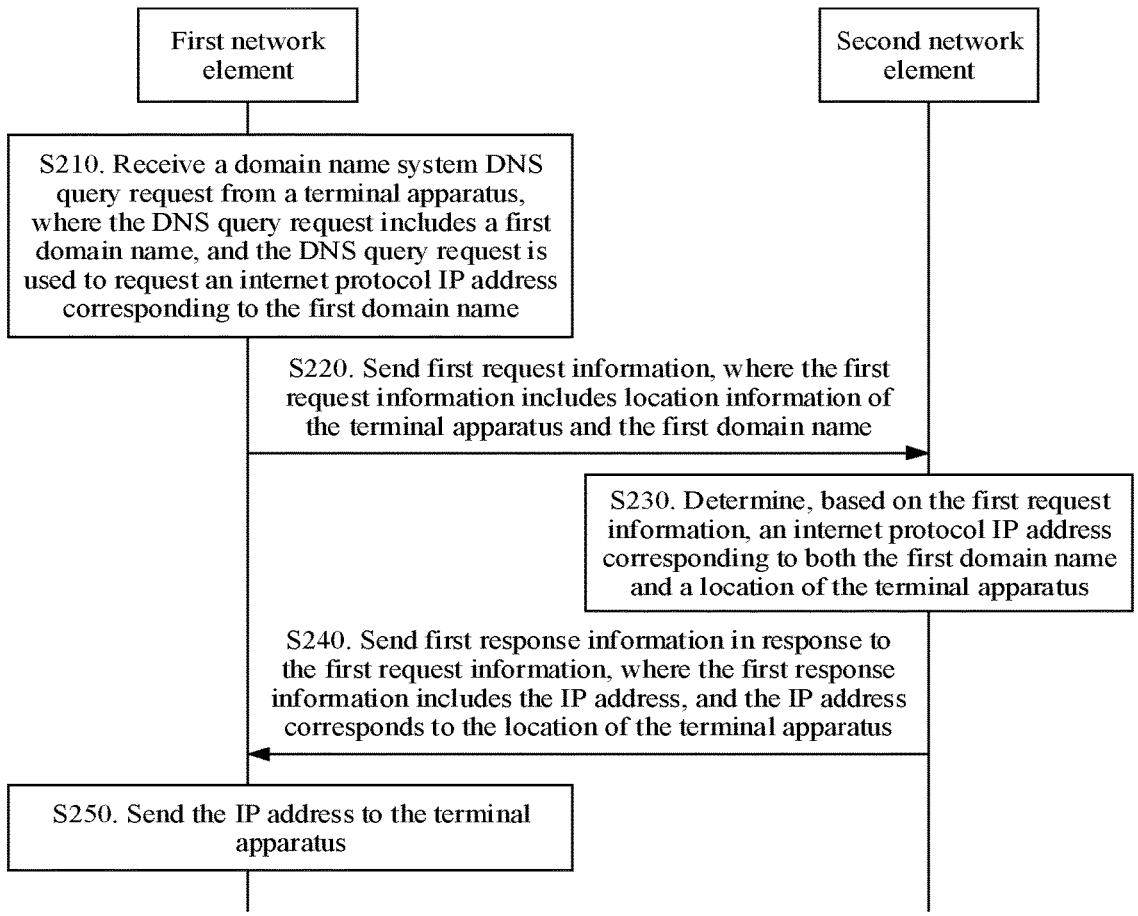
FIG. 4 is a schematic interaction diagram of a domain name system query method according to an embodiment of this application.

The following describes in detail the domain name system query method provided in this application with reference to FIG. 4. FIG. 4 is a schematic flowchart of a domain name system query method 200 according to an embodiment of this application. Descriptions are provided using an example in which the method in this application is performed by a first network element and a second network element. By way of example rather than limitation, the method may alternatively be performed by chips used in the first network element and the second network element.

The method 200 may be applied to the scenarios shown in FIG. 1 and FIG. 2, and certainly may be applied to other communication scenarios. This is not limited in the embodiments of this application.

The method 200 shown in FIG. 4 may include S210 to S250. For explanation of technical features in the embodiment of FIG. 4, refer to related parts in other embodiments of this application. The following describes in detail the steps of the method 200 with reference to FIG. 4.

S210. The first network element receives a DNS query request from a terminal apparatus, where the DNS query request includes a first domain name, and where the DNS query request is used to request an IP address corresponding to the first domain name. Optionally, the DNS query request further includes a destination address, and the destination address may be an address of a DNS server. The first domain name may be a fully qualified domain name (FQDN). For example, if a host name (hostname) of a host is www, and a domain suffix is test.com, a domain name (e.g., FQDN) of the host needs to be www.test.com. The first domain name may alternatively be a domain name in another form. This is not limited in this application.

S220. The first network element sends first request information to the second network element, where the first request information includes location information of the terminal apparatus and the first domain name. Optionally, the first request information further includes the destination address. A type of the first request information may be a DNS query request including the location information of the terminal apparatus and the first domain name.

S230. The second network element determines, based on the first request information, an IP address, which corresponds to the first domain name and a location of the terminal apparatus.

S240. The second network element sends first response information in response to the first request information to the first network element, where the first response information includes the IP address of an application server corresponding to the first domain name, and the IP address of the application server further corresponds to the location of the terminal apparatus. That is, the IP address is an IP address of a local application server that the terminal apparatus can currently access. Correspondingly, the first network element receives the first response information. A type of the first response information may be a DNS response including the IP address of the application server.

S250. The first network element sends the IP address to the terminal apparatus.

In S210, when the terminal apparatus needs to perform DNS query, the terminal apparatus sends the DNS query request (which may also be referred to as a DNS packet) to a core network device. The DNS query request includes the first domain name that the terminal apparatus needs to query. The DNS query request is used to request the IP address corresponding to the first domain name. The IP address corresponding to the first domain name may be understood as an IP address of an application corresponding to the first domain name, and the IP address of the application may be understood as an IP address of an application server or an IP address of an application instance. For example, the terminal apparatus may send the DNS query request to the first network element in a core network via an access network device, where the first network element may be a user plane function network element (which, for example, may be an anchor user plane function network element PSA) or a session management network element (for example, an SMF). The core network device may be the first network element. If the first network element is a session management network element, the terminal apparatus may first send the DNS query request to a user plane function network element, and the user plane function network element may forward the DNS query request to the session management network element. The user plane function network element herein may be understood as an anchor user plane function network element PSA. For example, in the architecture shown in FIG. 2, when a session of the terminal apparatus is initially established, the user plane function network element is equivalent to a remote PSA. Optionally, the DNS query request further includes the destination address, and the destination address is the address (for example, an IP address) of the DNS server. That is, the terminal apparatus needs to finally send the DNS query request to the DNS server.

In S220, after receiving the DNS query request, the first network element obtains the location information of the terminal apparatus, and adds the location information of the terminal apparatus into the DNS query request. Further, the first network element may send the first request information to the second network element, where the first request information includes the location information of the terminal apparatus and the first domain name. The second network element may be any one of a session management network element (for example, an SMF), a policy control function network element (for example, a PCF), an application function network element (for example, an AF), or the DNS server. Optionally, the first request information further includes the destination address. The type of the first request information may be the DNS query request including the location information of the terminal apparatus and the first domain name.

For example, when the first network element is the user plane function network element, the second network element may be any one of the session management network element, the policy control function network element, the application function network element, or the DNS server. In this case, that the first network element obtains the location information of the terminal may be that the first network element obtains the location information of the terminal from the session management network element or another network element. This is not limited in this application. For another example, when the first network element is the session management network element, the second network element may be any one of the policy control function network element, the application function network element, or the DNS server. In this case, that the first network element obtains the location information of the terminal may be that the first network element obtains the location information of the terminal from a mobility management network element or another network element. This is not limited in this application. An implementation method for adding the location information of the terminal apparatus into the DNS query request by the first network element may be as follows: The first network element may add the location information of the terminal apparatus into a DNS query request (DNS packet) option. Alternatively, because the transmission control protocol (TCP) may carry a DNS packet, the first network element may add the location information of the terminal apparatus into a TCP option. This is not limited in this application. Further, the location information of the terminal apparatus may be sent as a separate message or included in another message.

Optionally, in an implementation, the first network element may send the location information of the terminal apparatus to the DNS server after sending the DNS query request to the DNS server. In other words, the first network element may send the DNS query request and the location information of the terminal apparatus to the DNS server via a plurality of messages. This is not limited in this application.

For example, the location information of the terminal apparatus may include a tracking area identity (TAI) of the terminal apparatus and/or identification information of a fourth network element. The identification information of the fourth network element includes an IP address of a user plane function network element (the fourth network element) or an identifier (ID) of the user plane function network element (the fourth network element). It should be noted that the user plane function network element herein is a UPF connected to a management platform on which the application server corresponding to the first domain name is located. This may be understood as that the user plane function network element may access the management platform on which the application server corresponding to the first domain name is located. The identification information of the fourth network element may alternatively be an IP address of a radio access network (the fourth network element) accessed by the terminal apparatus or an ID of the radio access network (the fourth network element) accessed by the terminal apparatus. Optionally, the location information of the terminal apparatus may further include a deployment location of the MEC platform on which the application server corresponding to the first domain name and that can be currently accessed by the terminal apparatus is located or a deployment location of the application server, corresponding to the first domain name, deployed on the MEC platform that can be currently accessed by the terminal apparatus.

In some possible implementations of this application, when a 3rd Generation Partnership Project (3GPP) network interacts with the MEC platform, a network address translation (NAT) gateway may be deployed at an ingress of the MEC platform. The NAT gateway replaces an internal network IP address with an egress IP address to ensure public network reachability and upper-layer protocol connectivity. For example, in the architecture shown in FIG. 1, it is assumed that the UPF 1 may access a DNS server, and the UPF 2 may access an MEC platform. The UPF 1 may be the first network element, and the UPF 2 may be the fourth network element. If NAT translation is used at an N6 interface connecting to the MEC platform, before NAT translation is performed on the IP address of the UPF 2, the IP address of the UPF 2 is a private IP address. If the first network element directly sends the private IP address to the second network element (where the DNS server is used as an example for description), the DNS server does not understand the private IP address, and cannot determine the location information of the terminal apparatus based on the private IP address. That is, the IP address of the UPF 2 cannot be used to represent the location information of the terminal apparatus. In this case, the location information of the terminal apparatus added into the DNS query request needs to be a public IP address (an IP address obtained by performing NAT translation at the N6 interface) obtained by performing NAT translation on the address of the UPF 2. In this way, the DNS server can determine the current location information of the terminal apparatus based on the public IP address. That is, the location information of the terminal apparatus may further include a first IP address, the first IP address points to the management platform on which the application server corresponding to the first domain name is located, and a location of the management platform corresponds to the location of the terminal apparatus. This may be understood as that an application server is deployed on the MEC platform, wherein the application server is the application server that corresponds to the first domain name and that is requested using the DNS query request. For example, the UPF 2 may be connected to the management platform on which the application (the application server) corresponding to the first domain name is located. In this case, the first IP address may be a public IP address obtained by performing NAT translation on the private IP address of the UPF 2.

That is, when the NAT gateway is deployed at the ingress of the MEC platform, the first network element needs to send, to the second network element, the public IP address obtained by the UPF 2 (the fourth network element) by performing NAT translation, such that the second network element determines the location of the terminal apparatus based on the public IP address. That is, the location information of the terminal apparatus may alternatively include an IP address pointing to the management platform on which the application corresponding to the first domain name is located. In S230, the second network element determines, based on the first request information, the IP address, which corresponds to the first domain name and the location of the terminal apparatus. The first domain name may correspond to a plurality of application servers deployed in different locations (for example, on different MEC platforms), and a deployment location of an application server may be represented by an MEC platform identifier. The MEC platform identifier is used to uniquely identify one MEC platform. For example, the MEC platform identifier may be a data network access identifier (DNAI) supported by a UPF network element deployed on an MEC platform, or a DNAI supported by a UPF network element connected to the MEC platform. This is not specifically limited in the embodiments of this application. Therefore, different DNAIs may represent different MEC platforms, and further may represent deployment locations of application servers deployed on different MEC platforms. A deployment location (a first DNAI) of a first application server in deployment locations of a plurality of application servers corresponds to the location of the terminal apparatus. That is, the first application server is the application server corresponding to both the location of the terminal apparatus and the domain name requested by the terminal apparatus. For example, the deployment location of the first application server is closest to the current location of the terminal apparatus, or an MEC platform on which the first application server is located is closest to the current location of the terminal apparatus. An IP address of the first application server is the IP address requested by the terminal apparatus in S210. With reference to the example shown in FIG. 3, it is assumed that the first domain name is a domain name A, application servers corresponding to the domain name A are deployed on two different MEC platforms: an MEC platform 1 (whose deployment location is indicated by a DNAI 1) and an MEC Platform 2 (whose deployment location is indicated by a DNAI 2), and IP addresses of the two application servers deployed on the two MEC platforms are IP-3A and IP-1. Assuming that the application server whose address is IP-3A is deployed on the MEC platform 1, the application server whose address is IP-1 is deployed on the MEC platform 2, and the current location of the terminal apparatus is closest to the MEC platform 2 or a deployment location of an MEC platform corresponding to the current location of the terminal apparatus is the DNAI 2. The first application server is the application server whose address is IP-1.

In S240, after the second network element determines the IP address of the application server corresponding to both the location of the terminal apparatus and the first domain name, the second network element sends the IP address of the application server to the first network element. For example, the second network element may send the first response information in response to the first request information to the first network element, where the first response information includes the IP address. The type of the first response information may be the DNS response including the IP address of the application server.

In S250, after receiving the IP address, the first network element may send the IP address to the terminal apparatus. For example, if the first network element is a user plane function network element, the user plane function network element sends the IP address of the application server to the terminal apparatus via an access network device. If the first network element is a session management network element, the session management network element sends the IP address of the application server to a user plane function network element. The user plane function network element sends the IP address of the application server to the terminal apparatus via an access network device. In this way, the terminal apparatus may access a service and data nearby using the IP address of the application server.

According to the domain name system query method provided in this application, the first network element adds the location information of the terminal apparatus into the DNS query request and sends the DNS query request to the second network element, and the second network element determines, based on the location information of the terminal apparatus and a requested domain name, an IP address of an application server corresponding to both the location of the terminal apparatus and the requested domain name, and feeds back the IP address to the terminal apparatus. In this way, the terminal apparatus accesses a service nearby via the application server. This avoids a problem that a service is limited or some services cannot be accessed when the terminal apparatus accesses services via an application server that is far from the terminal apparatus, improving service access quality of the terminal apparatus. In addition, because the terminal apparatus can access the service nearby, a service access delay of the terminal apparatus is reduced, and communication efficiency is improved.

Figure 5:
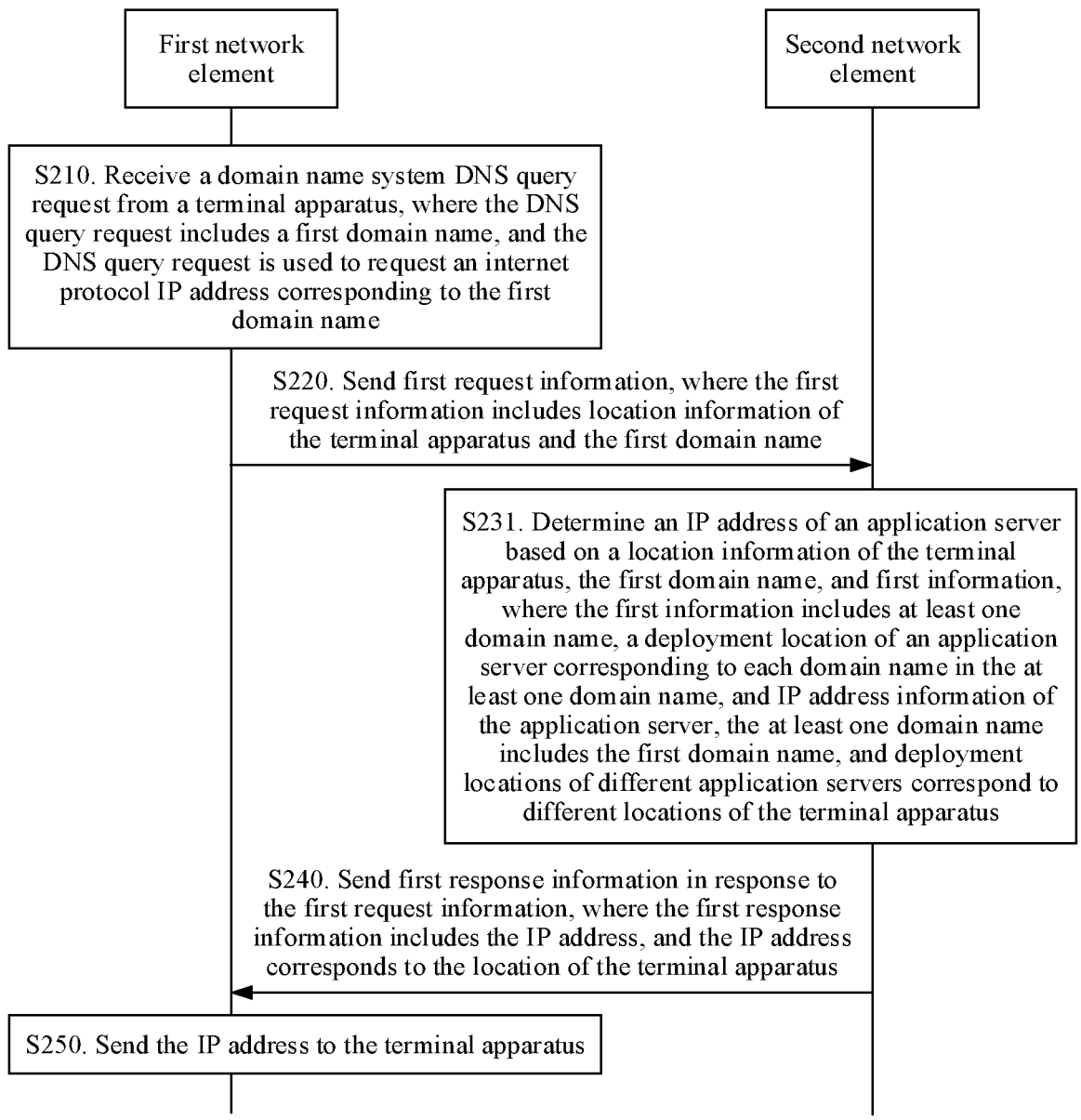
FIG. 5 is a schematic interaction diagram of another domain name system query method according to an embodiment of this application.

In a possible implementation, FIG. 5 is used as an example. Based on the method steps shown in FIG. 4, S230 that the second network element determines, based on the first request information, the IP address which corresponds to the first domain name and the location of the terminal apparatus in the method 200 includes S231.

S231. The second network element determines the IP address of the application server based on the location information of the terminal apparatus, the first domain name, and first information. The first information includes at least one domain name, a deployment location of an application server corresponding to each domain name in the at least one domain name, and IP address information of the application server deployed in the deployment location of the application server, where the at least one domain name includes the first domain name. Deployment locations of different application servers correspond to different locations of the terminal apparatus.

For descriptions of S210, S220, S240, and S250 shown in FIG. 5, refer to the foregoing descriptions of these steps. For brevity, details are not described herein again.

In S231, the second network element may determine the IP address of the application server based on the location information of the terminal apparatus, the first domain name, and the first information. For example, the location information of the terminal apparatus may include at least one of a TAI of the terminal apparatus, a DNAI, identification information of a fourth network element, or a first IP address.

The DNAI is used to identify a location of the application server corresponding to the first domain name. Alternatively, the DNAI is used to identify a location of a management platform on which the application server corresponding to the first domain name is located. The fourth network element includes a user plane function network element or a radio access network element. The user plane function network element is a user plane function network element connected to the management platform on which the application server corresponding to the first domain name is located. This may be understood as that the user plane function network element may access the management platform on which the application server corresponding to the first domain name is located. The radio access network element is a radio access network element currently accessed by the terminal apparatus. The first IP address points to the management platform on which the application server corresponding to the first domain name is located, and the location of the management platform corresponds to the location of the terminal apparatus. It should be understood that, in this embodiment of this application, meanings corresponding to the location of the management platform and the location of the terminal apparatus may include the following two types.

(1) If there are a plurality of locations of management platforms on which application servers corresponding to the first domain name are deployed, the management platform corresponding to the location of the terminal apparatus may be a management platform closest to the location of the terminal apparatus.

(2) If there are a plurality of locations of management platforms on which application servers corresponding to the first domain name are deployed, the management platform corresponding to the location of the terminal apparatus may be a management platform determined by considering other factors such as load on the management platforms or resource statuses of the application servers, as well as the location information of the terminal apparatus.

The identification information of the fourth network element includes an IP address of a user plane function network element (the fourth network element) or an ID of a user plane function network element (the fourth network element). It should be noted that, when there is only one anchor for a PDU session of the terminal apparatus, the user plane function network element herein may be a PDU session anchor connected to the management platform or an intermediate UPF connected to a radio access network device.

When there are a plurality of anchors for a PDU session of the terminal apparatus, for example, in a UL CL/BP scenario, the user plane function network element herein may be a UL CL or a BP that accesses the management platform, or may be a PDU session anchor that accesses the management platform. The identification information of the fourth network element may alternatively be an IP address of a radio access network (the fourth network element) accessed by the terminal or an ID of the radio access network (the fourth network element) accessed by the terminal. The first IP address points to the management platform on which the application server corresponding to the first domain name is located. The location of the management platform corresponds to the location of the terminal apparatus. Optionally, the location information of the terminal apparatus may further include a deployment location (identified by a DNAI) of an MEC platform on which the application server corresponding to the first domain name and that can be currently accessed by the terminal apparatus is located or a deployment location (identified by a DNAI) of an application server, corresponding to the first domain name, deployed on an MEC platform that can be currently accessed by the terminal apparatus.

It should be understood that, in the embodiments of this application, the management platform on which the application server corresponding to the first domain name is located is determined based on the location of the terminal apparatus, that is, the location of the management platform is determined based on the location of the terminal apparatus. In this case, any one of a DNAI used to identify the management platform, identification information of a user plane function network element connected to the management platform, or an IP address pointing to the management platform may be used to indicate the location information of the terminal apparatus.

It should be further understood that, in the embodiments of this application, either the location of the management platform or the location of the application server corresponds to the current location of the terminal apparatus. The management platform, the MEC management platform, and the MEC platform in this application have the same meanings or functions, and can all manage a plurality of applications and provide services for a plurality of applications.

A mapping relationship or a correspondence may exist between the TAI of the terminal apparatus and a deployment location of the MEC platform or a deployment location of the application server (for example, a DNAI), and the correspondence may be a one-to-one correspondence. The deployment location of the MEC platform or the deployment location of the application server may be determined based on the TAI of the terminal apparatus. The second network element may obtain and store the first information. The first information may include the at least one domain name, the deployment location of the application server corresponding to each domain name in the at least one domain name, and the IP address information of the application server. Optionally, the first information may further include a correspondence between the first IP address and the deployment location of the MEC platform or the deployment location of the application server. The at least one domain name includes the first domain name. Different application servers are deployed in different locations. In this embodiment of this application, one domain name may correspond to a plurality of application servers (IP addresses of the plurality of application servers). The second network element may uniquely determine the deployment location of the MEC platform or the deployment location of the application server based on the location information of the terminal apparatus. Application servers or application instances corresponding to a plurality of domain names may be deployed in a deployment location of one MEC platform or in a deployment location of one application server, but there is only one application server or application instance corresponding to one domain name. Further, the second network element may determine, based on the first domain name, the IP address of the application server corresponding to the first domain name, that is, the IP address corresponding to both the first domain name and the location of the terminal apparatus is determined.

An example is used below for description. Table 1 is an example of content included in the first information. As shown in Table 1, the first information includes two applications (e.g., applications A and B), which correspond to two domain names: a domain name A and a domain name B. The domain name A corresponds to two application servers. It is assumed that IP addresses of the two application servers are IP-3A and IP-1. The two application servers are deployed in different locations, for example, on different MEC platforms. It is assumed that an application server whose address is IP-3A is deployed on an MEC platform 1, an application server whose address is IP-1 is deployed on an MEC platform 2, and the location of the terminal apparatus is closer to the MEC platform 2, or the MEC platform 2 is closer to the current location of the terminal apparatus. The domain name B corresponds to one application server, which indicates that the application server is deployed in only one location or on only one MEC platform. An IP address of the application server corresponding to the domain name B is IP-3B, and the application server is also deployed on the MEC platform 2. Optionally, the deployment location of the application server or the deployment location of the MEC platform on which the application server is located may be represented using a data network access identifier (DNAI), and different DNAIs indicate deployment locations of different MEC platforms or application servers. It is assumed that the application server deployed on the MEC platform 2 is represented using a DNAI 2, and the application server deployed on the MEC platform 1 is represented using a DNAI 1.

TABLE 1

| Application | Domain name | Deployment location of an application server | IP address of an application server |
| --- | --- | --- | --- |
| Application 1 | Domain name A (for example, www.xxx.com) | DNAI 2 (MEC platform 2) | IP-1 |
| | Domain name A (for example, www.xxx.com) | DNAI 1 (MEC platform 1) | IP-3A |
| Application 2 | Domain name B (for example, www.yyy.com) | DNAI 2 (MEC platform 2) | IP-3B |

With reference to the example in Table 1, the DNS query request carries the domain name A that the terminal apparatus needs to query. It is assumed that the location of the terminal apparatus is closer to the MEC platform 2. The first request information sent by the first network element to the second network element includes the domain name A and the location information of the terminal apparatus. The second network element determines, based on the domain name A, that IP addresses of corresponding application servers are IP-3A of an application server deployed on the MEC platform 1 and IP-1 of an application server deployed on the MEC platform 2, where DNAIs corresponding to the two application servers are different. The second network element further determines, based on the location information of the terminal apparatus, the deployment location of the MEC platform or the deployment location of the application server that can be currently accessed by the terminal apparatus, that is, determines that a DNAI corresponding to the current location of the terminal apparatus is the DNAI 2 (the MEC platform 2). In this way, the second network element may determine that the IP address of the application server corresponding to both the location of the terminal apparatus and the requested domain name is IP-1, and then feed back IP-1 to the terminal apparatus.

It should be understood that Table 1 is merely an example, and should not constitute any limitation on this embodiment of this application. For example, the first information may further include more domain names. There may be more deployment locations of application servers corresponding to a domain name. For example, there may be more deployment locations of an MEC platform. Application servers corresponding to more different domain names can be deployed in a deployment location. In addition to the foregoing DNAI, another parameter may alternatively be used to represent the deployment location of the application server. This is not limited herein in this embodiment of this application.

In the foregoing implementation, the second network element determines, based on the location information of the terminal apparatus, the domain name requested by the terminal apparatus, and the first information, the IP address of the application server corresponding to both the location of the terminal apparatus and the requested domain name. In this way, the determined IP address of the application server can be more accurate, and efficiency of determining the application server can be improved.

It should be understood that, in this embodiment of this application, if the first network element is a user plane function network element, the user plane function network element may request the location information of the terminal apparatus from a session management network element before sending the first request information, add the location information of the terminal apparatus into the first request information, and send the first request information to the second network element. If the first network element is a session management network element, the session management network element may obtain the location information of the terminal apparatus by itself, and add the location information of the terminal apparatus into the first request information.

It should be further understood that the first request information sent by the first network element to the second network element may not include the location information of the terminal apparatus. In this case, the second network element may obtain the location information of the terminal apparatus by itself. For example, if the second network element is a session management network element, the first request information may not include the location information of the terminal apparatus, and the session management network element may obtain the location information of the terminal apparatus by itself. For example, the session management network element may obtain the TAI of the terminal apparatus from an AMF. In addition, the session management network element may further subscribe to the TAI of the terminal apparatus from the AMF. When the terminal apparatus moves, the AMF may provide the session management network element with a latest TAI of the terminal apparatus. In this way, the session management network element may determine the location information of the terminal apparatus based on the TAI of the terminal apparatus. For another example, assuming that the second network element is a DNS server, the DNS server may receive the location information of the terminal apparatus sent by an application function network element (for example, an AF). For another example, assuming that the second network element is an application function network element, the application function network element may obtain the location information of the terminal apparatus from a core network device based on capability exposure information. For descriptions of the location information of the terminal apparatus, refer to S231. Details are not described herein again.

The second network element may obtain and store the first information. For example, if the second network element is a session management network element, the session management network element may receive the first information sent by a policy control function network element (for example, a PCF) or an application function network element (for example, an AF). For example, the application function network element may store the first information in a UDR, and the policy control function network element may request the first information from the UDR and store the first information. Alternatively, the session management network element may request the first information from a policy control function network element, and store the first information. For another example, assuming that the second network element is a DNS server, the DNS server may receive the first information sent by an application function network element (for example, an AF). Alternatively, the first information may be preconfigured in the DNS server. It should be understood that a manner in which the second network element obtains the first information is not limited in this embodiment of this application.

Figure 6:
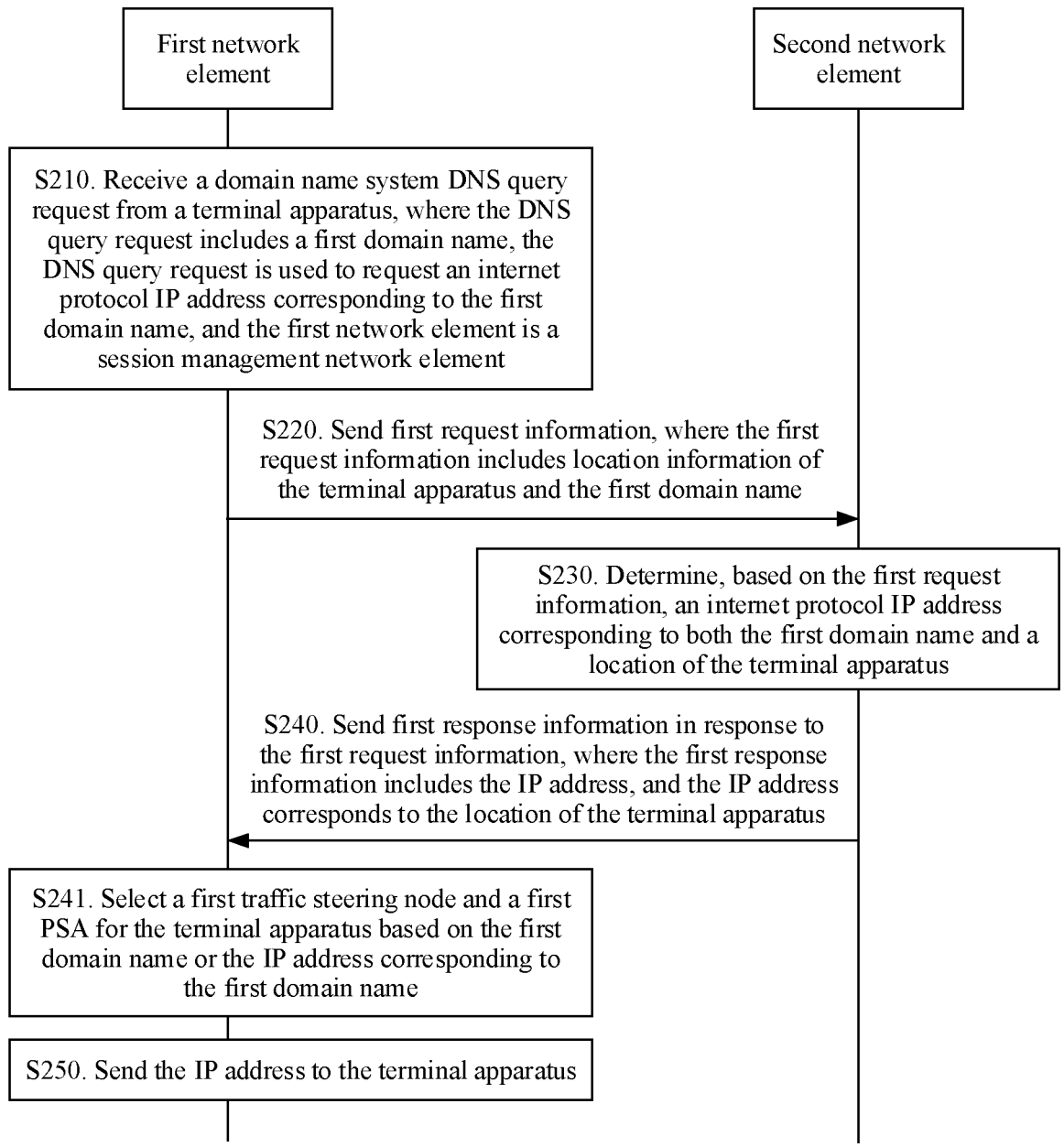
FIG. 6 is a schematic interaction diagram of still another domain name system query method according to an embodiment of this application.

In some possible implementations of this application, if the first network element is a session management network element, the second network element is any one of a policy control function network element, an application function network element, or a DNS server. FIG. 6 is used as an example. Based on the method steps shown in FIG. 4, the method includes S241.

S241. The first network element selects a first traffic steering node and a first protocol data unit session anchor PSA for the terminal apparatus based on the first domain name or the IP address corresponding to the first domain name.

For descriptions of S210 to S250 shown in FIG. 6, refer to descriptions of the steps in FIG. 4 and FIG. 5. For brevity, details are not described herein again.

In S241, if the first network element is the session management network element (for example, an SMF), the second network element is any one of the policy control function network element, the application function network element, or the DNS server. In this case, the first network element may select the first traffic steering node and the first protocol data unit session anchor PSA for the terminal apparatus based on the first domain name requested by the terminal apparatus or the IP address of the application server corresponding to both the first domain name and fed back by the second network element. After the traffic steering node and the PSA are inserted, the terminal apparatus may access, via the PSA, the application server corresponding to the first domain name. This can optimize a data transmission route, reduce a data transmission delay, and improve data transmission efficiency.

In a possible implementation, the session management network element may perform S241 after step S210, that is, determine, after receiving the DNS query request from the terminal apparatus, to select the first traffic steering node and the first PSA for the terminal apparatus based on the first domain name included in the DNS query request. A method for determining the first domain name by the SMF network element may be as follows: The SMF network element may preconfigure a domain name list, or the SMF network element receives a policy message from a PCF network element, where the policy message includes a domain name list, and where the domain name list includes one or more domain names. As long as the domain name included in the DNS query request received by the SMF network element belongs to the domain name list, the SMF network element determines that the domain name included in the DNS query request is the first domain name. For example, with reference to the example in Table 1, if the first domain name requested by the terminal apparatus is a domain name corresponding to the application deployed on the MEC platform 2, the session management network element may select the first traffic steering node and the first protocol data unit session anchor PSA for the terminal apparatus based on the first domain name. The first traffic steering node may be the foregoing UL CL or BP, and the first PSA may be a UPF.

Optionally, the DNS query request may further include a destination address, and the destination address may be an address of the DNS server. The SMF may further determine, based on the destination address included in the DNS query request, to select the first traffic steering node and the first PSA for the terminal apparatus, where the destination address may be the address of the DNS server. When the SMF determines that the address of the DNS server points to a third party (for example, Tencent or Alibaba), and an application server of the third party is deployed in a current location, the SMF determines to select the first traffic steering node and the first PSA for the terminal apparatus. According to the foregoing method, the terminal apparatus can access a service nearby via the PSA, thereby optimizing a data transmission route, and reducing a data transmission delay. The SMF does not need to wait to insert the UL CL or the BP until the second network element sends the response information, such that signaling overheads can be reduced.

In another possible implementation, the session management network element may select the first traffic steering node and the first protocol data unit session anchor PSA for the terminal apparatus based on the IP address of the application server fed back by the second network element in S240. In this case, S241 may be performed after S240. That is, after the first response information fed back by the second network element is received, the first traffic steering node and the first protocol data unit session anchor PSA are selected for the terminal apparatus based on the IP address in the first response information. A method for selecting the first traffic steering node and the first protocol data unit session anchor PSA by the SMF network element for the terminal apparatus based on the IP address of the application server may be as follows: The SMF network element may preconfigure an IP address list, or the SMF network element receives a policy message from a PCF network element, where the policy message includes an IP address list, and where the IP address list includes one or more IP addresses. As long as an IP address of an application server fed back by the second network element belongs to the IP address list, the SMF network element selects the first traffic steering node and the first protocol data unit session anchor PSA for the terminal apparatus based on the IP address. For example, with reference to the example in Table 1, if the IP address included in the first response information is the IP address (IP-1) of the application server deployed on the MEC platform 2 and corresponding to the first domain name, the session management network element may select the first traffic steering node and the first protocol data unit session anchor PSA for the terminal apparatus based on the IP address, where the first traffic steering node may be a UL CL or a BP. The first traffic steering node and the first PSA are selected for the terminal apparatus based on the IP address carried in the first response information fed back by the second network element, such that accuracy of the inserted first traffic steering node and the inserted first PSA can be improved. This prevents a traffic steering node and a PSA from being inserted again for an unnecessary domain name and an application deployment location in which insertion of the traffic steering node and the PSA has been performed, thereby avoiding a waste of communication resources, and improving communication efficiency.

For example, in the example shown in Table 1, if the IP address carried in the first response information fed back by the second network element is an IP address (IP-1) of an application server deployed on an MEC platform 2 and corresponding to the first domain name. It is assumed that only a remote PSA exists when the terminal apparatus initially establishes a PDU session. After obtaining the IP address (IP-1) of the application server deployed on the MEC platform 2 and corresponding to the first domain name, the terminal apparatus still needs to access the application server (assumed to be a first application server) via a remote PSA. A data transmission route is as follows: Terminal apparatus↔Access network device↔Remote PSA↔First application server. However, the remote PSA and the first application server are generally deployed in different locations. As a result, a data transmission path is not optimal, and a data transmission delay is large. Therefore, the session management network element selects the first traffic steering node and inserts the first PSA. A deployment location of the first PSA may be a deployment location (the MEC platform 2) close to the first application server, or the first PSA may be deployed on the MEC platform 2. The session management network element may insert the first PSA (the UPF) using a UL CL or a BP. After the first PSA is inserted, the terminal apparatus may access the first application server using the newly inserted first PSA. A data transmission route is as follows: Terminal apparatus↔Access network device↔First PSA↔First application server. This can optimize a data transmission route, reduce a data transmission delay, and improve data transmission efficiency.

Figure 7:
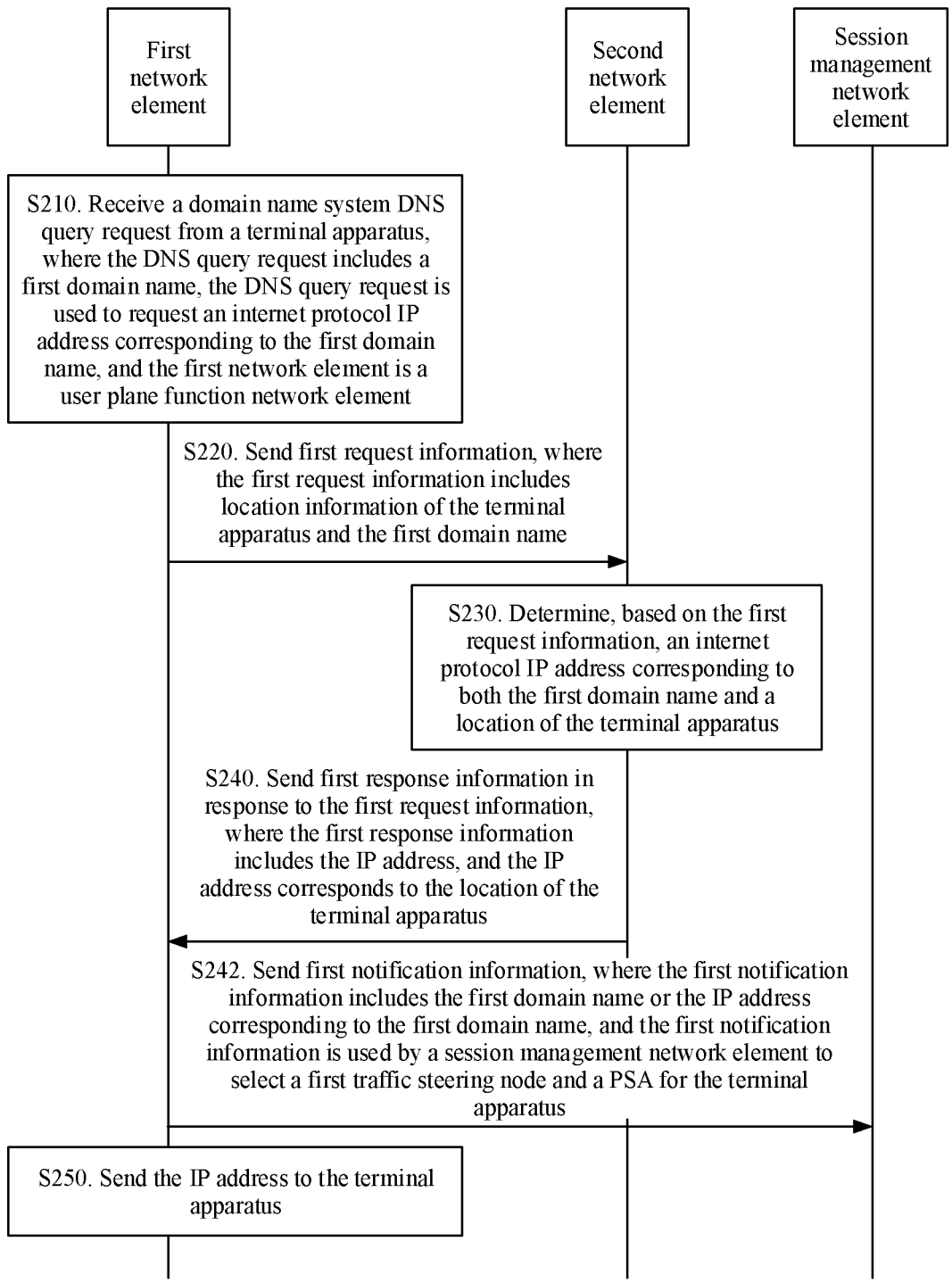
FIG. 7 is a schematic interaction diagram of still another domain name system query method according to an embodiment of this application.

In some other possible implementations of this application, if the first network element is a user plane function network element, the second network element is any one of a policy control function network element, a session management network element, an application function network element element, or a DNS server. FIG. 7 is used as an example. Based on the method steps shown in FIG. 4, the method includes S242.

S242. The first network element sends first notification information to a session management network element, where the first notification information includes at least one of the first domain name, the destination address, or the IP address corresponding to the first domain name. The first notification information is used by the session management network element to select a first traffic steering node and a first protocol data unit session anchor PSA for the terminal apparatus.

In S242, if the first network element is the user plane function network element (for example, a UPF), the second network element is any one of the policy control function network element, a session management network element, the application function network element, or the DNS server. In this case, the first network element may send the first notification information to a session management network element, where the first notification information includes one or more of the first domain name, the IP address corresponding to the first domain name, or the destination address (an address of the DNS server). The first notification information is used by the session management network element to select a first traffic steering node and a first protocol data unit session anchor PSA for the terminal apparatus.

A possible implementation of S242 is as follows: The user plane function network element sends the first notification information to the session management network element based on the first domain name requested by the terminal apparatus or based on the destination address included in the DNS query request. In this case, S242 may be performed after S210. That is, the first notification information is sent to the session management network element based on the first domain name or the destination address included in the DNS query request only after step S210 of receiving the DNS query request from the terminal apparatus is performed, to indicate the session management network element to select the first traffic steering node and the first PSA for the terminal apparatus. A method for determining, by the user plane function network element, to send the first notification information to the session management network element may be as follows: Before the user plane function network element sends the first notification information to the session management network element, the user plane function network element may preconfigure a first rule, or the user plane function network element receives a first rule from the session management network element. When the first domain name or the destination address meets the first rule, the user plane function network element sends the first notification information to the session management network element.

For example, the first rule includes a destination address list, the destination address list includes one or more destination addresses, and the first rule is that the destination address included in the DNS query request received by the user plane function network element is included in the destination address list. When the first rule is met, the user plane function network element determines to send the first notification information to the session management network element. In other words, if the user plane function network element determines that the destination address included in the DNS query request meets a condition for sending the first notification information to the session management network element, the user plane function network element sends the first notification information to the session management network element. The condition may be that the destination address included in the DNS query request is any destination address included in the first rule.

For another example, the first rule includes a domain name list, the domain name list includes one or more domain names, and the first rule is that the domain name included in the DNS query request received by the user plane function network element is included in the domain name list. When the first rule is met, the user plane function network element determines that a domain name included in the DNS query request is the first domain name. In other words, if the user plane function network element determines that the first domain name included in the DNS query request meets a condition for sending the first notification information to the session management network element, the user plane function network element sends the first notification information to the session management network element. The condition may be that the first domain name included in the DNS query request is any domain name included in the first rule. For example, with reference to the example in Table 1, if the first domain name requested by the terminal apparatus is the domain name A, after obtaining the domain name, the user plane function network element may directly send the first notification information to the session management network element, without waiting for the second network element to send the response information. This reduces a delay in notifying the session management network element by the user plane function network element, reduces signaling overheads, and improves resource utilization.

Another possible implementation of S242 is as follows: The user plane function network element may send the first notification information to the session management network element based on the IP address of the application server fed back by the second network element in S240. A method for determining, by the user plane function network element, to send the first notification information to the session management network may be as follows: The user plane function network element may preconfigure a first rule, or the user plane function network element receives a first rule from the session management network element. When the IP address of the application server meets the first rule, that is, the IP address is included in an address list, the user plane function network element sends the first notification information to the session management network element. For example, the first rule may further include an IP address list. The IP address list includes one or more IP addresses. As long as the IP address of the application server fed back by the second network element belongs to the IP address list, the user plane function network element sends the first notification information to the session management network based on the IP address. In other words, if the user plane function network element determines that the IP address of the application server fed back by the second network element meets a condition for sending the first notification information to the session management network element, the user plane function network element sends the first notification information to the session management network element. The condition may be that the IP address of the application server is any IP address included in the first rule. In this case, S242 may be performed after S240, that is, steps S210, S220, S230, and S240 need to be performed. After receiving the first response information fed back by the second network element, the first notification information is sent to the session management network element based on the IP address in the first response information, to indicate the session management network element to select the first traffic steering node and the first PSA for the terminal apparatus. For example, with reference to the example in Table 1, if the IP address included in the first response information is the IP address (IP-1) of the application server deployed on the MEC platform 2 and corresponding to the first domain name, the user plane function network element sends the first notification information to the session management network element, where the first notification information includes the IP address. This can improve accuracy of sending the notification information by the user plane function network element to the session management network element, prevent a waste of communication resources, and improve communication efficiency. The session management network element may select the first traffic steering node and the first PSA for the terminal apparatus based on the first notification information. For a description, refer to the description in S241. For brevity, details are not described herein again.

Figure 8:
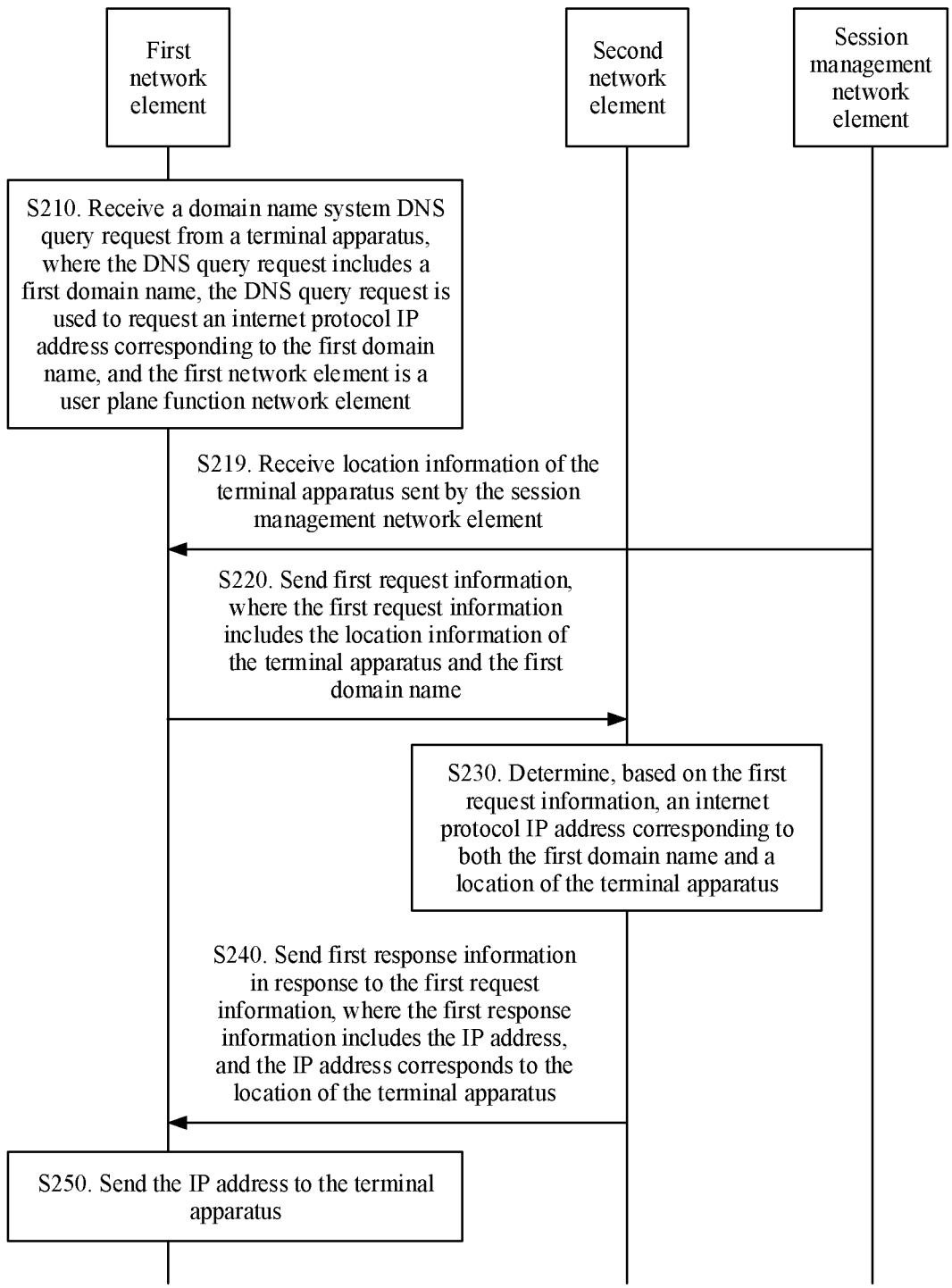
FIG. 8 is a schematic interaction diagram of still another domain name system query method according to an embodiment of this application.

In some possible implementations of this application, if the first network element is a user plane function network element, the second network element is any one of a policy control function network element, an application function network element, or a DNS server. FIG. 8 is used as an example. Based on the method steps shown in FIG. 4, the method includes S219.

S219. The first network element receives the location information of the terminal apparatus sent by the session management network element.

For example, if the first network element is the user plane function network element, before S220, the user plane function network element may first obtain the location information of the terminal apparatus from the session management network element. For example, the user plane function network element may receive the location information of the terminal apparatus sent by the session management network element (for example, an SMF). Therefore, the location information of the terminal apparatus may be added into the foregoing first request information and sent to the second network element. In this way, complexity of obtaining, by the first network element, the location information of the terminal apparatus is reduced, implementation is facilitated, and accuracy of the obtained location information of the terminal apparatus is improved.

According to the domain name system query method provided in this application, the first network element adds the location information of the terminal apparatus into the DNS query request and sends the DNS query request to the second network element. The second network element determines, based on the location of the terminal apparatus and the requested domain name, the IP address of the application server corresponding to both the location of the terminal apparatus and the domain name, and feeds back the IP address to the terminal apparatus. In this way, the terminal apparatus can access a service nearby via the application server. This improves service access quality of the terminal apparatus. In addition, because the terminal apparatus can access the service nearby, a service access delay of the terminal apparatus is reduced, and communication efficiency is improved.

Figure 9:
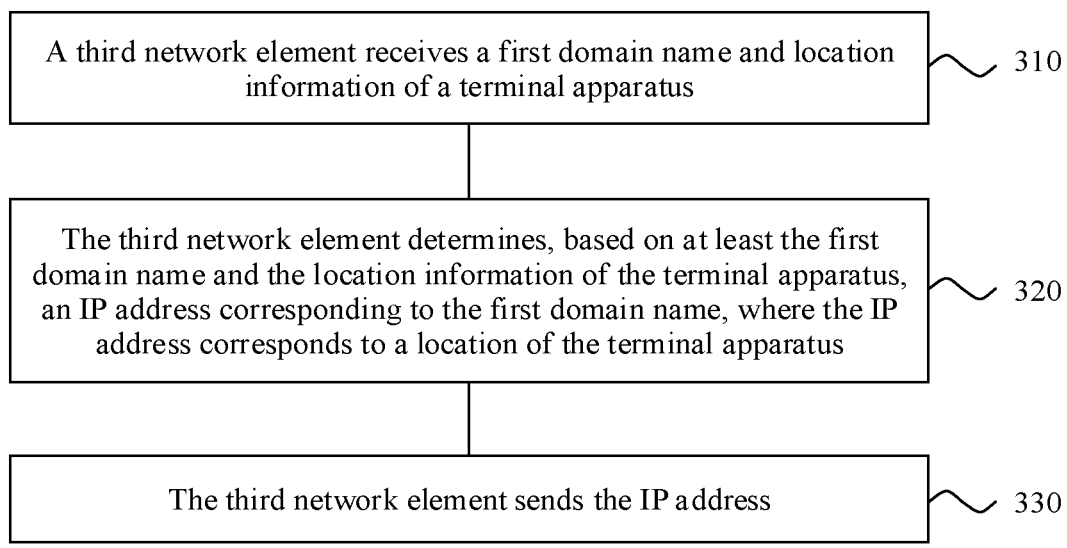
FIG. 9 is a schematic interaction diagram of still another domain name system query method according to an embodiment of this application.

FIG. 9 is a schematic flowchart of a domain name system query method 300 according to another embodiment of this application. The method 300 may be applied to the scenarios shown in FIG. 1 and FIG. 2, and certainly may be applied to another communication scenario. This is not limited in the embodiments of this application.

The method 300 shown in FIG. 9 may include S310 to S330. The following describes in detail the steps of the method 300 with reference to FIG. 9.

S310. A third network element receives a first domain name and location information of a terminal apparatus.

S320. The third network element determines, based on at least the first domain name and the location information of the terminal apparatus, an IP address corresponding to the first domain name, where the IP address corresponds to a location of the terminal apparatus.

S330. The third network element sends the IP address.

In S310, when the terminal apparatus needs to perform DNS query, the terminal apparatus sends a DNS query request to a core network device. The DNS query request includes the first domain name that the terminal apparatus needs to query. For example, the terminal apparatus may send the DNS query request to a user plane function network element (for example, a PSA) via an access network device. For example, when a session of the terminal apparatus is initially established, the user plane function network element is equivalent to a remote PSA. After receiving the DNS query request, the user plane function network element sends the first domain name to the third network element. The third network element may be any one of a policy control function network element, an application function network element, a session management network element, or a DNS server. For example, the user plane function network element may forward the DNS query request from the terminal apparatus to the third network element. In S310, the third network element receives the first domain name and the location information of the terminal apparatus. For descriptions related to the location information of the terminal apparatus, refer to the related descriptions in S231. For brevity, details are not described herein again.

The first domain name and the location information of the terminal apparatus may be sent by a same network element to the third network element. For example, if the third network element is a DNS server, the first domain name and the location information of the terminal apparatus may be sent by a session management network element or a user plane function network element to the DNS server. Certainly, the first domain name and the location information of the terminal apparatus may be separately sent by different network elements to the third network element. For example, if the third network element is a DNS server, the first domain name may be sent by a session management network element or a user plane function network element to the DNS server, and the location information of the terminal apparatus may be sent by an application management network element to the DNS server. This is not limited in this application.

In S320, the third network element determines, based on at least the first domain name and the location information of the terminal apparatus, the IP address corresponding to the first domain name, where the IP address corresponds to the location of the terminal apparatus. For a process of S320, refer to the foregoing descriptions of S231. For brevity, details are not described herein again.

Optionally, in S320, the third network element may further determine, based on the first domain name, the location information of the terminal apparatus, and first information, the IP address corresponding to the first domain name. The first information includes at least one domain name, a deployment location (which, for example, may be represented by an MEC platform identifier or a DNAI) of an application server corresponding to each domain name in the at least one domain name, an IP address of the application server in the deployment location of the application, where the at least one domain name includes the first domain name. Optionally, the first information may further include a correspondence between the first IP address and the deployment location of the MEC platform or the deployment location of the application server.

In S330, after the third network element determines the IP address of the application server corresponding to both the location of the terminal apparatus and the first domain name, the third network element sends the IP address of the application server to the terminal apparatus. For example, assuming that the third network element is a session management network element, the session management network element may first send the IP address of the application server to a user plane function network element, and the user plane function network element sends the IP address of the application server to the terminal apparatus via an access network device. Optionally, the user plane function network element may send first notification information to a session management network element based on the IP address of the application server fed back by the third network element, to indicate the session management network element to select a first traffic steering node and a first PSA for the terminal apparatus. For a method for determining, by the user plane function network element, to send the first notification information to the session management network element, refer to the foregoing descriptions of S242. For brevity, details are not described herein again.

For another example, assuming that the third network element is a DNS server, the DNS server may first send the IP address of the application server to a user plane function network element or a session management network element, and send the IP address of the application server to the terminal apparatus via the user plane function network element, the session management network element, or an access network device. Optionally, the session management network element may select a first traffic steering node and a first protocol data unit session anchor PSA for the terminal apparatus based on the IP address of the application server fed back by the third network element. For a method, refer to the description in S241. For brevity, details are not described herein again. A process in which the third network element sends the IP address of the application server to the terminal apparatus is not limited in this application.

According to the domain name system query method provided in this application, the third network element determines, based on the location of the terminal apparatus and a requested domain name, an IP address of an application server corresponding to both the location of the terminal apparatus and the requested domain name, and feeds back the IP address to the terminal apparatus. In this way, the terminal apparatus can access a service nearby via the application server. This avoids a problem that a service is limited or some services cannot be accessed when the terminal apparatus accesses services via an application server that is far from the terminal apparatus, improving service access quality of the terminal apparatus. In addition, because the terminal apparatus can access the service nearby, a service access delay of the terminal apparatus is reduced, and communication efficiency is improved.

In some possible implementations of this application, the third network element may be any one of a session management network element, a policy control function network element, an application function network element, or a DNS server, and the third network element stores the first information.

For example, the third network element may obtain and store the first information. For example, if the third network element is a session management network element, the session management network element may receive the first information sent by a policy control function network element (for example, a PCF) or an application function network element (for example, an AF). If the third network element is an application function network element, the application function network element may store the first information in a UDR. If the third network element is a policy control function network element, the policy control function network element may request the first information from a UDR and store the first information. For another example, assuming that the third network element is a DNS server, the DNS server may receive the first information sent by an application function network element (for example, an AF). Alternatively, the first information may be preconfigured in the DNS server. It should be understood that a manner in which the third network element obtains the first information is not limited in this embodiment of this application.

In some possible implementations of this application, if the third network element is a session management network element, the session management network element selects a first traffic steering node and a first PSA for the terminal apparatus based on the first domain name or the IP address corresponding to the first domain name. For a process in which the session management network element selects the first traffic steering node and the first PSA, refer to the related description in S241. For brevity, details are not described herein again.

In some possible implementations of this application, in S310, if the third network element is a DNS server, the DNS server may obtain the location information of the terminal apparatus in the following manner:

The DNS server receives the location information of the terminal apparatus sent by a policy control function network element, an application function network element, or a session management network element.

For example, the session management network element may obtain the location information of the terminal apparatus from an AMF. In addition, the session management network element may subscribe to location information of the terminal apparatus from the AMF. In this way, when the terminal apparatus moves, the AMF may provide the session management network element with latest location information of the terminal apparatus. The application function network element may obtain the location information of the terminal apparatus from a core network device via a network exposure function (NEF) network element. The policy control function network element may obtain the location information of the terminal apparatus from the AMF. The policy control function network element, the application function network element, or the session management network element may send the location information of the terminal apparatus to the DNS server. Optionally, the DNS server may obtain the location of the terminal apparatus from the policy control function network element, the session management network element, or the application function network element, and further determine, based on the location of the terminal apparatus, a deployment location of an MEC platform or an application server that can be currently accessed by the terminal apparatus. Alternatively, the DNS server may directly obtain, from the policy control function network element, the session management network element, or the application function network element, a deployment location of an MEC platform or an application server that can be currently accessed by the terminal apparatus. The DNS server receives the location information of the terminal apparatus sent by the policy control function network element, the application function network element, or the session management network element, such that the location information of the terminal apparatus obtained by the DNS server is accurate. This further improves accuracy and efficiency of determining, by the DNS server, the IP address corresponding to the location of the terminal apparatus and the first domain name.

In some other possible implementations of this application, in S310, if the third network element is a DNS server, the DNS server may obtain the first domain name of the terminal apparatus in the following manner:

The third network element receives second request information sent by a session management network element or a user plane function network element, where the second request information includes the first domain name.

For example, when the terminal apparatus needs to perform DNS query, the terminal apparatus sends a DNS query request to a core network device. The DNS query request includes the first domain name that the terminal apparatus needs to query. Optionally, the DNS query request further includes a destination address. The destination address may be an address of the DNS server. The DNS query request is used to request the IP address corresponding to the first domain name. The terminal apparatus may send the DNS query request to a user plane function network element in a core network via an access network device, and the user plane function network element may directly send second request information to the DNS server based on the DNS query request, where the second request information includes the first domain name. Optionally, the user plane function network element may send first notification information to a session management network element based on the first domain name or the destination address in the DNS query request, to indicate the session management network element to select a first traffic steering node and a first PSA for the terminal apparatus. For a method for determining, by the user plane function network element, to send the first notification information to the session management network element, refer to the foregoing descriptions of S242. For brevity, details are not described herein again. Alternatively, the user plane function network element may first send the DNS query request to the session management network element, and the session management network element sends second request information to the DNS server based on the DNS query request, where the second request information includes the first domain name. Optionally, the session management network element may select a first traffic steering node and a first protocol data unit session anchor PSA for the terminal apparatus based on the first domain name or the destination address in the DNS query request. For a method, refer to the description in S241. For brevity, details are not described herein again.

Optionally, the second request information may further include the location information of the terminal apparatus. For example, if the second request information is sent by the user plane function network element to the DNS server, the user plane function network element may request the location information of the terminal apparatus from the session management network element before sending the second request information, or the user plane function network element has obtained the location information of the terminal apparatus in advance. For example, in a session establishment process, the session management network element sends the location information of the terminal apparatus to the user plane function network element. The user plane function network element adds the location information of the terminal apparatus into the second request information, and sends the second request information to the DNS server.

If the second request information is sent by the session management network element to the DNS server, the session management network element first obtains location information of the terminal apparatus, adds the location information of the terminal apparatus into the second request information, and sends the second request information to the DNS server. An implementation method for adding the location information of the terminal apparatus into the DNS query request may be adding the location information of the terminal apparatus into a DNS query request (DNS packet) option. Alternatively, because the TCP may carry a DNS packet, the location information of the terminal apparatus may be added into a TCP option. This is not limited in this application.

The following describes the domain name system query method provided in this application with reference to examples.

Figure 10A:
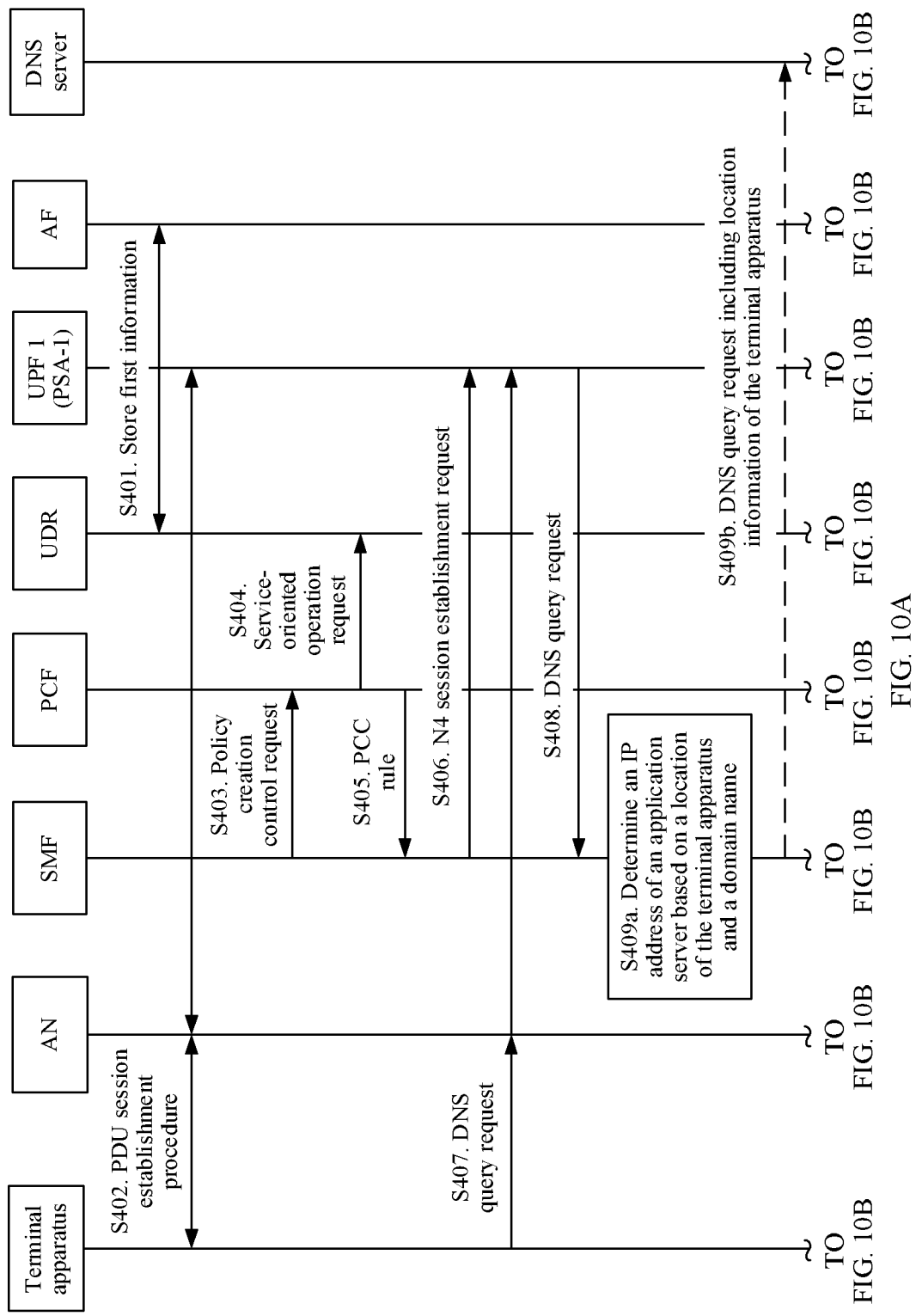

FIG. 10A and FIG. 10B are a schematic flowchart of a domain name system query method 400 according to an embodiment of this application. The method 400 may be applied to the architecture shown in FIG. 1. FIG. 10A and FIG. 10B mainly describe a process in which a session management network element determines an IP address of an application server, including a process in which the session management network element determines the IP address of the application server by itself and a process in which the session management network element determines the IP address of the application server via a policy control function network element or an application function network element. In the example shown in FIG. 10A and FIG. 10B, descriptions are provided using an example in which the session management network element is an SMF, the policy control function network element is a PCF, and the application function network element is an AF.

As shown in FIG. 10A and FIG. 10B, the method 400 includes the following steps.

S401. The AF stores a correspondence (the foregoing first information) between a deployment location (which, for example, may be represented by an MEC platform identifier or a DNAI) of an application server, a domain name, and an IP address of the application server in a UDR via a network exposure function (NEF) network element. Further, the first information may alternatively be stored in a DNS server. For example, content of the first information may be the content shown in Table 1.

S402. A terminal apparatus initiates a PDU session establishment procedure. For example, the terminal apparatus sends parameters to an AMF such as an identifier of a PDU session, network slice selection assistance information (NS-SAI), single network slice selection assistance information (S-NSSAI), and a data network name (DNN). The AMF selects the SMF network element based on the S-NSSAI and the DNN, and sends parameters such as a permanent identifier of the terminal apparatus, location information of the terminal apparatus, the identifier of the PDU session, the S-NSSAI, and the DNN to the SMF network element.

The location information of the terminal apparatus in step S402 may be a TAI, an IP address of a radio access network accessed by the terminal apparatus, or an ID of a radio access network accessed by the terminal apparatus.

S403. In the session establishment process, the SMF invokes a PCF service-oriented operation policy creation control request (Npcf_SMPolicy Control_Create Request), to request policy information related to the PDU session from the PCF.

S404. The PCF invokes a UDR service-oriented operation request (Nudr_DM_Query) to obtain, from the UDR, information related to an application subscribed to by the terminal apparatus, where the information includes the correspondence (the first information) between the deployment location of the application server, the domain name, and the IP address of the application server in S401.

S405. The PCF generates a policy and charging control (PCC) rule based on the deployment location of the application server, the domain name, and the IP address of the application server, and delivers the PCC rule to the SMF via a service-oriented operation policy creation control response (Npcf_SMPolicyControl_Create Response), and the SMF stores the PCC rule, where the PCC rule includes the correspondence between the deployment location of the application server subscribed to by the terminal apparatus (where the deployment location of the application server may be represented by a DNAI), the domain name, and the IP address of the application server. In addition, the PCC rule may further include another rule, for example, a charging rule, a packet forwarding rule, and application servers (a DNAI list) at specific deployment locations, IP addresses (an IP address list) of specific application servers, domain names (a domain name list) corresponding to specific application servers, or specific destination addresses (a DNS server address list) can be used to perform UL CL/BP insertion of a new PSA.

S406. The SMF selects a UPF 1 network element as an anchor (PSA-1) of the PDU session based on parameters such as the S-NSSAI and the DNN, and if the SMF determines, based on the deployment location (which may be represented by a DNAI) of the application server included in the PCC rule, that the terminal apparatus subscribes to some applications deployed on the MEC platform, the SMF sends an N4 session establishment request message to the UPF 1, where the N4 session establishment request message needs to carry a DNS query message forwarding rule, used to indicate the UPF 1 to forward a DNS query message of the terminal apparatus to the SMF after receiving the DNS query message.

S407. After establishment of the PDU session is completed, the terminal apparatus sends a DNS query request to a core network based on a service requirement of the terminal apparatus via an access network device, to initiate DNS query for an application, where the DNS query request carries a domain name corresponding to the application. Optionally, the DNS query request includes a destination address, and the destination address is an address of the DNS server. The domain name corresponding to the application carried in the DNS query request may be FQDN or a domain name in another form. This is not limited in this application.

S408. After receiving the DNS query request, the UPF 1 forwards the DNS query request of the terminal apparatus to the SMF based on the indication of the SMF in S406.

S409a. The SMF detects the domain name included in the DNS query request, and if the domain name is included in the correspondence that is between the deployment location of the application server, the domain name, and the IP address of the application server and that is obtained in S405, the SMF determines a deployment location (which, for example, may be represented by an MEC platform identifier or a DNAI) of an application server corresponding to a domain name that can be currently accessed by the terminal apparatus, and further determines, based on the deployment location of the application server, a corresponding IP address of the application server based on the domain name included in the DNS query request.

In S409a, an implementation in which the SMF determines the deployment location of the application server corresponding to the domain name that can be currently accessed by the terminal apparatus may be as follows.

The SMF may determine, based on the TAI of the terminal apparatus obtained from the AMF in step S402, a domain name requested by the terminal apparatus, and the correspondence that is between the deployment location of the application server, the domain name, and the IP address of the application server and that is obtained in step S405, a deployment location (which, for example, may be represented by an MEC platform identifier or a DNAI) of an application server corresponding to the domain name requested by the terminal apparatus. A method for obtaining the TAI of the terminal apparatus by the SMF may be as follows: In the session establishment process, the SMF obtains the TAI of the terminal apparatus from the AMF. In addition, the SMF may subscribe to the TAI of the terminal apparatus from the AMF. In this way, the AMF may provide the SMF with a latest TAI of the terminal apparatus when the terminal apparatus moves. The SMF may further determine, based on context information of the terminal apparatus, an IP address or an ID of a user plane function network element serving the terminal apparatus, and further determine the deployment location (which, for example, may be represented by an MEC platform identifier or a DNAI) of the application server corresponding to the domain name requested by the terminal apparatus.

Because a location of the management platform is determined based on the TAI of the terminal apparatus and the domain name requested by the terminal apparatus, the location of the management platform corresponds to a location of the terminal apparatus, and the application server corresponding to the domain name requested by the terminal apparatus is deployed on the management platform.

Optionally, the SMF may determine, based on the domain name included in the DNS query request, whether to perform a UL CL/BP insertion procedure. For example, the SMF network element may preconfigure a domain name list, or the SMF network element may receive the PCC rule from the PCF network element in S405, where the PCC rule includes a domain name list, and where the domain name list includes one or more domain names. As long as the domain name included in the DNS query request received by the SMF network element belongs to the domain name list, the SMF network element selects a UPF 2 (PSA-2) and a UL CL/BP, and performs the UL CL/BP insertion procedure.

Optionally, after the SMF determines the location of the management platform on which the application server corresponding to the domain name requested by the terminal apparatus is located, the SMF may alternatively select a UL CL/BP based on the deployment location (identified by the DNAI) of the application server, to implement local service flow steering of the application and reduce a delay. Optionally, the SMF may alternatively determine, based on the destination address included in the DNS query request, whether to perform the UL CL/BP insertion procedure. The destination address may be understood as the address of the DNS server. When the SMF determines that the address of the DNS server points to a third party (for example, Tencent or Alibaba), and an application server of the third party is deployed in a current location, the SMF determines to select the first traffic steering node and the first PSA for the terminal apparatus. In the foregoing method, if the SMF selects to insert a BP, the SMF further needs to assign a new IPv6 prefix to the terminal apparatus, and send the new IPv6 prefix to the terminal apparatus via PSA-1. Subsequently, the terminal apparatus may access the application server via PSA-2.

Optionally, in S409a, if the SMF determines that the domain name requested by the terminal apparatus is not included in the PCC rule, in other words, if the SMF cannot determine, according to the PCC rule, the IP address corresponding to the domain name, the SMF does not perform S409a but performs S409b and S409c.

S409b. The SMF adds the location of the terminal apparatus into the DNS query request, and forwards the DNS query request to the DNS server to obtain an IP address of an application server corresponding to the application. The location of the terminal apparatus may be a TAI of the terminal apparatus, an MEC platform identifier that can be currently accessed by the terminal apparatus, or a DNAI that can be currently accessed by the terminal apparatus. The location of the terminal apparatus may alternatively be an identifier of an access network currently serving the terminal apparatus. For example, the identifier of the access network may be a RAN ID or a RAN IP address. For descriptions of the location information of the terminal apparatus, refer to the descriptions in step S231. For brevity, details are not described herein again. An implementation method for adding the location information of the terminal apparatus into the DNS query request by the SMF may be as follows: The SMF adds the location information of the terminal apparatus into a DNS query request (DNS packet) option. Alternatively, because the TCP may carry a DNS packet, the SMF may further add the location information of the terminal apparatus into a TCP option. This is not limited in this application.

Optionally, in an implementation, the SMF may send the location information of the terminal apparatus to the DNS server after sending the DNS query request to the DNS server. In other words, the SMF may send the DNS query request and the location information of the terminal apparatus to the DNS server via a plurality of messages. This is not limited in this application.

S409c. The DNS server determines the IP address of the corresponding application server based on the domain name in the DNS query request, and sends the IP address to the SMF.

S410. The SMF returns a DNS query response (response) to PSA-1, where the response includes the IP address of the application server.

S411. PSA-1 returns the DNS query response to the terminal apparatus, where the response includes the IP address of the application server. Subsequently, the terminal apparatus communicates with the application server via PSA-1 using the IP address of the application server included in the DNS query response.

S412. Optionally, the SMF may perform the UL CL/BP insertion procedure based on the query response. For example, the SMF network element may preconfigure an IP address list, or the SMF network element may receive the PCC rule from the PCF network element in S405, where the PCC rule includes an IP address list, and where the IP address list includes one or more IP addresses. As long as the IP address included in the DNS query response received by the SMF network element belongs to the IP address list, the SMF network element selects a UPF 2 (PSA-2) and a UL CL/BP, and performs the UL CL/BP insertion procedure. Alternatively, when the SMF network element determines that UL CL/BP insertion is allowed in the deployment location (for example, the MEC platform 2 in Table 1) of the application server corresponding to the IP address (for example, IP-1 in Table 1), the SMF selects a UPF 2 (PSA-2) and a UL CL/BP, and performs the UL CL/BP insertion procedure. If the SMF selects to insert a BP, the SMF further needs to assign a new IPv6 prefix to the terminal apparatus, and send the new IPv6 prefix to the terminal apparatus via PSA-1. Subsequently, the terminal apparatus may access the application server via PSA-2.

According to the domain name query method provided in this embodiment of this application, the IP address of the application server corresponding to both the location of the terminal apparatus and the domain name is determined based on the location of the terminal apparatus and the requested domain name, and the IP address of the application server is fed back to the terminal apparatus. In this way, the terminal apparatus can access a service nearby via the application server. This improves service access quality of the terminal apparatus. Inserting the PSA in the deployment location of the application server corresponding to the terminal location can optimize a data transmission path of the terminal apparatus, reduce a data transmission delay, and improve the data transmission efficiency.

Figure 11A:
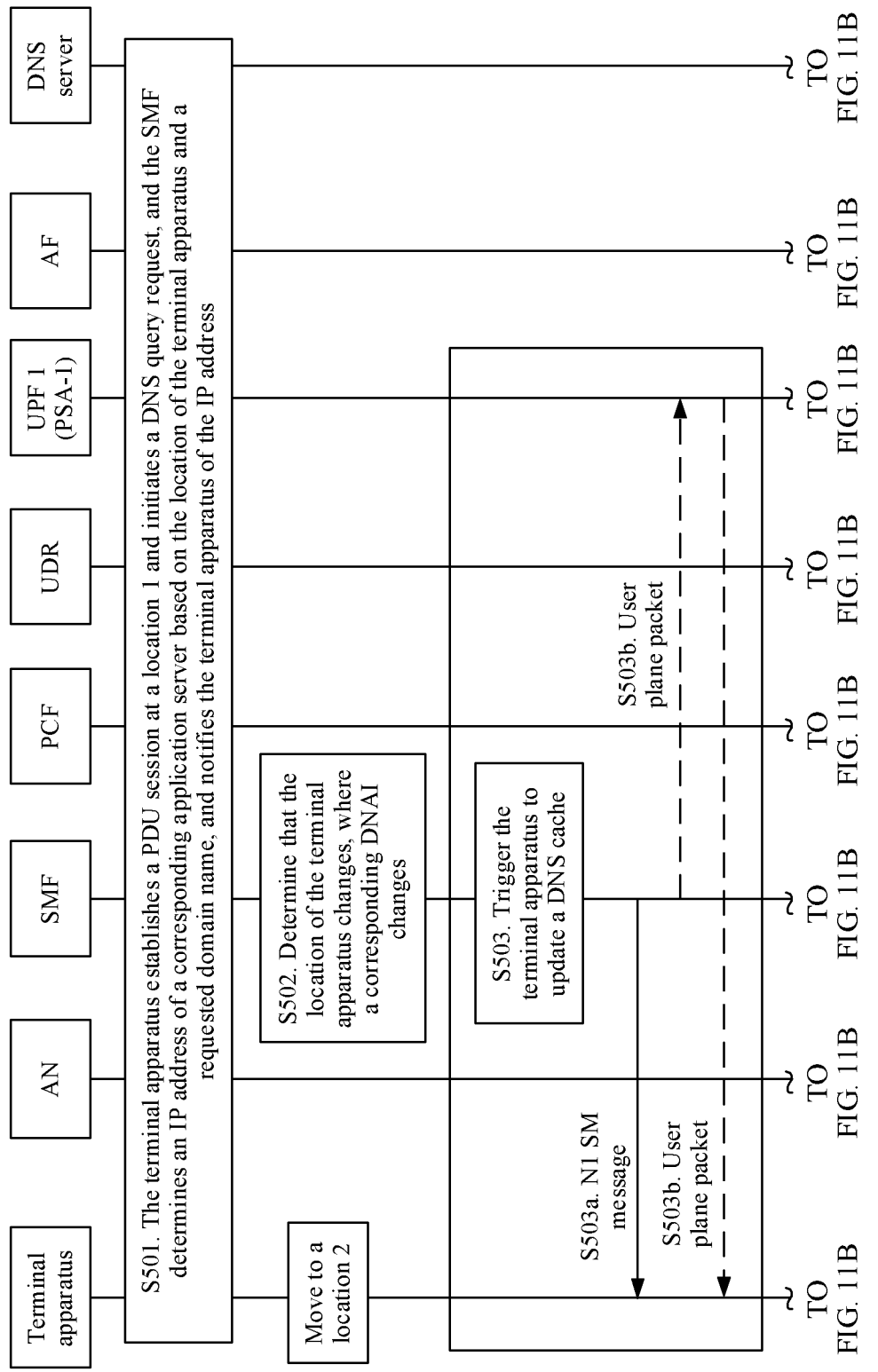
FIG. 11A and FIG. 11B are a schematic interaction diagram of still another domain name system query method according to an embodiment of this application.
Figure 11B:
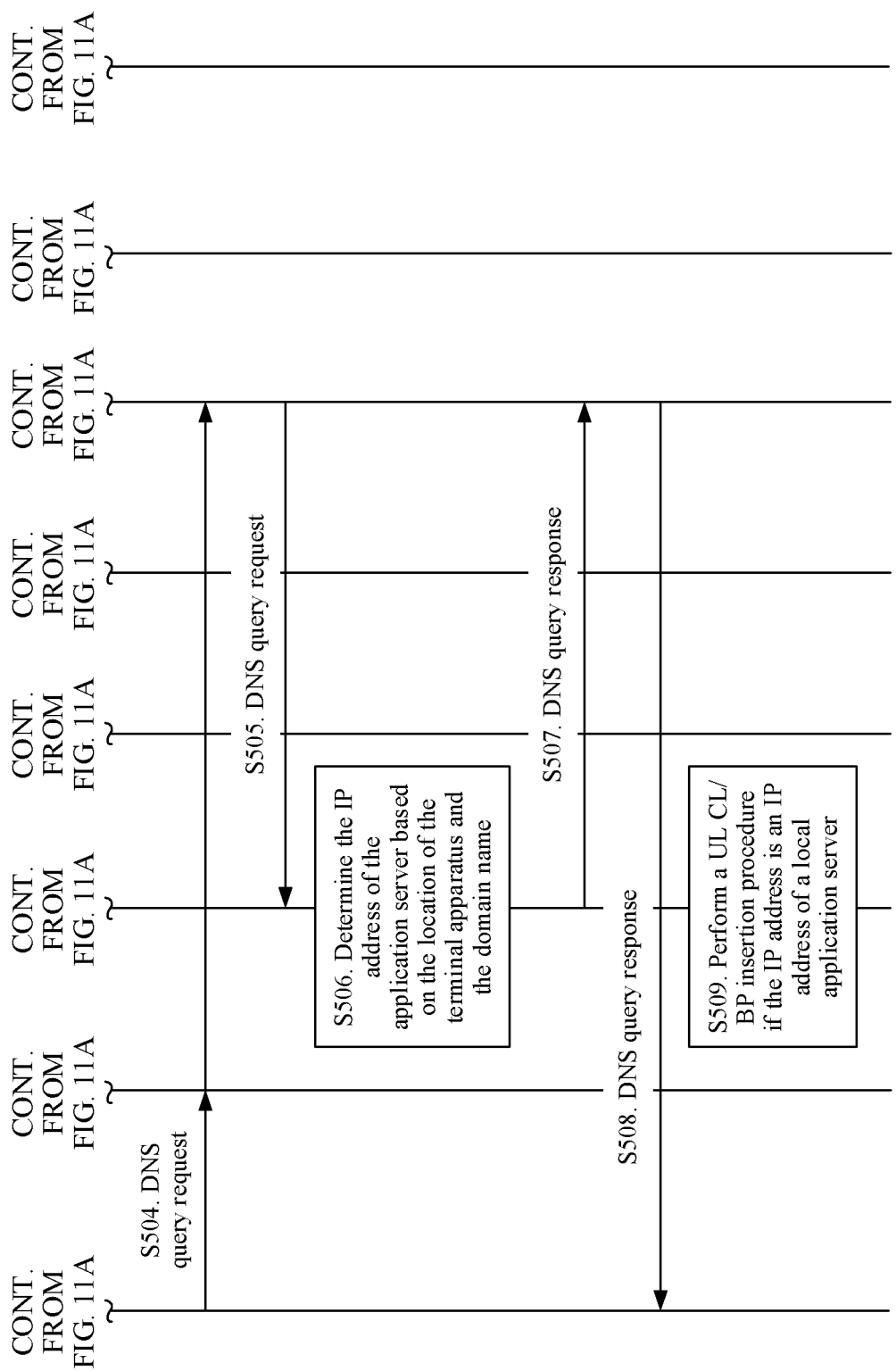

FIG. 11A and FIG. 11B are a schematic flowchart of a domain name system query method 500 according to an embodiment of this application. The method 400 may be applied to the architecture shown in FIG. 1. FIG. 11A and FIG. 11B mainly describe a process in which a session management network element determines an IP address of an application server when a terminal apparatus moves. In the example shown in FIG. 11A and FIG. 11B, descriptions are provided using an example in which the session management network element is an SMF, a policy control function network element is a PCF, and an application function network element is an AF.

As shown in FIG. 11A and FIG. 11B, the method 500 includes the following steps.

S501. The AF stores a correspondence (the foregoing first information) between a deployment location (which, for example, may be represented by an MEC platform identifier or a DNAI) of an application server, a domain name, and an IP address of the application server in a UDR via an NEF network element. It is assumed that a terminal apparatus initiates a PDU session establishment procedure in a location 1. In the PDU session establishment procedure, the SMF obtains the correspondence between the deployment location of the application server, the domain name, and the IP address of the application server via the PCF. The terminal apparatus initiates a DNS query request after session establishment is completed, where the DNS query request includes a domain name that needs to be queried. The SMF determines, based on information about the current location (the location 1) of the terminal apparatus, a deployment location of an application server corresponding to the current location of the terminal apparatus, further determines, based on the correspondence between the deployment location of the application server, the domain name, and the IP address of the application server, an IP address of the application server corresponding to the domain name queried by the terminal apparatus, and notifies the terminal apparatus of the determined IP address of the application server. Optionally, if no application server is deployed in the current location (the location 1) of the terminal apparatus, the IP address of the application server corresponding to the domain name and returned by the SMF is an IP address (for example, IP-3A) of a remote application server (for example, the application server deployed on the MEC platform 1 in Table 1) that is far from the current location of the terminal apparatus. For a process of S501, refer to the foregoing descriptions of S401 to S411. For brevity, details are not described herein again.

S502. When the terminal apparatus moves, assuming that the terminal apparatus moves from the location 1 to a location 2, the SMF obtains, from an AMF, information about a current new location (the location 2) of the terminal apparatus. In addition, the SMF may determine that the deployment location (which, for example, may be represented by a DNAI or an MEC platform identifier) of the application server corresponding to the current location of the terminal apparatus changes. For example, the SMF determines that the location 1 (which may be represented by a TAI 1) of the terminal apparatus corresponds to a DNAI 2 or an MEC platform 2, and that the location 2 (which may be represented by a TAI 2) corresponds to a DNAI 1 or an MEC platform 1. If the DNAI 1 is different from the DNAI 2, the SMF determines that the deployment location of the application server corresponding to the current location of the terminal apparatus changes.

S503. Because deployment locations of different application servers correspond to IP addresses of the different application servers, the SMF may trigger the terminal apparatus to update a DNS cache, such that the terminal apparatus obtains an IP address of a latest application server when initiating DNS query again in the current location (the location 2). The SMF may send DNS cache update indication information to the terminal apparatus through control plane signaling. For example, in S503a, the SMF may directly send the control plane signaling to the terminal apparatus via an access network device, for example, an N1 session management (SM) message, where the N1 SM message includes a protocol configuration option (PCO), and where the PCO includes the DNS cache update indication information used to indicate the terminal apparatus to initiate DNS cache update. Alternatively, in S503b, the SMF sends a user plane packet to the terminal apparatus via a UPF 1, where the packet is used to indicate the terminal apparatus to initiate DNS cache update.

S504. After receiving the DNS cache update indication information, the terminal apparatus initiates a DNS query process. For example, the terminal apparatus sends a DNS query request to a core network based on a service requirement of the terminal apparatus via an access network device, to initiate DNS query for an application, where the DNS query request carries a domain name corresponding to the application. Optionally, the DNS query request further includes a destination address (an address of a DNS server). The domain name corresponding to the application carried in the DNS query request may be FQDN or a domain name in another form. This is not limited in this application.

S505. After receiving the DNS query request, the UPF 1 forwards the DNS query request of the terminal apparatus to the SMF.

S506. The SMF detects a domain name requested by the terminal apparatus, determines a deployment location of an application server based on a current location (the location 2) of the terminal apparatus, and further determines an IP address of the application server in the deployment location. For a process of S506, refer to the foregoing descriptions of S409a and S409c. For brevity, details are not described herein again.

Optionally, the SMF may determine, based on the domain name included in the DNS query request, whether to perform a UL CL/BP insertion procedure. For example, the SMF network element may preconfigure a domain name list, or the SMF network element may receive the PCC rule from the PCF network element, where the PCC rule includes a domain name list, and where the domain name list includes one or more domain names. As long as the domain name included in the DNS query request received by the SMF network element belongs to the domain name list, the SMF network element selects a UPF 2 (PSA-2) and a UL CL/BP, and performs the UL CL/BP insertion procedure.

Optionally, the SMF may alternatively determine, based on the destination address included in the DNS query request, whether to select a UPF 2 (PSA-2) and a UL CL/BP for the terminal apparatus, where the destination address may be understood as an address of a DNS server. When the SMF determines that the address of the DNS server points to a third party (for example, Tencent or Alibaba), and an application server of the third party is deployed in the current location, the SMF determines to select the UPF 2 (PSA-2) and the UL CL/BP for the terminal apparatus. In the foregoing method, if the SMF selects to insert a BP, the SMF further needs to assign a new IPv6 prefix to the terminal apparatus, and send the new IPv6 prefix to the terminal apparatus via PSA-1. Subsequently, the terminal apparatus may access the application server via PSA-2.

S507. The SMF returns a DNS query response to PSA-1, where the response includes the IP address of the application server.

S508. PSA-1 returns the DNS query response to the terminal apparatus, where the response includes the IP address of the application server. Subsequently, the terminal apparatus communicates with the application server via PSA-1 using the IP address of the application server included in the DNS query response.

S509. Optionally, the SMF may perform the UL CL/BP insertion procedure based on the DNS query response. For example, the SMF network element may preconfigure an IP address list, or the SMF network element may receive the PCC rule from the PCF network element, where the PCC rule includes an IP address list, and where the IP address list includes one or more IP addresses. As long as the IP address included in the DNS query response received by the SMF network element belongs to the IP address list, the SMF network element selects the UPF 2 (PSA-2) and a UL CL/BP, and performs the UL CL/BP insertion procedure. Alternatively, when the SMF network element determines that UL CL/BP insertion is allowed in the deployment location (for example, the MEC platform 2 in Table 1) of the application server corresponding to the IP address (for example, IP-1 in Table 1), the SMF selects a UPF 2 (PSA-2) and a UL CL/BP, and performs the UL CL/BP insertion procedure. For a process of S509, refer to the descriptions of S412. For brevity, details are not described herein again.

According to the domain name query method provided in this embodiment of this application, in a scenario in which terminal apparatus moves, a core network element triggers the terminal apparatus to perform DNS cache update indication, such that the terminal apparatus can obtain an IP address of an application server nearby in a new location, and can dynamically insert a UL CL/BP depending on service access of the terminal apparatus, to implement local traffic steering, optimize a local service access path, and improve communication efficiency.

Figure 12A:
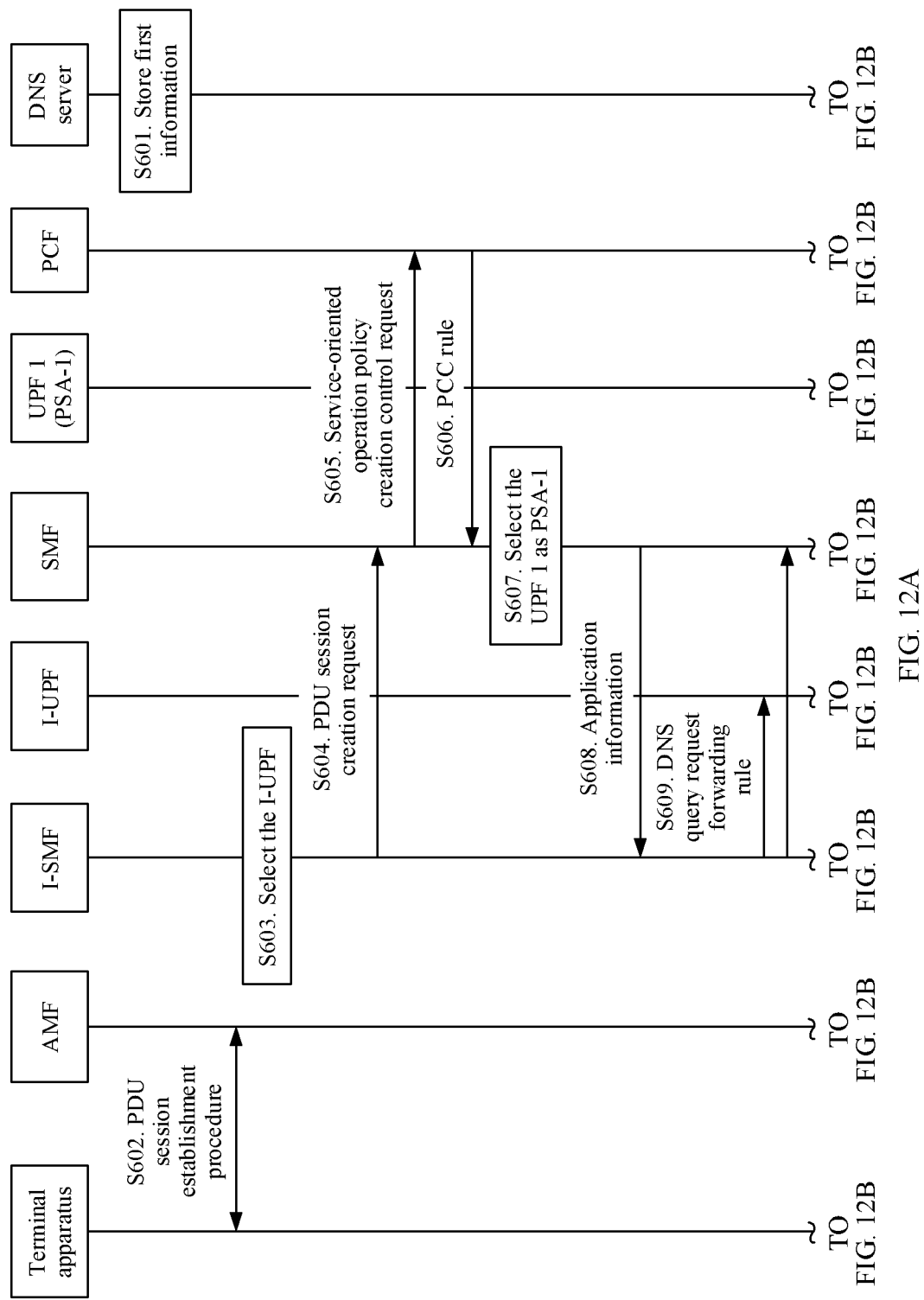

FIG. 12A and FIG. 12B are a schematic flowchart of a domain name system query method 600 according to an embodiment of this application. The method 600 may be applied to the architecture shown in FIG. 1. FIG. 12A and FIG. 12B mainly describe a process in which an SMF network element and a UPF network element determine, in a topology enhanced (Enhancing Topology of SMF and UPF (ETSUN)) scenario, an IP address of an application server corresponding to a domain name. For example, in 5G, because different SMFs manage different service areas, a same PDU session may correspond to two SMF network elements: a first session management network element and a second session management network element. For example, when a terminal apparatus establishes a PDU session in a location 1, the PDU session corresponds to an anchor user plane function network element (for example, a UPF 1), and the anchor user plane function network element is managed by an anchor SMF. PDU session switching occurs when the terminal moves from the location 1 to a location 2. After the PDU session switching, a user plane function network element that corresponds to the PDU session and that is directly connected to an access network element is beyond a serving area of the original anchor SMF, and is managed by a new anchor intermediate SMF (I-SMF). In this case, a scenario occurs in which the session corresponds to two SMFs: the first session management network element (the SMF) and the second session management network element (the I-SMF). Certainly, this embodiment of this application is not necessarily limited to a session switching scenario, and may be further applicable to, for example, a scenario in which one PDU session corresponds to two (or more) SMF network elements. The example shown in FIG. 12A and FIG. 12B shows a process of inserting an I-SMF in a PDU session establishment procedure. Descriptions are provided using an example in which a session management network element is an SMF, a policy control function network element is a PCF, and an application function network element is an AF.

As shown in FIG. 12A and FIG. 12B, the method 600 includes the following steps.

S601. An AF stores a correspondence (the foregoing first information) between a deployment location (which, for example, may be represented by an MEC platform identifier or a DNAI) of an application server, a domain name and an IP address of the application server in a DNS server. Further, the first information may be further stored in a UDR. For example, content of the first information may be the content shown in Table 1. For a process of S601, refer to the foregoing descriptions of S401. For brevity, details are not described herein again.

S602. A terminal apparatus initiates a PDU session establishment procedure. For example, the terminal apparatus sends parameters to an AMF such as an identifier of a PDU session, S-NSSAI, and a DNN. The AMF selects an SMF network element and an I-SMF network element based on the S-NSSAI and the DNN, and sends parameters such as an identifier of the SMF network element, a permanent identifier of the terminal apparatus, location information (for example, a TAI) of the terminal apparatus, the identifier of the PDU session, the S-NSSAI, and the DNN to the I-SMF network element.

S603. The I-SMF network element selects an intermediate UPF (I-UPF) network element.

S604. The I-SMF invokes a PDU session creation request (Nsmf_PDUSession_Create request), where the PDU session creation request carries a DNAI list supported by the I-SMF, and sends the PDU session creation request to the SMF network element.

S605. The SMF invokes a PCF service-oriented operation policy creation control request (Npcf_SMPolicy Control_ Create Request), to request policy information related to the PDU session from the PCF. The PCF invokes a UDR service-oriented operation request (Nudr_DM_Query) to obtain, from the UDR, information related to an application subscribed to by the terminal apparatus. The information includes the correspondence (the foregoing first information) between the deployment location of the application server, the domain name, and the IP address of the application server in S601.

S606. The PCF generates a policy and charging control (PCC) rule based on the deployment location of the application server, the domain name, and the IP address of the application server, and delivers the PCC rule to the SMF via a service-oriented operation policy creation control response (Npcf_SMPolicyControl_Create Response); and the SMF stores the PCC rule, where the PCC rule includes the correspondence between the deployment location of the application server subscribed to by the terminal apparatus, the domain name, and the IP address of the application server. In addition, the PCC rule may further include another rule, for example, a charging rule, a packet forwarding rule, and application servers (a DNAI list) at which deployment locations, IP addresses (an IP address list) of which application servers, domain names (a domain name list) corresponding to which application servers, or which destination addresses (a DNS server address list) can be used to perform UL CL/BP insertion of a new PSA. S607. The SMF selects a UPF 1 network element as an anchor (PSA-1) of the PDU session based on the parameters such as the S-NSSAI and the DNN.

S608. The SMF sends, to the I-SMF based on the DNAI list supported by the I-SMF, information about the applications deployed in the deployment locations (for example, represented by identifiers of MEC platforms or DNAIs) of the application servers supported by the I-SMF. The information about the applications includes the correspondence between the deployment location of the application server, the domain name, and the IP address of the application server. In addition, the SMF sends, to the I-SMF based on the application information in the deployment location of the application server supported by the I-SMF, one or more of the deployment locations (MEC platforms) of the application servers, the IP addresses (the IP address list) of the application servers, domain names (the domain name list) corresponding to the application servers, or the destination addresses (the DNS server address list) that can be used to perform UL CL/BP insertion.

S609. The I-SMF receives the application information deployed in the deployment location of the supported application server, and sends a DNS query request forwarding rule to the I-UPF, to indicate the I-UPF to forward, after receiving a DNS query message of the terminal apparatus, the DNS query message to the I-SMF.

S610. After establishment of the PDU session is completed, the terminal apparatus sends a DNS query request to a core network based on a service requirement of the terminal apparatus via an access network device, to initiate DNS query for an application, where the DNS query request carries a domain name corresponding to the application. Optionally, the DNS query request may further include a destination address, and the destination address is an address of a DNS server. The domain name corresponding to the application carried in the DNS query request may be FQDN or a domain name in another form. This is not limited in this application.

S611. After receiving the DNS query request, the I-UPF forwards the DNS query request of the terminal apparatus to the I-SMF based on the indication of the I-SMF in S609.

S612. The I-SMF detects the domain name requested by the terminal apparatus, determines, based on the TAI of the terminal apparatus, a deployment location of the application server corresponding to the requested domain name, and further determines an IP address of the application server corresponding to the domain name in the deployment location, where the deployment location may be represented, for example, using an identifier of a management platform or a DNAI.

It should be understood that, because a location of the management platform is determined based on the TAI of the terminal apparatus and the domain name requested by the terminal apparatus, the location of the management platform corresponds to a location of the terminal apparatus, and the application server corresponding to the domain name requested by the terminal apparatus is deployed on the management platform.

Optionally, the I-SMF may determine, based on the domain name included in the DNS query request, whether to perform a UL CL/BP insertion procedure. For example, the I-SMF network element may preconfigure a domain name list, or the I-SMF network element may receive the indication information from the SMF network element in S608, where the indication information includes a domain name list, and where the domain name list includes one or more domain names. As long as the domain name included in the DNS query request received by the I-SMF network element belongs to the domain name list, the I-SMF network element selects a UPF 2 (PSA-2) and a UL CL/BP, and performs the UL CL/BP insertion procedure.

Optionally, after the I-SMF determines the location of the management platform on which the application server corresponding to the domain name requested by the terminal apparatus is located, the I-SMF may alternatively select a UL CL/BP based on the deployment location (identified by the DNAI) of the application server, to implement local service flow steering of the application and reduce a delay.

Optionally, the I-SMF may alternatively determine, based on the destination address included in the DNS query request, whether to select a UPF 2 (PSA-2) and a UL CL/BP for the terminal apparatus, where the destination address may be understood as an address of a DNS server. When the I-SMF determines that the address of the DNS server points to a third party (for example, Tencent or Alibaba), and an application server of the third party is deployed in the current location, the I-SMF determines to select the UPF 2 (PSA-2) and the UL CL/BP for the terminal apparatus. In the foregoing method, if the I-SMF selects to insert a BP, the SMF further needs to assign a new IPv6 prefix to the terminal apparatus, and send the new IPv6 prefix to the terminal apparatus via PSA-1. Subsequently, the terminal apparatus may access the application server via PSA-2.

S613. The I-SMF returns a DNS query response to the I-UPF, where the response includes the determined IP address of the application server.

S614. The I-UPF returns the DNS query response to the terminal apparatus, where the response includes the IP address of the application server. Subsequently, the terminal apparatus communicates with the application server via the I-UPF using the IP address of the application server included in the DNS query response.

S615. Optionally, the I-SMF may perform the UL CL/BP insertion procedure based on the DNS query response. For example, the I-SMF network element may preconfigure an IP address list, or the I-SMF network element may receive the indication information from the SMF network element in S608, where the indication information includes an IP address list, and where the IP address list includes one or more IP addresses. As long as the IP address included in the DNS query response received by the I-SMF network element belongs to the IP address list, the I-SMF network element selects a UPF 2 (PSA-2) and a UL CL/BP, and performs the UL CL/BP insertion procedure. Alternatively, when the I-SMF network element determines that UL CL/BP insertion is allowed in the deployment location (for example, the MEC platform 2 in Table 1) of the application server corresponding to the IP address (for example, IP-1 in Table 1), the I-SMF selects a UPF 2 (PSA-2) and a UL CL/BP, and performs the UL CL/BP insertion procedure.

Figure 13A:
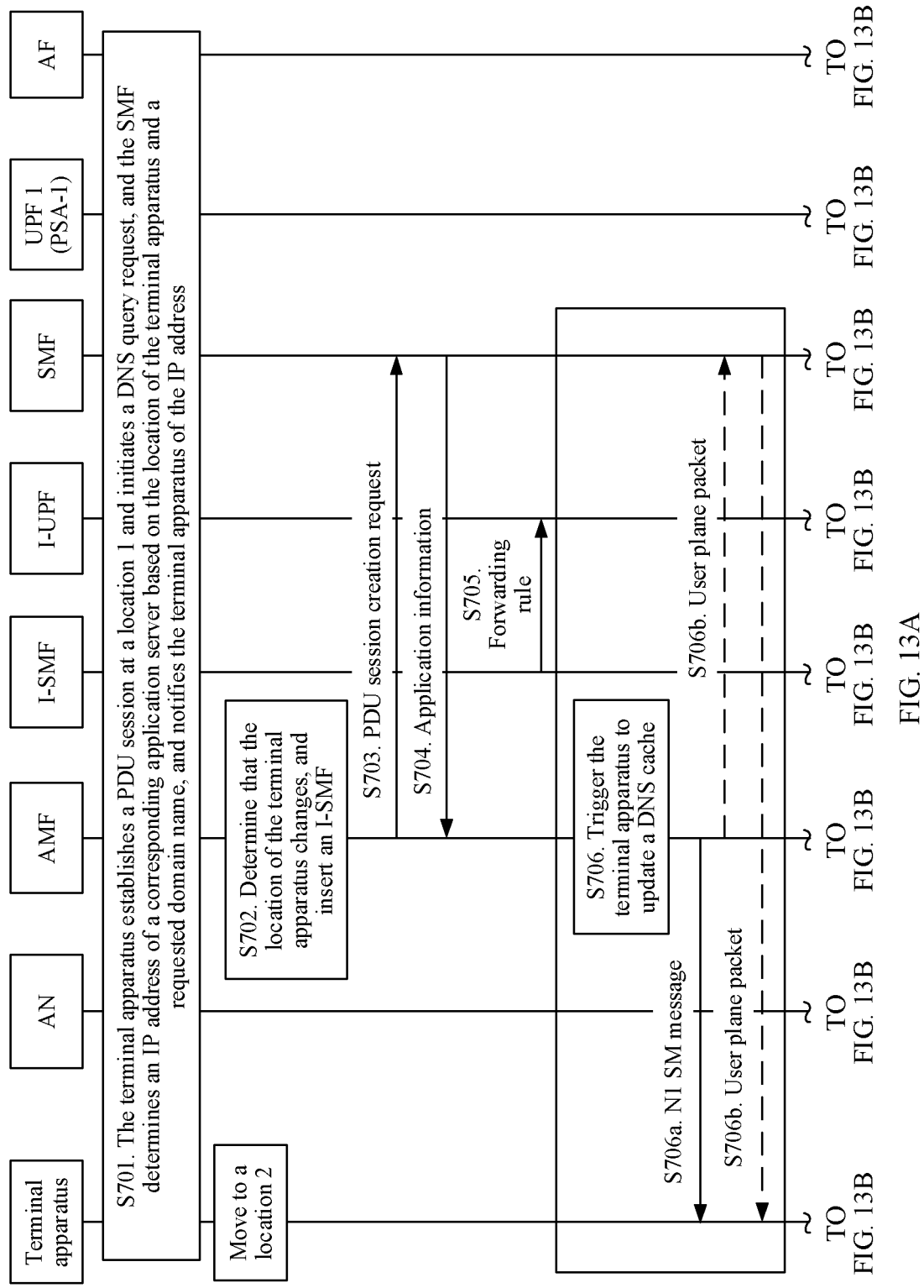
FIG. 13A and FIG. 13B are a schematic interaction diagram of still another domain name system query method according to an embodiment of this application.
Figure 13B:
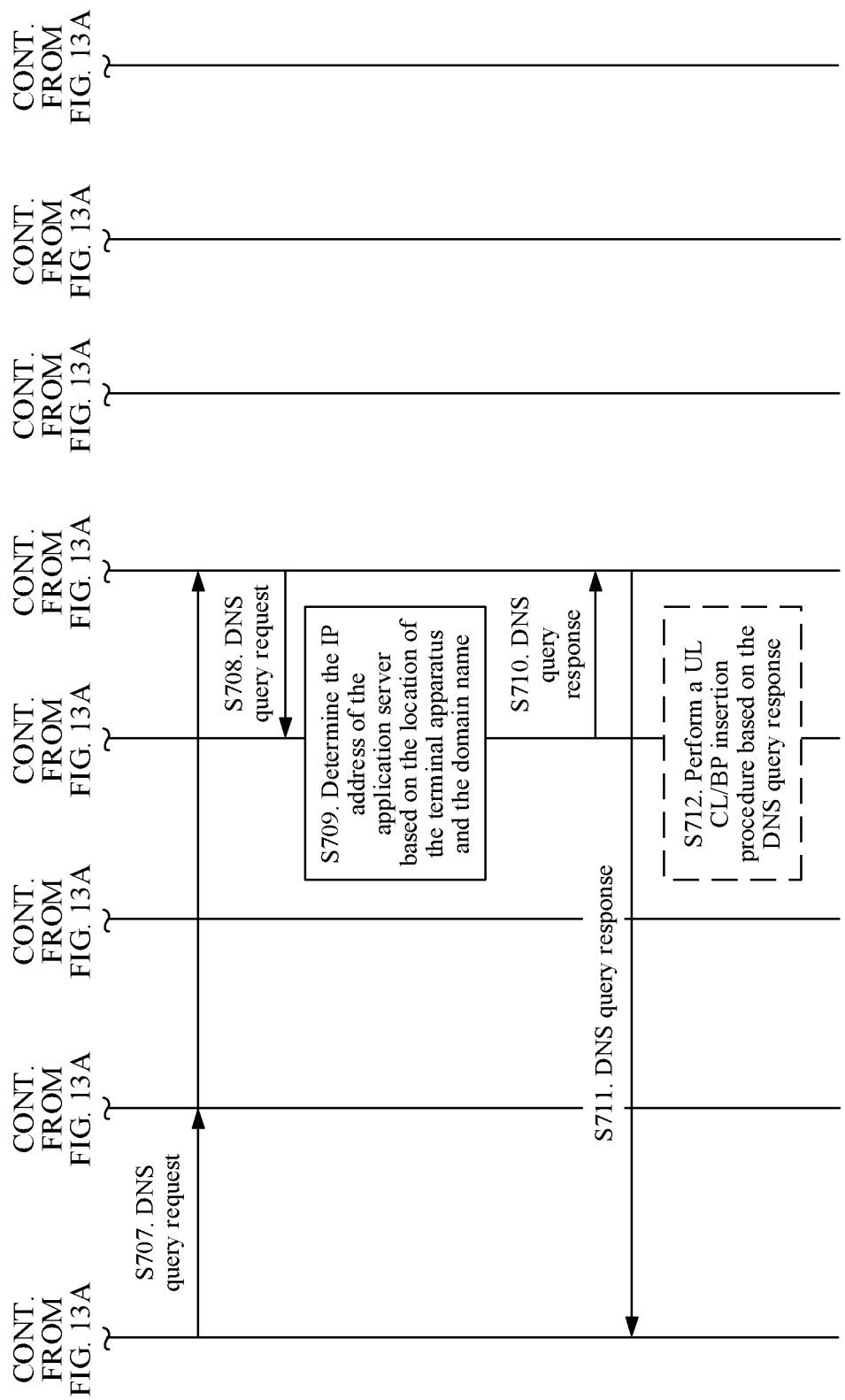

FIG. 13A and FIG. 13B are a schematic flowchart of a domain name system query method 600 according to another embodiment of this application. Different from the example shown in FIG. 12A and FIG. 12B, the example shown in FIG. 13A and FIG. 13B is a process of inserting an I-SMF only after a location of a terminal apparatus changes subsequently. FIG. 12A and FIG. 12B show that an I-SMF is inserted in a PDU session establishment procedure. As shown in FIG. 13A and FIG. 13B, descriptions are provided using an example in which a session management network element is an SMF, a policy control function network element is a PCF, and an application function network element is an AF.

As shown in FIG. 13A and FIG. 13B, the method 700 includes the following steps.

S701. The AF stores a correspondence (the foregoing first information) between a deployment location (which, for example, may be represented by an MEC platform identifier or a DNAI) of an application server, a domain name, and an IP address of the application server in a UDR via an NEF network element. It is assumed that a terminal apparatus initiates a PDU session establishment procedure in a location 1. In the PDU session establishment procedure, the SMF obtains the correspondence between the deployment location of the application server, the domain name, and the IP address of the application server via the PCF. The terminal apparatus initiates a DNS query request after session establishment is completed, where the DNS query request includes a domain name that needs to be queried. The SMF determines, based on information about a current location (the location 1) of the terminal apparatus, a DNAI corresponding to the current location of the terminal apparatus, further determines, based on the correspondence between the deployment location of the application server, the domain name, and the IP address of the application server, the IP address of the application server corresponding to the domain name queried by the terminal apparatus, and notifies the terminal apparatus of the determined IP address of the application server. Optionally, if no application server is deployed in the current location (the location 1) of the terminal apparatus, the IP address of the application server corresponding to the domain name and returned by the SMF is an IP address (for example, IP-3A) of a remote application server (for example, the application server deployed on the MEC platform 1 in Table 1) that is far from the current location of the terminal apparatus. For a process of S701, refer to the foregoing descriptions of S401 to S411. For brevity, details are not described herein again.

S702. When the terminal apparatus moves, assuming that the terminal apparatus moves from the location 1 to a location 2, if the AMF determines that the UE is out of a serving area of the SMF, the AMF inserts an I-SMF.

S703. The I-SMF invokes a PDU session creation request (Nsmf_PDUSession_Create request), where the PDU session creation request carries a DNAI list supported by the I-SMF, and sends the PDU session creation request to the SMF network element.

S704. The SMF sends, to the I-SMF based on the DNAI list supported by the I-SMF, information about applications deployed in deployment locations of application servers supported by the I-SMF. The information about the applications includes the correspondence between the deployment location of the application server, the domain name, and the IP address of the application server. In addition, the SMF sends, based on the application information in the deployment location of the application server supported by the I-SMF, one or more of the deployment locations (MEC platforms) of the application servers, the IP addresses (the IP address list) of the application servers, domain names (the domain name list) corresponding to the application servers, or the destination addresses (the DNS server address list) that can be used to perform UL CL/BP insertion to the I-SMF. A correspondence between a destination address of an application, a deployment location, a domain name, and an IP address is obtained by the SMF from the PCF in the session establishment process.

S705. The I-SMF receives the information about the applications deployed in the deployment locations of the application servers supported by the I-SMF, and sends an N4 session modification request message to an I-UPF, where the N4 session modification request message needs to carry a DNS query message forwarding rule, to indicate the I-UPF to forward a DNS query message to the I-SMF after receiving the DNS query message from the UE.

S706. Because the SMF performs DNS resolution before the I-SMF is inserted, after the I-SMF is inserted, the I-SMF does not know domain names of which applications are queried by the terminal apparatus before the insertion, and the I-SMF needs to trigger the terminal apparatus to update a DNS cache, such that the terminal apparatus obtains an IP address of a latest application server when initiating DNS query again in the current location (the location 2). The I-SMF may send DNS cache update indication information to the terminal apparatus using control plane signaling. For example, in S706a, the I-SMF may directly send an N1 SM message to the terminal apparatus via an access network device, where the N1 SM message includes a PCO, and where the PCO includes the DNS cache update indication information used to indicate the terminal apparatus to initiate DNS cache update. Alternatively, in S706b, the I-SMF sends a user plane packet to the terminal apparatus via the I-UPF, where the packet is used to indicate the terminal apparatus to initiate DNS cache update.

S707. The terminal apparatus sends a DNS query request to a core network based on a service requirement of the terminal apparatus via an access network device, to initiate DNS query for an application, where the DNS query request carries a domain name corresponding to the application. Optionally, the DNS query request includes a destination address, and the destination address is an address of the DNS server. The domain name corresponding to the application carried in the DNS query request may be FQDN or a domain name in another form. This is not limited in this application.

S708. After receiving the DNS query request, the I-UPF forwards the DNS query request of the terminal apparatus to the I-SMF based on the indication of the I-SMF in S705.

S709. The I-SMF detects the domain name requested by the terminal apparatus, determines, based on the current location (for example, a TAI) of the terminal apparatus, a deployment location of the application server corresponding to the domain name requested by the terminal apparatus, and further determines the IP address of the application service corresponding to the domain name in the deployment location. For a process of S709, refer to the descriptions of S409a, or S408b and S408c. For brevity, details are not described herein again.

Optionally, the I-SMF may perform a UL CL/BP insertion procedure based on the domain name included in the DNS query request. For a process, refer to the descriptions of S612. For brevity, details are not described herein again.

S710. The I-SMF returns a DNS query response to the I-UPF, where the response includes the IP address of the application server.

S711. The I-UPF returns the DNS query response to the terminal apparatus, where the response includes the IP address of the application server. Subsequently, the terminal apparatus communicates with the application server via the I-UPF using the IP address of the application server included in the DNS query response.

S712. Optionally, the I-SMF may perform the UL CL/BP insertion procedure based on the DNS query response. For example, the I-SMF network element may preconfigure an IP address list, or the I-SMF network element may receive the indication information from the SMF network element in S704, where the indication information includes an IP address list, and where the IP address list includes one or more IP addresses. As long as the IP address included in the DNS query response received by the I-SMF network element belongs to the IP address list, the I-SMF network element selects a UPF 2 (PSA-2) and a UL CL/BP, and performs the UL CL/BP insertion procedure. Alternatively, when the I-SMF network element determines that UL CL/BP insertion is allowed in the deployment location (for example, the MEC platform 2 in Table 1) of the application server corresponding to the IP address (for example, IP-1 in Table 1), the I-SMF selects a UPF 2 (PSA-2) and a UL CL/BP, and performs the UL CL/BP insertion procedure.

According to the domain name query method provided in this embodiment of this application, in an ETSUN scenario, the I-SMF resolves the DNS query request, such that it can be ensured that the terminal apparatus obtains the IP address of the application nearby in the new location, and the UL CL/BP may be further dynamically inserted depending on service access. This implements local traffic steering, optimizes a local service access path, and improves communication efficiency.

Figure 14A:
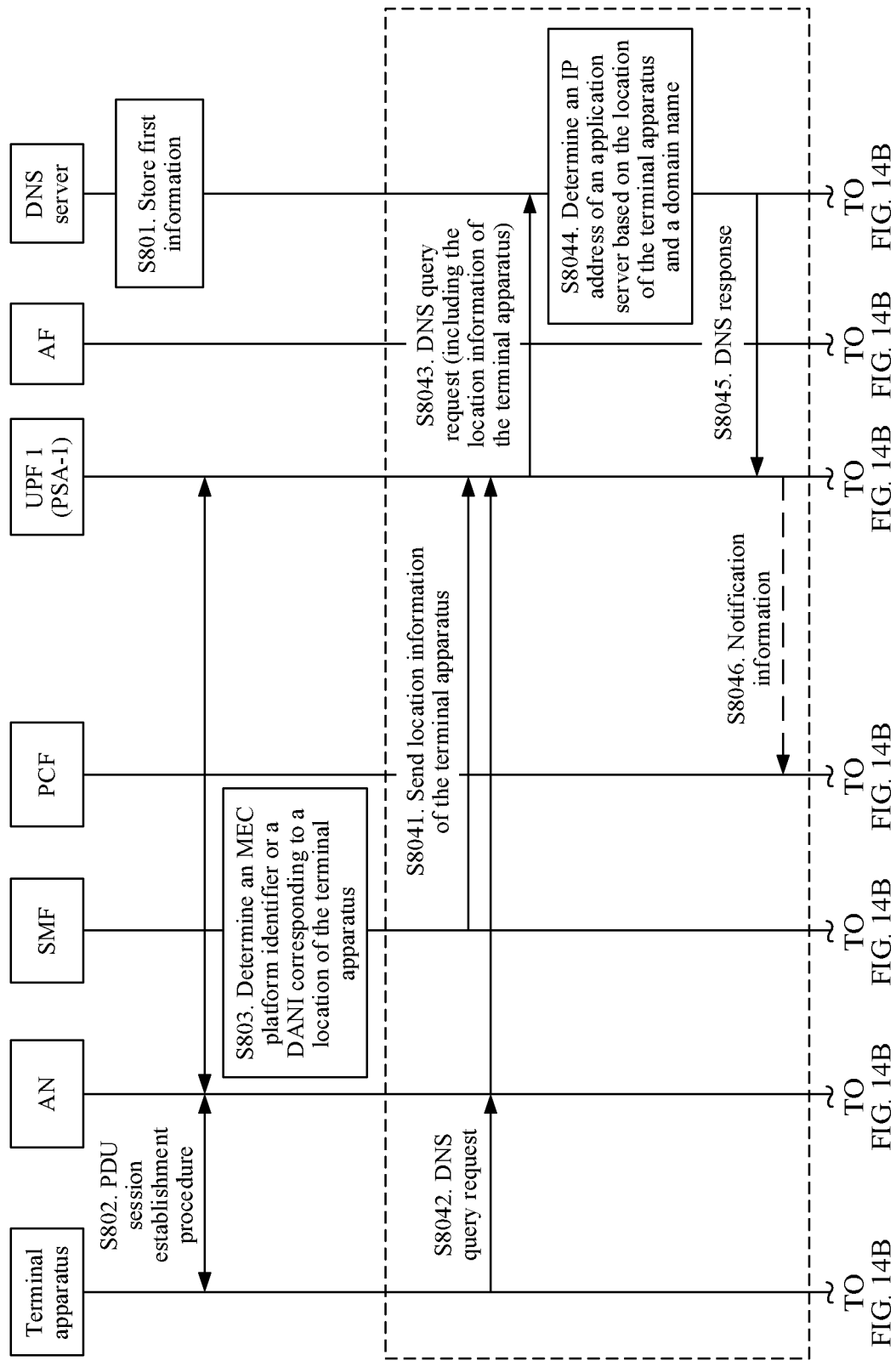
FIG. 14A and FIG. 14B are a schematic interaction diagram of still another domain name system query method according to an embodiment of this application.
Figure 14B:
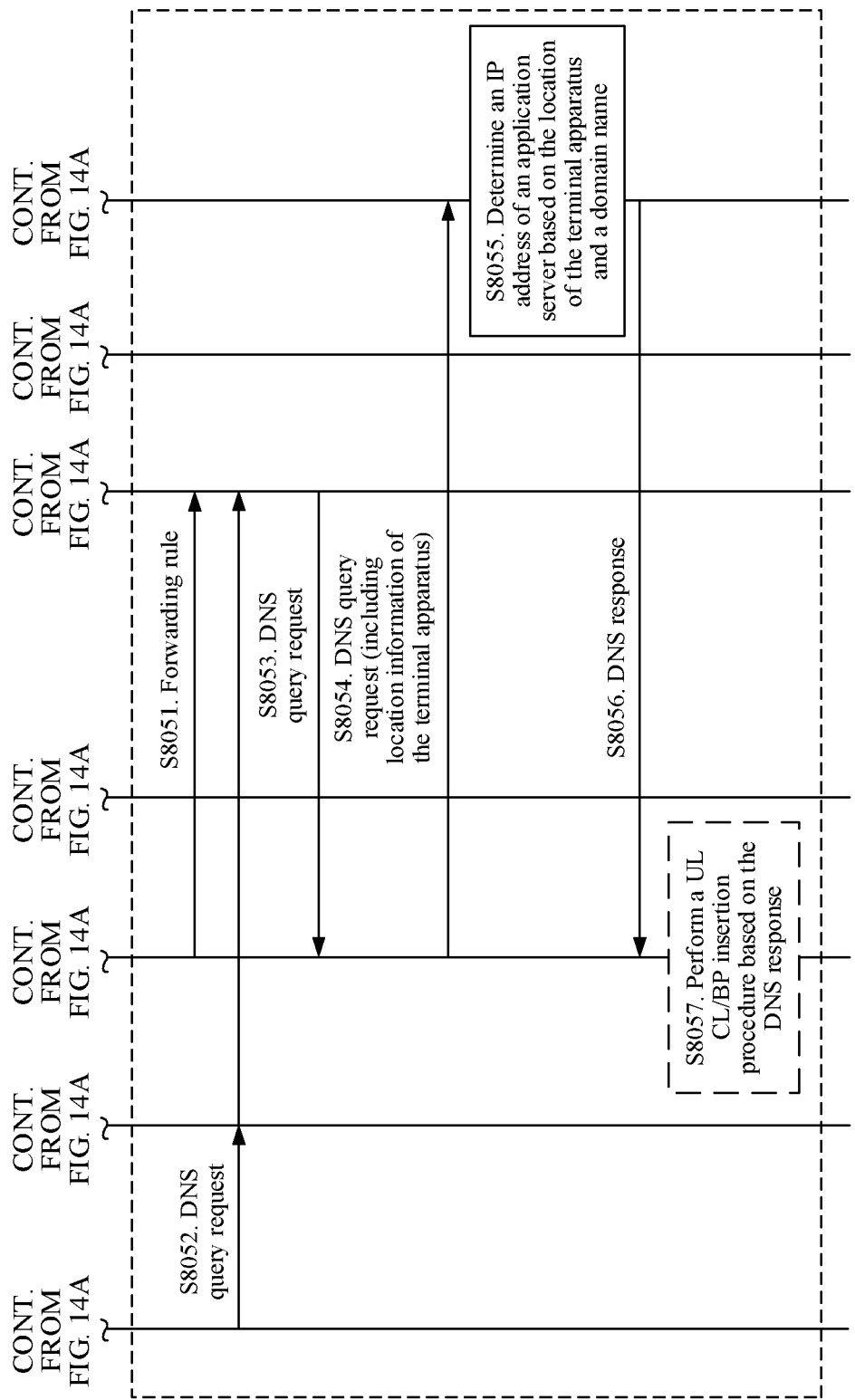

FIG. 14A and FIG. 14B are a schematic flowchart of a domain name system query method 800 according to an embodiment of this application. The method 800 may be applied to the architecture shown in FIG. 1. FIG. 14A and FIG. 14B mainly describe an enhanced DNS server, where the DNS server stores information about the correspondence between the deployment location of the application server, the domain name, and the IP address of the application server described above. After parsing a DNS packet (a DNS query request), an SMF/UPF actively adds a location of a terminal apparatus into the DNS query request, and sends the DNS query request including a domain name queried by the terminal apparatus and the location of the terminal apparatus to the DNS server. The DNS server returns an IP address corresponding to the domain name and the location of the terminal apparatus based on the DNS query request. Further, the SMF may further insert a UL CL/BP for the terminal apparatus based on an IP address in a DNS response message to optimize a local service access path. Descriptions are provided using an example in which a session management network element is an SMF, a policy control function network element is a PCF, a user plane function network element is a UPF, and an application function network element is an AF.

As shown in FIG. 14A and FIG. 14B, the method 800 includes the following steps.

S801. A DNS server stores a correspondence (the foregoing first information) between a deployment location (which, for example, may be represented by an MEC platform identifier or a DNAI) of an application server, a domain name, and an IP address of the application server. A method for obtaining the deployment location of the application server by the DNS server may be as follows: An AF stores the correspondence (the first information) between the deployment location (which, for example, may be represented by an MEC platform identifier or a DNAI) of the application server, the domain name, and the IP address of the application server in the DNS server. Further, the AF may store the first information in a UDR via an NEF network element. For descriptions of this process, refer to the foregoing descriptions of S401. For brevity, details are not described herein again.

S802. A terminal apparatus initiates a PDU session establishment procedure. For example, the terminal apparatus sends parameters such as an identifier of a PDU session, S-NSSAI, and a DNN to an AMF. The AMF selects an SMF based on the S-NSSAI and the DNN, and sends parameters such as an identifier of the SMF network element, a permanent identifier of the terminal apparatus, location information of the terminal apparatus, the identifier of the PDU session, the 5-NSSAI, and the DNN to the SMF network element. The location information of the terminal apparatus includes a TAI of the terminal apparatus.

Optionally, in the PDU session establishment procedure, the SMF obtains the correspondence between the deployment location of the application server, the domain name, and the IP address of the application server via a PCF.

S803. The SMF determines, based on the location information of the terminal apparatus that is obtained in step S802, an MEC platform identifier that can be currently accessed by the terminal apparatus or a DNAI that can be currently accessed by the terminal apparatus.

If a UPF actively adds the location information of the terminal apparatus, a subsequent procedure in S803 is as follows:

S8041. After selecting a UPF 1, the SMF sends the location of the terminal apparatus determined in step S803 to the UPF 1, where the location of the terminal apparatus may be the TAI of the terminal apparatus, the MEC platform identifier that can be currently accessed by the terminal apparatus, or the DNAI that can be currently accessed by the terminal apparatus. The location of the terminal apparatus may alternatively be an identifier of an access network currently serving the terminal apparatus. For example, the identifier of the access network may be a RAN ID or a RAN IP address. For descriptions of the location information of the terminal apparatus, refer to the descriptions in step S231. In addition, the SMF sends indication information to the UPF 1, to indicate the UPF 1 to insert the location information of the terminal apparatus into a DNS query request after receiving the DNS query request of the UE.

S8042. The terminal apparatus sends the DNS query request to the UPF 1 of a core network based on a service requirement of the terminal apparatus via an access network device, to initiate DNS query for an application, where the DNS query request carries a domain name corresponding to the application. Optionally, the DNS query request includes a destination address, and the destination address is an address of the DNS server. The domain name corresponding to the application carried in the DNS query request may be FQDN or a domain name in another form. This is not limited in this application.

S8043. After receiving the DNS query request, the UPF 1 adds the location information of the terminal apparatus received from the SMF in S8041 into the DNS query request, and sends the DNS query request to the DNS server. The location of the terminal apparatus may include the TAI of the terminal apparatus, or include the MEC platform identifier that can be currently accessed by the terminal apparatus or the DNAI that can be currently accessed by the terminal apparatus, and the location of the terminal apparatus may include an identifier of an access network currently serving the terminal apparatus. For example, the identifier of the access network may be a RAN ID or a RAN IP address.

Optionally, the UPF 1 may further determine, based on the domain name or the destination address in the DNS query request, whether to send notification information to the SMF, where the notification information is used by the SMF to select a traffic steering node (for example, a UL CL/BP) and an anchor UPF 2 for the terminal apparatus. For example, a method for determining, by the UPF 1, to send the notification information to the SMF may be as follows: The UPF 1 may preconfigure a first rule, or the UPF 1 receives a first rule from the SMF in step S8041. When the domain name or the destination address meets the first rule, the UPF 1 sends the notification information to the SMF. Correspondingly, the UPF 1 receives identification information of the traffic steering node and the anchor UPF 2 from the SMF.

For example, the first rule includes a destination address list, and the destination address list includes one or more destination addresses. As long as the destination address included in the DNS query request received by the UPF 1 belongs to the destination address list, the UPF 1 determines to send the notification information to the SMF. In other words, if the UPF 1 determines that the destination address included in the DNS query request meets a condition for sending first notification information to the SMF, the UPF 1 sends the notification information to the SMF. The condition may be that the destination address included in the DNS query request is any destination address included in the first rule.

For another example, the first rule includes a domain name list, and the domain name list includes one or more domain names. As long as the domain name included in the DNS query request received by the UPF 1 belongs to the domain name list, the UPF 1 determines to send the notification information to the SMF. In other words, if the UPF 1 determines that the domain name included in the DNS query request meets a condition for sending the notification information to the SMF, the UPF 1 sends the notification information to the SMF. The condition may be that the domain name included in the DNS query request is any domain name included in the first rule.

Further, if the UPF 1 does not receive the location information of the terminal apparatus from the SMF in S8041, after the UPF 1 receives the DNS query request, the UPF 1 may send the DNS query request to the DNS server in either of the following two manners.

Manner 1: The UPF 1 may add the identification information of the UPF 2 into the DNS query request, and send the DNS query request to the DNS server. It should be noted that the UPF 2 herein may be understood as an anchor UPF connected to an MEC platform closest to a current location of the terminal apparatus. The identification information of the UPF 2 may be an ID of the UPF 2 or an IP address of the UPF 2. The identification information of the UPF 2 is obtained by the UPF 1 from the SMF. In an implementation, when the UPF 1 happens to be the anchor UPF connected to the MEC platform closest to the current location of the terminal apparatus, after receiving the DNS query request, the UPF 1 adds identification information of the UPF 1 into the DNS query request, and sends the DNS query request to the DNS server.

Manner 2: The UPF 1 may send a notification message to the SMF network element, where the notification message includes the domain name requested by the terminal apparatus. The SMF determines, based on the correspondence between the deployment location of the application server, the domain name, and the IP address of the application server that is obtained in step S802, the domain name requested by the terminal apparatus, and the TAI of the terminal apparatus, a location of a management platform on which an application server corresponding to the domain name requested by the terminal apparatus is located. The application server may serve the domain name requested by the terminal apparatus, and a deployment location (a location of the management platform) of the application server may be identified by a DNAI. Because the location of the management platform is determined based on the TAI of the terminal apparatus and the domain name requested by the terminal apparatus, the location of the management platform corresponds to the location of the terminal apparatus, and the application server corresponding to the domain name requested by the terminal apparatus is deployed on the management platform. Further, the SMF sends the location information of the terminal apparatus to the UPF 1, such that the UPF 1 inserts the location information of the terminal apparatus into the DNS query request and sends the DNS query request to the DNS server. The location information of the terminal apparatus includes but is not limited to: the TAI of the terminal apparatus, the DNAI used to identify the management platform, identification information of a user plane function network element connected to the management platform, or an IP address pointing to the management platform. The management platform is the management platform that is determined in the foregoing description and on which the application server corresponding to the domain name requested by the terminal apparatus is deployed. For descriptions of the location information of the terminal apparatus, refer to the descriptions in step S231.

Optionally, after the SMF determines, based on the correspondence between the deployment location of the application server, the domain name, and the IP address of the application server that is obtained in step S802, the domain name requested by the terminal apparatus, and the TAI of the terminal apparatus, the location of the management platform on which the application server corresponding to the domain name requested by the terminal apparatus is located, the SMF may further select a UL CL/BP based on the deployment location (identified by the DNAI) of the application server, to implement local service flow steering of the application, and reduce a delay.

S8044. The DNS server determines a corresponding IP address based on the location information of the terminal apparatus and the domain name that are included in the DNS query request. For example, if the location information of the terminal apparatus included in the DNS query request is an MEC platform identifier or a DNAI, the DNS server determines, based on the first information stored in S801 and the MEC platform identifier or the DNAI, the IP address corresponding to the domain name. If the location information of the terminal apparatus included in the DNS query request is the identifier of the access network currently serving the terminal apparatus or the identification information of the UPF 1, the DNS server first determines, based on the identifier of the access network or the identification information of the UPF 1, the MEC platform identifier that can be currently accessed by the terminal apparatus or the DNAI that can be currently accessed by the terminal apparatus. Further, the DNS server determines, based on the first information stored in S801 and the MEC platform identifier or the DNAI, the IP address corresponding to the domain name.

S8045. The DNS server returns the IP address to the UPF 1 via a DNS response message.

S8046. The UPF 1 determines, based on the IP address in the DNS response message, whether to send notification information to the SMF, where the notification information is used to indicate the SMF to insert a UL CL/BP for the terminal apparatus, to optimize a service access path. For example, a method for determining, by the UPF 1, to send the notification information to the SMF may be as follows: The UPF 1 may preconfigure a first rule, or the UPF 1 receives a first rule from the SMF. When the IP address meets the first rule, the UPF 1 sends the first notification information to the session management network element. For example, the first rule includes an IP address list, and the IP address list includes one or more IP addresses. As long as the IP address of the application server in the DNS response belongs to the IP address list, the UPF 1 sends the notification information to the SMF based on the IP address. In other words, if the UPF 1 determines that the IP address in the DNS response message meets a condition for sending the notification information to the SMF, the UPF 1 sends the notification information to the SMF. The condition may be that the IP address of the application server in the DNS response is any IP address included in the first rule.

If the SMF actively adds the location information of the terminal apparatus, a subsequent procedure in S803 is as follows.

S8051. After selecting a UPF 1, the SMF sends a DNS query message forwarding rule to the UPF 1, to indicate the UPF to forward, after receiving a DNS query message of the terminal apparatus, the DNS query message to the SMF.

S8052. The terminal apparatus sends a DNS query request to a core network based on a service requirement of the terminal apparatus via an access network device, to initiate DNS query for an application, where the DNS query request carries a domain name corresponding to the application. Optionally, the DNS query request may further include a destination address, and the destination address is an address of a DNS server.

S8053. After receiving the DNS query request, the UPF 1 forwards the DNS query request to the SMF.

S8054. After receiving the DNS query request, the SMF determines, based on the correspondence between the deployment location of the application server, the domain name, and the IP address of the application server that is obtained in step S802, the domain name requested by the terminal apparatus, and the TAI of the terminal apparatus, a location of a management platform on which an application server corresponding to the domain name requested by the terminal apparatus is located. The application server may serve the domain name requested by the terminal apparatus, and a deployment location (a location of the management platform) of the application server may be identified by a DNAI. Because a location of the management platform is determined based on the TAI of the terminal apparatus and the domain name requested by the terminal apparatus, the location of the management platform corresponds to a location of the terminal apparatus, and the application server corresponding to the domain name requested by the terminal apparatus is deployed on the management platform. The SMF adds the location information of the terminal apparatus into the DNS query request, and sends the DNS query request to the DNS server. The location information of the terminal apparatus includes but is not limited to: the TAI of the terminal apparatus, the DNAI used to identify the management platform, identification information of a user plane function network element connected to the management platform, or an IP address pointing to the management platform. The management platform is the management platform that is determined in the foregoing description and on which the application server corresponding to the domain name requested by the terminal apparatus is deployed. For descriptions of the location information of the terminal apparatus, refer to the descriptions in step S231.

Optionally, the SMF may alternatively determine, based on the domain name included in the DNS query request, whether to perform a UL CL/BP insertion procedure. For example, the SMF network element may preconfigure a domain name list, or the SMF network element may receive the PCC rule from the PCF network element, where the PCC rule includes a domain name list, and where the domain name list includes one or more domain names. As long as the domain name included in the DNS query request received by the SMF network element belongs to the domain name list, the SMF network element selects a UPF 2 (PSA-2) and a UL CL/BP, and performs the UL CL/BP insertion procedure.

Optionally, the SMF may further determine, based on the destination address included in the DNS query request, whether to select the first traffic steering node and the first PSA for the terminal apparatus, where the destination address may be understood as the address of the DNS server. When the SMF determines that the address of the DNS server points to a third party (for example, Tencent or Alibaba), and an application server of the third party is deployed in a current location, the SMF determines to select the first traffic steering node and the first PSA for the terminal apparatus. In the foregoing method, if the SMF selects to insert a BP, the SMF further needs to assign a new IPv6 prefix to the terminal apparatus, and send the new IPv6 prefix to the terminal apparatus via PSA-1. Subsequently, the terminal apparatus may access the application server via PSA-2.

S8055. The DNS server determines a corresponding IP address based on the location information of the terminal apparatus and the domain name that are included in the DNS query request. For example, if the location information of the terminal apparatus included in the DNS query request is an MEC platform identifier or a DNAI, the DNS server determines, based on the first information stored in S801 and the MEC platform identifier or the DNAI, the IP address corresponding to the domain name. If the location information of the terminal apparatus included in the DNS query request is the identifier of the access network currently serving the UE or identification information of a UPF, the DNS server first determines, based on the identifier of the access network or the identification information of the UPF, the MEC platform identifier that can be currently accessed by the terminal apparatus or the DNAI that can be currently accessed by the terminal apparatus. Further, the DNS server determines, based on the first information stored in S801 and the MEC platform identifier or the DNAI, the IP address corresponding to the domain name. For the identification information of the UPF, refer to the descriptions of the identification information of the UPF 2 described in S8043 or S8044. For brevity, details are not described herein again.

S8056. The DNS server returns the IP address to the SMF via a DNS response message.

S8057. Optionally, the SMF may perform the UL CL/BP insertion procedure based on the DNS query response. For example, the SMF network element may preconfigure an IP address list, or the SMF network element may receive the PCC rule from the PCF network element, where the PCC rule includes an IP address list, and where the IP address list includes one or more IP addresses. As long as the IP address included in the DNS query response received by the SMF network element belongs to the IP address list, the SMF network element selects the UPF 2 (PSA-2) and a UL CL/BP, and performs the UL CL/BP insertion procedure. Alternatively, when the SMF network element determines that UL CL/BP insertion is allowed in the deployment location (for example, the MEC platform 2 in Table 1) of the application server corresponding to the IP address (for example, IP-1 in Table 1), the SMF selects a UPF 2 (PSA-2) and a UL CL/BP, and performs the UL CL/BP insertion procedure. The SMF inserts the UL CL/BP for the terminal apparatus, to optimize a service access path.

It should be understood that, in the foregoing procedure, the SMF/UPF itself performs the following operations based on the location information of the terminal apparatus (for example, the TAI, or the IP address of the user plane function network element, or the IP address of the radio access network accessed by the terminal): determining the corresponding MEC platform identifier or the corresponding DNAI, and adding the MEC platform identifier or the DNAI into the DNS query request. Optionally, the DNS server may further determine the MEC platform or the DNAI based on the location (for example, the TAI) of the terminal apparatus. Therefore, after parsing out the DNS packet (the DNS query request), the SMF/UPF may further add the location information (for example, the TAI) of the terminal apparatus into the DNS query request and send the DNS query request to the DNS server. After receiving the location information of the terminal apparatus, the DNS server determines the MEC platform identifier or the DNAI based on the TAI, and further determines the IP address of the application based on the MEC platform identifier or the DNAI and the domain name in the DNS query request.

Because the terminal apparatus is mobile, if the terminal apparatus moves, the SMF/UPF needs to add latest location information of the terminal apparatus into the DNS query request after parsing the DNS query request. The DNS server returns a corresponding IP address based on the location information of the terminal apparatus and the domain name included in the DNS query request. A DNS query procedure in a scenario in which the terminal apparatus moves is similar to that in FIG. 14A and FIG. 14B. A difference lies in that if the UPF actively adds the location information of the terminal apparatus, once the SMF detects that movement of the terminal apparatus causes a change of the location of the terminal apparatus (for example, a change of the corresponding MEC platform identifier or the corresponding DNAI), the SMF needs to send a new location (for example, an identifier of a new MEC platform or a new DNAI) of the terminal apparatus to the UPF. This can ensure that after receiving the DNS query request of the terminal apparatus, the UPF adds a latest MEC platform identifier or a latest DNAI corresponding to a latest location of the terminal apparatus, or the latest location information of the terminal apparatus. If the SMF actively adds the location of the terminal apparatus, once the SMF detects that movement of the terminal apparatus causes a change of the MEC platform identifier or the DNAI, the SMF needs to add an identifier of a new MEC platform or a new DNAI or latest location information of the terminal apparatus into the DNS query request, and send the DNS query request to the DNS server.

According to the domain name query method provided in this embodiment of this application, the DNS server is enhanced, such that the DNS server stores the correspondence between the deployment location (for example, an MEC platform identifier or a DNAI) of the application server, the domain name, and the IP address of the application server. After parsing the DNS query request, the SMF/UPF actively adds the location of the terminal apparatus into the DNS query request, and sends the DNS query request to the DNS server, and the DNS server returns the corresponding IP address based on the location of the terminal apparatus and the domain name included in the DNS query request. Further, the SMF/UPF may further trigger, based on the DNS response message, the SMF to insert the UL CL/BP to optimize a local service access path. This can ensure that the terminal apparatus obtains an IP address of an application nearby in a new location, and that the UL CL/BP may be dynamically inserted depending on service access, to implement local traffic steering, optimize a service access path, and improve communication efficiency.

Figure 15A:
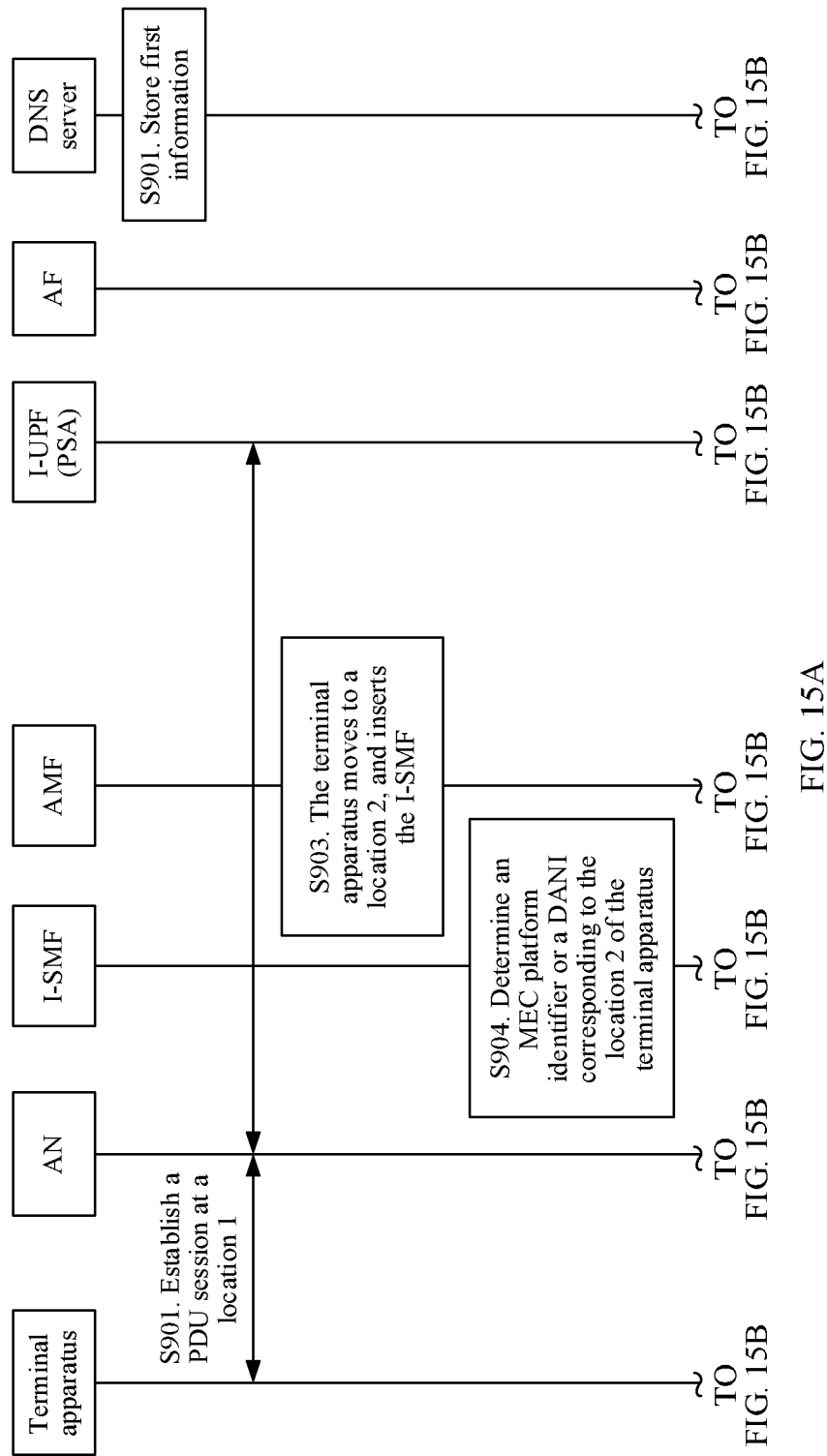
Figure 15C:
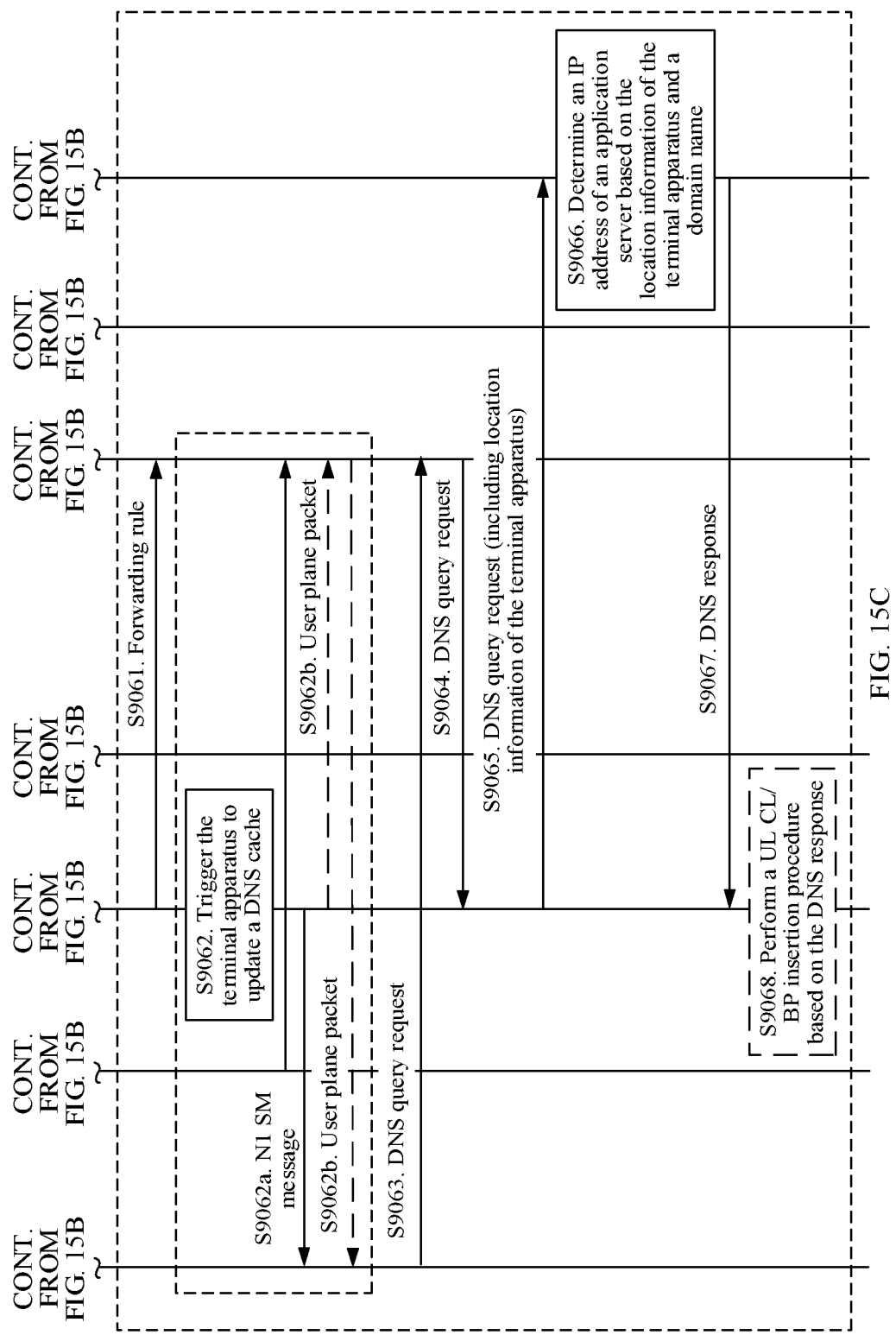

FIG. 15A to FIG. 15C are a schematic flowchart of a domain name system query method 900 according to an embodiment of this application. The method 600 may be applied to the architecture shown in FIG. 1. FIG. 15A to FIG. 15C mainly describe an ETSUN scenario in which an I-SMF/I-UPF actively adds, based on a location (for example, a TAI) of a terminal apparatus, a deployment location (which may be represented by an MEC platform identifier or a DNAI) of an application server corresponding to the location of the terminal apparatus. As shown in FIG. 15A to FIG. 15C, the method 900 includes the following steps.

S901. A DNS server stores a correspondence (the foregoing first information) between a deployment location of an application server, a domain name, and an IP address of the application server. A method for obtaining the deployment location of the application server by the DNS server may be as follows: An AF stores the correspondence (the foregoing first information) between the deployment location (which, for example, may be represented by an MEC platform identifier or a DNAI) of the application server, the domain name, and the IP address of the application server in the DNS server. Further, the AF may store the first information in a UDR via an NEF network element. For descriptions of this process, refer to the foregoing descriptions of S401. For brevity, details are not described herein again.

S902. The terminal apparatus initiates a session establishment procedure in a location 1 (for example, a TAI 1).

S903. When the terminal apparatus moves from the location 1 (the TAI 1) to a location 2 (a TAI 2), if an AMF determines that the terminal apparatus moves out of a serving range of an SMF, the AMF inserts an I-SMF.

Optionally, in the PDU session establishment procedure, the I-SMF obtains the correspondence between the deployment location of the application server, the domain name, and the IP address of the application server from the PCF via the SMF.

S904. The I-SMF determines, based on the location information of the terminal apparatus, an MEC platform identifier that can be currently accessed by the terminal apparatus or a DNAI that can be currently accessed by the terminal apparatus. The location information of the terminal apparatus is obtained by the I-SMF from the AMF. The obtaining method may be that the I-SMF subscribes to the location information of the terminal apparatus from the AMF after the I-SMF is inserted. In this way, when the terminal apparatus moves, the AMF may provide the I-SMF with latest location information of the terminal apparatus.

If a UPF actively adds the location information of the terminal apparatus, a subsequent procedure in S904 is as follows:

S9051. The I-SMF selects an I-UPF, and sends the location of the terminal apparatus determined in step S904 to the I-UPF, where the location of the terminal apparatus may be a TAI of the terminal apparatus, or an MEC platform identifier or a DNAI corresponding to the TAI of the terminal apparatus. The location of the terminal apparatus may alternatively be an identifier of an access network currently serving the terminal apparatus. For example, the identifier of the access network may be a RAN ID or a RAN IP address. For descriptions of the location information of the terminal apparatus, refer to the descriptions in step S231. In addition, the I-SMF sends indication information to the I-UPF, to indicate the I-UPF to insert the location information of the terminal apparatus into a DNS query message of the terminal apparatus after receiving the DNS query message.

S9052. Because the SMF performs DNS resolution before the I-SMF is inserted, after the I-SMF is inserted, the I-SMF does not know domain names of which applications are queried by the terminal apparatus before the insertion, and the I-SMF needs to trigger the terminal apparatus to update a DNS cache, such that the terminal apparatus obtains an IP address of a latest application server when initiating DNS query again in the current location (the location 2). For example, in S9052a, the I-SMF may directly send an N1 SM message to the terminal apparatus via an access network device, where the N1 SM message includes a PCO, and where the PCO includes the DNS cache update indication information used to indicate the terminal apparatus to initiate DNS cache update. Alternatively, in S9052b, the I-SMF sends a user plane packet to the terminal apparatus via the I-UPF, where the packet is used to indicate the terminal apparatus to initiate DNS cache update.

S9053. The terminal apparatus sends a DNS query request to a core network based on a service requirement of the terminal apparatus via an access network device, to initiate DNS query for an application, where the DNS query request carries a domain name corresponding to the application. Optionally, the DNS query request includes a destination address, and the destination address is an address of the DNS server.

S9054. After receiving the DNS query request, the I-UPF adds the location information of the terminal apparatus received from the I-SMF in S9051 into the DNS query request, and sends the DNS query request to the DNS server. Optionally, the I-UPF may further determine, based on the domain name or the destination address in the DNS query request, whether to send notification information to the I-SMF, where the notification information is used by the I-SMF to select a traffic steering node (for example, a UL CL/BP) and an anchor UPF for the terminal apparatus, to optimize a service access path. For example, a method for determining, by the I-UPF, to send the notification information to the I-SMF may be as follows: The I-UPF may preconfigure a first rule, or the I-UPF receives a first rule from the I-SMF. When the domain name or the destination address meets the first rule, the I-UPF sends the notification information to the I-SMF. Correspondingly, the I-UPF receives identification information of the traffic steering node and an anchor UPF 2 from the I-SMF.

For example, the first rule includes a destination address list, and the destination address list includes one or more destination addresses. As long as the destination address included in the DNS query request received by the I-UPF belongs to the destination address list, the I-UPF determines to send the notification information to the I-SMF. In other words, if the I-UPF determines that the destination address included in the DNS query request meets a condition for sending first notification information to the I-SMF, the I-UPF sends the notification information to the I-SMF. The condition may be that the destination address included in the DNS query request is any destination address included in the first rule.

For another example, the first rule includes a domain name list, and the domain name list includes one or more domain names. As long as the domain name included in the DNS query request received by the I-UPF belongs to the domain name list, the I-UPF determines to send the notification information to the I-SMF. In other words, if the I-UPF determines that the domain name included in the DNS query request meets a condition for sending the notification information to the I-SMF, the I-UPF sends the notification information to the I-SMF. The condition may be that the domain name included in the DNS query request is any domain name included in the first rule.

If the I-UPF does not receive the location information of the terminal apparatus from the I-SMF in S9051, after the I-UPF receives the DNS query request, the I-UPF may send the DNS query request to the DNS server in either of the following two manners.

Manner 1: The I-UPF may add the identification information of the UPF 2 into the DNS query request, and send the DNS query request to the DNS server. It should be noted that the UPF 2 herein may be understood as a UPF connected to an MEC platform closest to a current location of the terminal apparatus. The identification information of the UPF 2 may be an ID of the UPF 2 or an IP address of the UPF 2.

Manner 2: The I-UPF may send a notification message to the I-SMF network element, where the notification message includes the domain name requested by the terminal apparatus. The I-SMF determines, based on the correspondence between the deployment location of the application server, the domain name, and the IP address of the application server that is obtained in step S903, the domain name requested by the terminal apparatus, and the TAI of the terminal apparatus, a location of a management platform on which an application server corresponding to the domain name requested by the terminal apparatus is located. The application server may serve the domain name requested by the terminal apparatus, and a deployment location (a location of the management platform) of the application server may be identified by a DNAI. Because a location of the management platform is determined based on the TAI of the terminal apparatus and the domain name requested by the terminal apparatus, the location of the management platform corresponds to a location of the terminal apparatus, and the application server corresponding to the domain name requested by the terminal apparatus is deployed on the management platform. The I-SMF sends the location information of the terminal apparatus to the I-UPF, such that the I-UPF inserts the location information of the terminal apparatus into the DNS query and sends the location information to the DNS server. The location information of the terminal apparatus includes but is not limited to: the TAI of the terminal apparatus, the DNAI used to identify the management platform, identification information of a user plane function network element connected to the management platform, or an IP address pointing to the management platform. The management platform is the management platform that is determined in the foregoing description and on which the application server corresponding to the domain name requested by the terminal apparatus is deployed. For descriptions of the location information of the terminal apparatus, refer to the descriptions in step S231.

Optionally, after the I-SMF determines, based on the correspondence between the deployment location of the application server, the domain name, and the IP address of the application server that is obtained in step S903, the domain name requested by the terminal apparatus, and the TAI of the terminal apparatus, the location of the management platform on which the application server corresponding to the domain name requested by the terminal apparatus is located, the I-SMF may further select a UL CL/BP based on the deployment location (identified by the DNAI) of the application server, to implement local service flow steering of the application, and reduce a delay.

S9055. The DNS server determines a corresponding IP address based on the location information of the terminal apparatus and the domain name that are included in the DNS query request. For example, if the location information of the terminal apparatus included in the DNS query request is an MEC platform identifier or a DNAI, the DNS server determines, based on the first information stored in S901 and the MEC platform identifier or the DNAI, the IP address corresponding to the domain name. If the location information of the terminal apparatus included in the DNS query request is the identifier of the access network currently serving the terminal apparatus or the identification information of the UPF2, the DNS server first determines, based on the identifier of the access network or the identification information of the UPF2, the MEC platform identifier that can be currently accessed by the terminal apparatus or the DNAI that can be currently accessed by the terminal apparatus. Further, the DNS server determines, based on the first information stored in S901 and the MEC platform identifier or the DNAI, the IP address corresponding to the domain name.

S9056. The DNS server returns the IP address to the I-UPF via a DNS response.

S9057. The I-UPF determines, based on the IP address (for example, IP-1 in Table 1) included in the DNS response message, whether to send notification information to the I-SMF, where the notification information is used to indicate the I-SMF to insert a UL CL/BP for the terminal apparatus, to optimize a local service access path. For example, a method for determining, by the I-UPF, to send the notification information to the I-SMF may be as follows: The I-UPF may preconfigure a first rule, or the I-UPF receives a first rule from the I-SMF. When the IP address included in the DNS response message meets the first rule, the I-UPF determines to send the notification information to the I-SMF.

For example, the first rule includes an IP address list, and the IP address list includes one or more IP addresses. As long as the IP address (for example, IP-1 in Table 1) in the DNS response message belongs to the IP address list, the I-UPF sends the notification information to the I-SMF based on the IP address. In other words, if the I-UPF determines that the IP address in the DNS response message meets a condition for sending the notification information to the I-SMF, the I-UPF sends the notification information to the I-SMF. The condition may be that the IP address of the application server in the DNS response is any IP address included in the first rule.

If the I-SMF actively adds the location information of the terminal apparatus, a subsequent procedure in S904 is as follows:

S9061. The I-SMF selects an I-UPF, and sends a DNS query message forwarding rule to the I-UPF, to indicate the I-UPF to forward, after receiving a DNS query request of the terminal apparatus, the DNS query request to the I-SMF.

S9062. Because the SMF performs DNS resolution before the I-SMF is inserted, after the I-SMF is inserted, the I-SMF does not know domain names of which applications are queried by the terminal apparatus before the insertion, and the I-SMF needs to trigger the terminal apparatus to update a DNS cache, such that the terminal apparatus obtains an IP address of a latest application server when initiating DNS query again in the current location (the location 2). For example, in S9062a, the I-SMF may directly send an N1 SM message to the terminal apparatus via an access network device, where the N1 SM message includes a PCO, and where the PCO includes the DNS cache update indication information used to indicate the terminal apparatus to initiate DNS cache update. Alternatively, in S9062b, the I-SMF sends a user plane packet to the terminal apparatus via the I-UPF, where the packet is used to indicate the terminal apparatus to initiate DNS cache update.

S9063. The terminal apparatus sends a DNS query request to a core network based on a service requirement of the terminal apparatus via an access network device, to initiate DNS query for an application, where the DNS query request carries a domain name corresponding to the application. Optionally, the DNS query request includes a destination address, and the destination address is an address of the DNS server.

S9064. After receiving the DNS query request, the I-UPF forwards the DNS query request to the I-SMF.

S9065. After receiving the DNS query request, the I-SMF determines, based on the correspondence between the deployment location of the application server, the domain name, and the IP address of the application server that is obtained in step S903, the domain name requested by the terminal apparatus, and the TAI of the terminal apparatus, a location of a management platform on which an application server corresponding to the domain name requested by the terminal apparatus is located. The application server may serve the domain name requested by the terminal apparatus, and a deployment location of the application server may be identified by a DNAI. Because a location of the management platform is determined based on the TAI of the terminal apparatus and the domain name requested by the terminal apparatus, the location of the management platform corresponds to a location of the terminal apparatus, and the application server corresponding to the domain name requested by the terminal apparatus is deployed on the management platform. Further, the I-SMF adds the location information of the terminal apparatus into the DNS query request, and sends the DNS query request to the DNS server. The location information of the terminal apparatus includes but is not limited to: the TAI of the terminal apparatus, the DNAI used to identify the management platform, identification information of a user plane function network element connected to the management platform, or an IP address pointing to the management platform. The management platform is the management platform that is determined in the foregoing description and on which the application server corresponding to the domain name requested by the terminal apparatus is deployed. For descriptions of the location information of the terminal apparatus, refer to the descriptions in step S231.

Optionally, the I-SMF may determine, based on the domain name included in the DNS query request, whether to perform a UL CL/BP insertion procedure. For example, the I-SMF network element may preconfigure a domain name list, or the I-SMF network element may receive the PCC rule from the PCF network element, where the PCC rule includes a domain name list, and where the domain name list includes one or more domain names. As long as the domain name included in the DNS query request received by the I-SMF network element belongs to the domain name list, the I-SMF network element selects a UPF 2 (PSA-2) and a UL CL/BP, and performs the UL CL/BP insertion procedure. Optionally, the SMF may alternatively determine, based on the destination address included in the DNS query request, whether to select a UPF 2 (PSA-2) and a UL CL/BP for the terminal apparatus, where the destination address may be understood as an address of a DNS server. When the SMF determines that the address of the DNS server points to a third party (for example, Tencent or Alibaba), and an application server of the third party is deployed in the current location, the SMF determines to select the UPF 2 (PSA-2) and the UL CL/BP for the terminal apparatus. In the foregoing method, if the I-SMF selects to insert a BP, the I-SMF further needs to assign a new IPv6 prefix to the terminal apparatus, and send the new IPv6 prefix to the terminal apparatus via PSA-1. Subsequently, the terminal apparatus may access the application server via PSA-2.

S9066. The DNS server determines a corresponding IP address based on the location of the terminal apparatus and the domain name that are included in the DNS query request. A process is similar to S9055. For descriptions, refer to the foregoing descriptions of S9055. For brevity, details are not described herein again.

S9067. The DNS server returns the IP address to the I-SMF via a DNS response message.

S9068. Optionally, the I-SMF may perform the UL CL/BP insertion procedure based on the DNS query response. For example, the I-SMF network element may preconfigure an IP address list, or the I-SMF network element may receive the PCC rule from the PCF network element, where the PCC rule includes an IP address list, and where the IP address list includes one or more IP addresses. As long as the IP address included in the DNS query response received by the I-SMF network element belongs to the IP address list, the I-SMF network element selects the UPF 2 (PSA-2) and a UL CL/BP, and performs the UL CL/BP insertion procedure. Alternatively, when the I-SMF network element determines that UL CL/BP insertion is allowed in the deployment location (for example, the MEC platform 2 in Table 1) of the application server corresponding to the IP address (for example, IP-1 in Table 1), the I-SMF selects a UPF 2 (PSA-2) and a UL CL/BP, and performs the UL CL/BP insertion procedure. The terminal apparatus optimizes the path for local service access.

It should be understood that, in the foregoing procedure, the I-SMF/I-UPF itself performs the following operations based on the location information of the terminal apparatus (for example, the TAI, or the IP address of the user plane function network element serving the terminal apparatus, or the IP address of the radio access network accessed by the terminal): determining the corresponding MEC platform identifier or the corresponding DNAI, and adding the MEC platform identifier or the DNAI into the DNS query request. Optionally, the DNS server itself determines the MEC platform or the DNAI based on the location (for example, the TAI) of the terminal apparatus. Therefore, after parsing out the DNS packet (the DNS query request), the I-SMF/I-UPF itself may further add the location information (for example, the TAI) of the terminal apparatus into the DNS query request and send the DNS query request to the DNS server. After receiving the location information of the terminal apparatus, the DNS server determines the MEC platform identifier or the DNAI based on the TAI, and further determines the IP address of the application based on the MEC platform identifier or the DNAI and the domain name in the DNS query request.

According to the domain name query method provided in this embodiment of this application, in an ETSUN scenario, the DNS server is enhanced, such that the DNS server stores the correspondence between the deployment location of the application server, the domain name, and the IP address of the application server. After parsing the DNS query request, the I-SMF/I-UPF actively adds the location of the terminal apparatus into the DNS query request, and sends the DNS query request to the DNS server. The DNS server returns the corresponding IP address based on the location of the terminal apparatus and the domain name that are included in the DNS query request. Further, the I-SMF/I-UPF triggers, based on the DNS response message, the I-SMF to insert the UL CL/BP to optimize the local service access path. This can ensure that the terminal apparatus obtains an IP address of an application nearby in a new location, and that the UL CL/BP may be dynamically inserted depending on service access, to implement local traffic steering, optimize a service access path, and improve communication efficiency.

Figure 16:
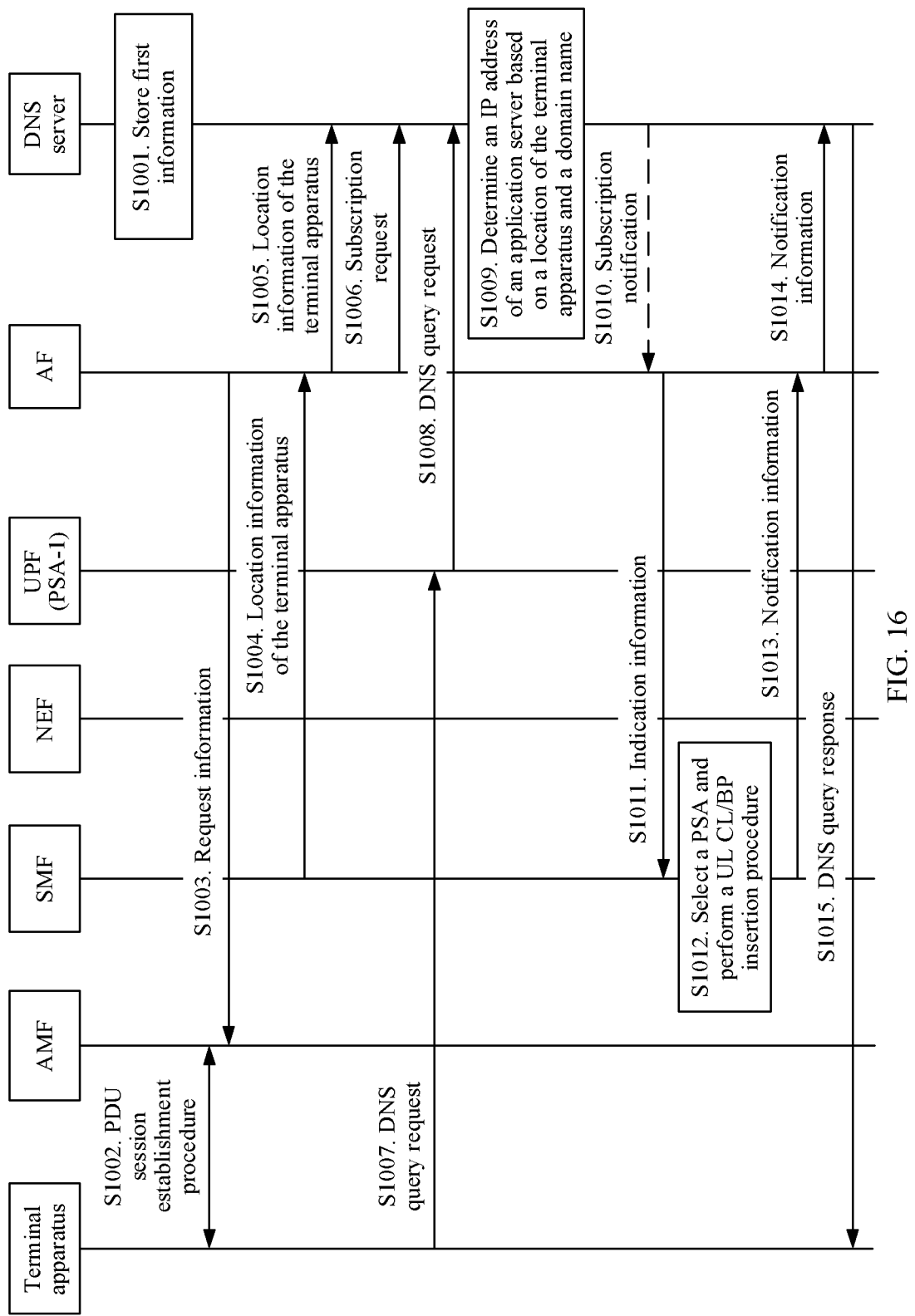
FIG. 16 is a schematic interaction diagram of still another domain name system query method according to an embodiment of this application.

FIG. 16 is a schematic flowchart of a domain name system query method 600 according to an embodiment of this application. The method 600 may be applied to the architecture shown in FIG. 1. The method shown in FIG. 16 is mainly as follows: Location information of UE may be obtained by an application function network element (for example, an AF) from a core network through capability exposure, and then the application function network element notifies a DNS server. The DNS server determines a corresponding IP address based on a domain name included in a DNS query request and the location information of the terminal apparatus, and returns the IP address. As shown in FIG. 16, the method 1000 includes the following steps.

S1001. A DNS server stores a correspondence (the foregoing first information) between a deployment location (which, for example, may be represented by an MEC platform identifier or a DNAI) of an application server, a domain name, and an IP address of the application server. A method for obtaining the deployment location of the application server by the DNS server may be as follows: An AF stores the correspondence (the foregoing first information) between the deployment location (which, for example, may be represented by an MEC platform identifier or a DNAI) of the application server, the domain name, and the IP address of the application server in the DNS server. Further, the AF may store the first information in a UDR via an NEF network element. For descriptions of this process, refer to the foregoing descriptions of S401. For brevity, details are not described herein again.

S1002. A terminal apparatus initiates a PDU session establishment procedure.

S1003. The AF requests, via the NEF, location information of the terminal apparatus from the AMF or the SMF, where the request message carries an identifier of the terminal apparatus.

S1004. The AMF or the SMF sends the location information of the terminal apparatus to the AF. The location information of the terminal apparatus may be a TAI of the terminal apparatus, or the MEC platform identifier that can be currently accessed by the terminal apparatus or the DNAI that can be currently accessed by the terminal apparatus, and the location of the terminal apparatus may alternatively be an identifier of an access network currently serving the terminal apparatus. For example, the identifier of the access network may be a RAN ID or a RAN IP address. For descriptions of the location information of the terminal apparatus, refer to the descriptions in step S231.

S1005. The AF provides the location information of the terminal apparatus for the DNS server. Optionally, the AF may alternatively send an IP address and an application identifier of the terminal apparatus to the DNS server. The DNS server stores the information.

S1006. The AF sends a subscription request to the DNS server, where the subscription request carries the application identifier and a subscription event. The subscription event may be: When the DNS server determines that a domain name of an application requested by the terminal apparatus meets a condition, the DNS server notifies the AF. For example, the DNS server may preconfigure a domain name list or may obtain the domain name list using another method, where the domain name list includes one or more domain names. As long as the domain name included in a DNS query request received by the DNS server is any domain name in the domain name list, the DNS server notifies the AF. In other words, as long as the domain name included in the DNS query request received by the DNS server network element meets a condition for sending a subscription notification to the AF, the DNS server sends the subscription notification message to the AF.

Optionally, the subscription event sent by the AF to the DNS server may alternatively be: When the DNS server determines that an IP address of the application requested by the terminal apparatus meets a condition, the DNS server notifies the AF. For example, the DNS server may preconfigure an IP address list or may obtain the IP address list using another method, where the IP address list includes one or more IP addresses. As long as an IP address included in a DNS query request received by the DNS server network element is any IP address in the IP address list, the DNS server notifies the AF.

S1007. The terminal apparatus sends the DNS query request to a core network based on a service requirement of the terminal apparatus via an access network device, to initiate DNS query for an application, where the DNS query request carries a domain name corresponding to the application. Optionally, the DNS query request includes a destination address, and the destination address is an address of the DNS server.

S1008. After receiving the DNS query request, a UPF forwards the DNS query request to the DNS server.

Optionally, the UPF may further determine, based on the domain name or the destination address in the DNS query request, whether to send notification information to the SMF, where the notification information is used to indicate the SMF to select a traffic steering node and an anchor PSA-2, to optimize a service access path. For example, a method for determining, by the UPF, to send the notification information to the SMF may be as follows: The UPF may preconfigure a first rule, or the UPF receives a first rule from the SMF. When the domain name or the destination address meets the first rule, the UPF sends the notification information to the SMF.

For example, the first rule includes a destination address list, and the destination address list includes one or more destination addresses. As long as the destination address included in the DNS query request received by the UPF belongs to the destination address list, the UPF determines to send the notification information to the SMF. In other words, if the UPF determines that the destination address included in the DNS query request meets a condition for sending first notification information to the SMF, the UPF sends the notification information to the SMF. The condition may be that the destination address included in the DNS query request is any destination address included in the first rule.

For another example, the first rule includes a domain name list, and the domain name list includes one or more domain names. As long as the domain name included in the DNS query request received by the UPF belongs to the domain name list, the UPF determines to send the notification information to the SMF. In other words, if the UPF determines that the domain name included in the DNS query request meets a condition for sending the notification information to the SMF, the UPF sends the notification information to the SMF. The condition may be that the domain name included in the DNS query request is any domain name included in the first rule.

Optionally, the SMF may obtain the DNS query request, and determine, based on the domain name or the destination address included in the DNS query request, whether to perform the UL CL/BP insertion procedure. For a process, refer to the descriptions of S612. For brevity, details are not described herein again.

S1009. The DNS server determines the corresponding IP address based on the location information of the terminal apparatus and the domain name. For example, if the location information of the terminal apparatus included in the DNS query request is an MEC platform identifier or a DNAI, the DNS server determines, based on the first information stored in S1001 and the MEC platform identifier or the DNAI, the IP address corresponding to the domain name. If the location information of the terminal apparatus included in the DNS query request is the identification information of the access network currently serving the terminal apparatus, the DNS server first determines, based on the identification information of the access network, the MEC platform identifier that can be currently accessed by the terminal apparatus or the DNAI that can be currently accessed by the terminal apparatus. Further, the DNS server determines, based on the first information stored in S801 and the MEC platform identifier or the DNAI, the IP address corresponding to the domain name.

S1010. Optionally, the DNS server sends subscription notification information to the AF based on the subscription request in step S1006 if the DNS server determines that the domain name or the IP address of the application requested by the terminal apparatus meets a condition for sending a subscription notification to the AF. Optionally, the subscription notification information carries indication information. The indication information is used to indicate AF that the domain name or the IP address that meets the condition is obtained during the DNS query. In addition, the DNS server does not send a DNS response message to the terminal apparatus temporarily, and waits for a reply from the AF all the time.

S1011. The AF sends the indication information to the SMF via the NEF, to indicate the SMF to perform traffic steering for the PDU session of the terminal apparatus.

S1012. The SMF selects a PSA and a UL CL/BP, performs a UL CL/BP insertion procedure, and optimizes a service access path.

S1013. The SMF sends notification information to the AF, to notify the AF that traffic steering for the PDU session of the terminal apparatus succeeds.

S1014. The AF sends a notification message to the DNS server, to indicate the DNS to return the IP address of the application to the terminal apparatus.

S1015. The DNS server returns the IP address of the application in the DNS response message to the terminal apparatus.

According to the domain name query method provided in this embodiment of this application, the DNS server may obtain the location information of the terminal apparatus by itself, determine, based on information about the domain name included in the DNS query request of the terminal apparatus, the IP address of the application server corresponding to the location of the terminal apparatus and the domain name, and feed back the IP address of the application server to the terminal apparatus. This improves efficiency of determining the IP address of the application server by the DNS server.

Figure 17A:
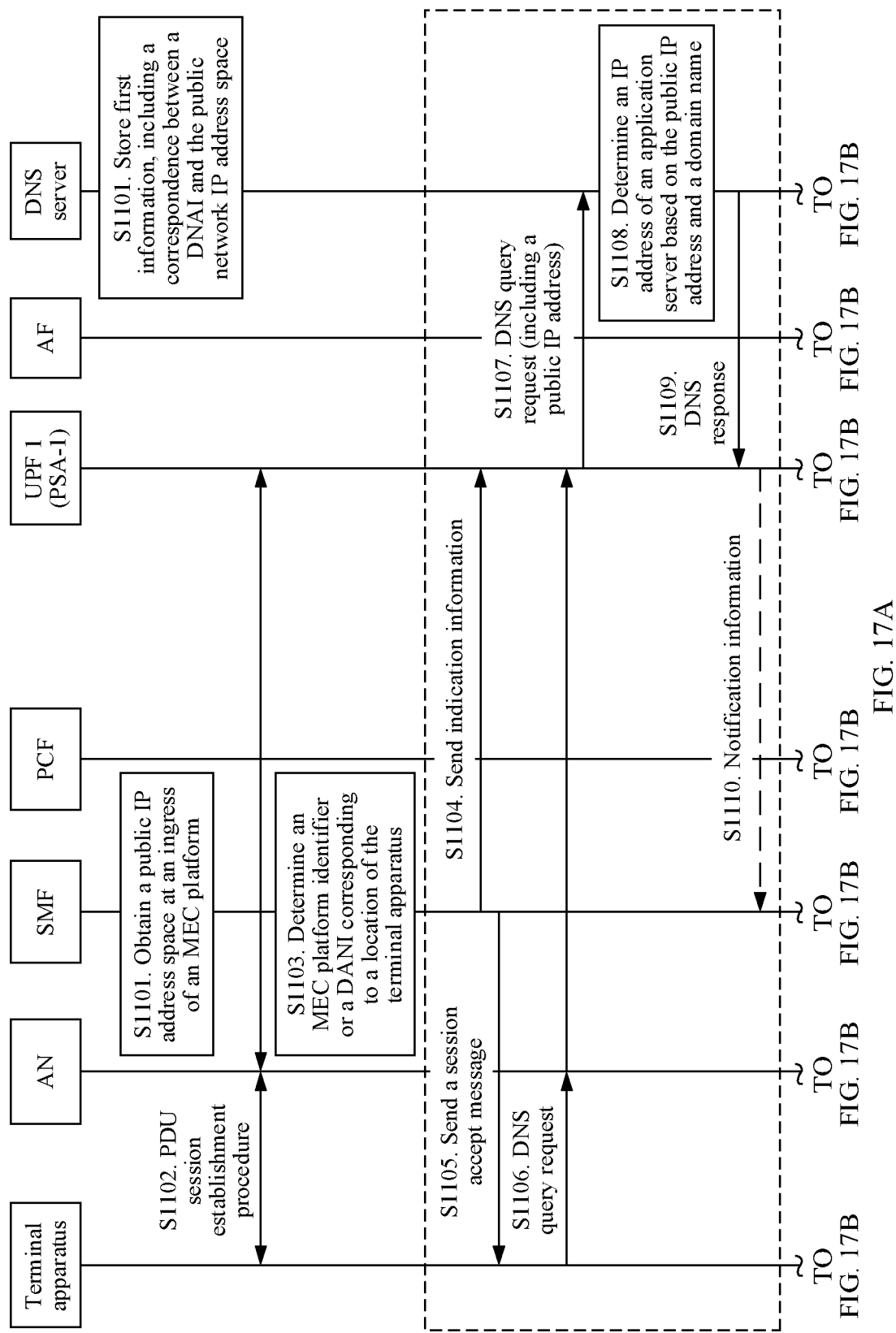
FIG. 17A and FIG. 17B are a schematic interaction diagram of still another domain name system query method according to an embodiment of this application.
Figure 17B:
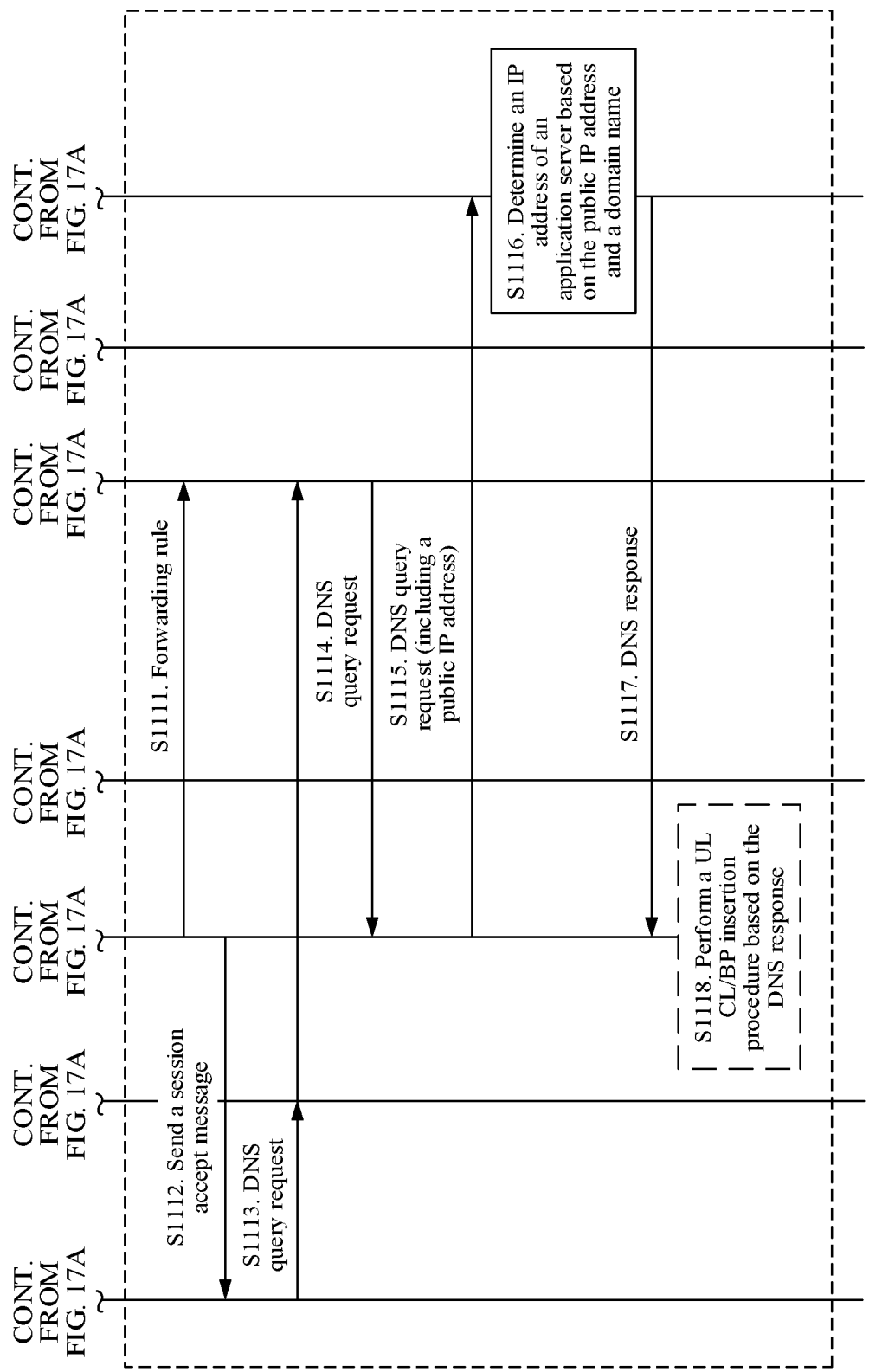

FIG. 17A and FIG. 17B are a schematic flowchart of a domain name system query method 1100 according to an embodiment of this application. The method 1100 may be applied to the architecture shown in FIG. 1. FIG. 17A and FIG. 17B mainly describe a case in which in a scenario in which NAT translation is used on an N6 interface connected to the MEC platform, a DNS server is enhanced such that the DNS server stores information about the foregoing correspondence between the deployment location of the application server, the domain name, and the IP address of the application server. The DNS server also stores a correspondence between a public IP address space (public IP address range) at an ingress of the MEC platform and the deployment location (denoted by a DNAI) of the application server. The public IP address space contains a plurality of public IP addresses. In a session establishment process, the SMF determines, based on current TAI information of a terminal apparatus, an MEC platform (represented by a DNAI) on which an application server corresponding to a domain name requested by the terminal apparatus is located, and then determines, based on the DNAI, a corresponding public IP address space. The public IP address space includes at least one IP address, and any public IP address included in the public IP address space may point to the MEC platform. After parsing a DNS packet (a DNS query request), an SMF/UPF actively adds, into the DNS query request, any public IP address included in the public IP address space pointing to the management platform, and sends the DNS query request including the domain name queried by the terminal apparatus and the public IP address to the DNS server. The management platform is a management platform on which the application server corresponding to the domain name queried by the terminal apparatus is located. The DNS server determines a location of the MEC platform based on the public IP address included in the DNS query request, and further determines, on the MEC platform, an IP address of the application server corresponding to the domain name queried by the terminal apparatus. The DNS server returns the IP address of the application server corresponding to the location of the terminal apparatus indicated by the domain name and the public IP address. Further, the SMF may further insert a UL CL/BP for the terminal apparatus based on an IP address in a DNS response message to optimize a local service access path. Descriptions are provided using an example in which a session management network element is an SMF, a policy control function network element is a PCF, a user plane function network element is a UPF, and an application function network element is an AF.

As shown in FIG. 17A and FIG. 17B, the method 1100 includes the following steps.

S1101. An SMF obtains a public IP address space at an ingress of an MEC platform. The public IP address space includes at least one IP address, and any public IP address included in the public IP address space may be connected to the MEC platform. A DNS server stores a correspondence between a deployment location (which, for example, may be represented by an MEC platform identifier or a DNAI), a domain name, and an IP address. The DNS server also stores a correspondence between the public IP address at the ingress of the MEC platform and the deployment location (denoted by the DNAI) of the application server.

Optionally, there are two methods used by the SMF to obtain the public IP address space at the ingress of the MEC platform:

Method 1: The SMF configures a public IP address space for connecting to an ingress of each MEC platform. A location of the MEC platform can be identified by a DNAI. That is, the SMF stores the correspondence between the DNAI and the public IP address space. For example, the public IP address space can be represented by 128.128. 0.0 to 128.128. 255.255.

Method 2: An AF sends the deployment location corresponding to the application (where the deployment location corresponding to the application is represented by a DNAI) and the public IP address space (public IP address range) at the ingress of the MEC platform corresponding to the DNAI to a UDR network element via an NEF. That is, the UDR stores the correspondence between the DNAI and the public IP address space. For example, the public IP address space can be represented by 128.128. 0.0 to 128.128. 255.255. The SMF may obtain the public IP address space at the ingress of the MEC platform from the UDR via a PCF in a session establishment process.

S1102. A terminal apparatus initiates a PDU session establishment procedure. For example, the terminal apparatus sends parameters such as an identifier of a PDU session, S-NSSAI, and a DNN to an AMF. The AMF selects an SMF based on the S-NSSAI and the DNN, and sends parameters such as an identifier of the SMF network element, a permanent identifier of the terminal apparatus, location information of the terminal apparatus, the identifier of the PDU session, the 5-NSSAI, and the DNN to the SMF network element. The location information of the terminal apparatus includes a TAI of the terminal apparatus.

S1103. The SMF determines, based on the location information (the TAI) of the terminal apparatus that is obtained in step S1102, an MEC platform identifier that can be currently accessed by the terminal apparatus or a DNAI that can be currently accessed by the terminal apparatus. In addition, the SMF determines a location (the DNAI) of the MEC platform based on the current location of the terminal apparatus, and further determines a public IP address space that is at the ingress of the MEC platform and that corresponds to the DNAI.

If the UPF actively adds the public IP address, a procedure subsequent to S1103 is as follows:

S1104. The SMF selects a UPF 1 for the PDU session, and sends indication information and a public network IP address to the UPF 1, where the indication information is used to indicate the UPF 1 to add, after receiving a DNS query request of the terminal apparatus, the public IP address into the DNS query request, where the public IP address points to any public IP address in the public IP address space at the ingress of the MEC platform corresponding to the current location of the terminal apparatus.

For example, if the public IP address space is 128.128.0.0 to 128.128.255.255, the SMF may use 128.128.1.1 belonging to the public IP address space as the public IP address of the MEC platform entrance. The UPF 1 is a UPF connected to the DNS server, that is, the UPF 1 may access the DNS server.

S1105. The SMF sends a session accept message to the terminal apparatus, where the session accept message carries address information of the DNS server.

S1106. The terminal apparatus sends the DNS query request to the UPF 1 of a core network based on a service requirement of the terminal apparatus via an access network device, to initiate DNS query for an application, where the DNS query request carries a domain name corresponding to the application. Optionally, the DNS query request includes a destination address, and the destination address is an address of the DNS server. The domain name corresponding to the application carried in the DNS query request may be FQDN or a domain name in another form. This is not limited in this application.

S1107. After receiving the DNS query request, the UPF 1 adds, into the DNS query request, the public IP address received from the SMF in S1104, and sends the DNS query request to the DNS server.

Optionally, the UPF 1 may further determine, based on the domain name or the destination address in the DNS query request, whether to send notification information to the SMF, where the notification information is used by the SMF to select a traffic steering node (for example, a UL CL/BP) and an anchor UPF 2 for the terminal apparatus. For example, a method for determining, by the UPF 1, to send the notification information to the SMF may be as follows: The UPF 1 may preconfigure a first rule, or the UPF 1 receives a first rule from the SMF in step S8041. When the domain name or the destination address meets the first rule, the UPF 1 sends the notification information to the SMF. Correspondingly, the UPF 1 receives identification information of the traffic steering node and the anchor UPF 2 from the SMF.

For example, the first rule includes a destination address list, and the destination address list includes one or more destination addresses. As long as the destination address included in the DNS query request received by the UPF 1 belongs to the destination address list, the UPF 1 determines to send the notification information to the SMF. In other words, if the UPF 1 determines that the destination address included in the DNS query request meets a condition for sending first notification information to the SMF, the UPF 1 sends the notification information to the SMF. The condition may be that the destination address included in the DNS query request is any destination address included in the first rule.

For another example, the first rule includes a domain name list, and the domain name list includes one or more domain names. As long as the domain name included in the DNS query request received by the UPF 1 belongs to the domain name list, the UPF 1 determines to send the notification information to the SMF. In other words, if the UPF 1 determines that the domain name included in the DNS query request meets a condition for sending the notification information to the SMF, the UPF 1 sends the notification information to the SMF. The condition may be that the domain name included in the DNS query request is any domain name included in the first rule.

If the UPF 1 does not receive the IP address from the SMF in S1104, after the UPF 1 receives the DNS query request, the UPF 1 may send the DNS query request to the DNS server in the following manner:

For example, the manner may be as follows: The UPF 1 may send a notification message to the SMF network element, where the notification message includes the domain name requested by the terminal apparatus. The SMF determines, based on the correspondence between the deployment location of the application server, the domain name, and the IP address of the application server that is obtained in step S1101, the domain name requested by the terminal apparatus, and the TAI of the terminal apparatus, a location of a management platform on which an application server corresponding to the domain name requested by the terminal apparatus is located. The application server may serve the domain name requested by the terminal apparatus, and a deployment location (a location of the management platform) of the application server may be identified by a DNAI. Because the location of the management platform is determined based on the TAI of the terminal apparatus and the domain name requested by the terminal apparatus, the location of the management platform corresponds to the location of the terminal apparatus. Further, the SMF sends the IP address pointing to the management platform to the UPF 1, such that the UPF 1 inserts the IP address into the DNS query and sends the DNS query to the DNS server. The IP address points to the MEC platform on which the application server corresponding to the domain name requested by the terminal apparatus is located. For example, the IP address may be a public IP address, and the public IP address is any public IP address in the public IP address space at the ingress of the MEC platform on which the application server corresponding to the domain name requested by the terminal apparatus is located.

Optionally, after the SMF determines, based on the correspondence between the deployment location of the application server, the domain name, and the IP address of the application server that is obtained in step S802, the domain name requested by the terminal apparatus, and the TAI of the terminal apparatus, the location of the management platform on which the application server corresponding to the domain name requested by the terminal apparatus is located, the SMF may further select a UL CL/BP based on the deployment location (identified by the DNAI) of the application server, to implement local service flow steering of the application, and reduce a delay.

S1108. The DNS server determines a corresponding IP address based on the public IP address and the domain name that are included in the DNS query request. For example, the DNS query request includes the public network IP address, and the DNS server determines, based on the stored correspondence between the MEC platform identifier or the DNAI and the public network IP address in S1101, the MEC platform identifier that can be currently accessed by the terminal apparatus or the DNAI that can be currently accessed by the terminal apparatus. Further, the DNS server determines, based on the stored first information and the MEC platform identifier or the DNAI, the IP address corresponding to the domain name.

S1109. The DNS server returns the IP address to the UPF 1 via a DNS response.

S1110. Optionally, the UPF 1 determines, based on the IP address in the DNS response message, whether to send notification information to the SMF, where the notification information is used to indicate the SMF to insert a UL CL/BP for the terminal apparatus, to optimize a service access path. For example, a method for determining, by the UPF 1, to send the notification information to the SMF may be as follows: The UPF 1 may preconfigure a first rule, or the UPF 1 receives a first rule from the SMF. When the IP address meets the first rule, the UPF 1 sends the first notification information to the session management network element. For example, the first rule includes an IP address list, and the IP address list includes one or more IP addresses. As long as the IP address of the application server in the DNS response belongs to the IP address list, the UPF 1 sends the notification information to the SMF based on the IP address. In other words, if the UPF 1 determines that the IP address in the DNS response message meets a condition for sending the notification information to the SMF, the UPF 1 sends the notification information to the SMF. The condition may be that the IP address of the application server in the DNS response is any IP address included in the first rule.

If the SMF actively adds the public IP address, a procedure subsequent to S1103 is as follows.

S1111. The SMF selects the UPF 1 for the PDU session, and sends a DNS query message forwarding rule to the UPF 1, to indicate the UPF to forward, after receiving a DNS query message of the terminal apparatus, the DNS query message to the SMF.

S1112. The SMF sends a session accept message to the terminal apparatus, where the session accept message carries address information of the DNS server.

S1113. The terminal apparatus sends the DNS query request to a core network based on a service requirement of the terminal apparatus via an access network device, to initiate DNS query for an application, where the DNS query request carries a domain name corresponding to the application. Optionally, the DNS query request may further include a destination address, and the destination address is an address of a DNS server.

S1114. After receiving the DNS query request, the UPF 1 forwards the DNS query request to the SMF. S1115. After receiving the DNS query request, the SMF determines, based on the correspondence between the deployment location of the application server, the domain name, and the IP address of the application server, the domain name requested by the terminal apparatus, and the TAI of the terminal apparatus, a location of a management platform on which an application server corresponding to the domain name requested by the terminal apparatus is located. The application server may serve the domain name requested by the terminal apparatus, and a deployment location (a location of the management platform) of the application server may be identified by a DNAI. Because a location of the management platform is determined based on the TAI of the terminal apparatus and the domain name requested by the terminal apparatus, the location of the management platform corresponds to a location of the terminal apparatus, and the application server corresponding to the domain name requested by the terminal apparatus is deployed on the management platform.

Further, the SMF adds the public IP address pointing to the management platform into the DNS query request, and sends the DNS query request to the DNS server. The public IP address is any public IP address in the public IP address space at the ingress of the MEC platform on which the application server corresponding to the domain name requested by the terminal apparatus is located. For example, if the public IP address space is 128.128.0.0 to 128.128.255.255, the SMF may use 128.128.1.1 belonging to the public IP address space as the public IP address of the MEC platform entrance.

Optionally, the SMF may alternatively determine, based on the domain name included in the DNS query request, whether to perform a UL CL/BP insertion procedure. For example, the SMF network element may preconfigure a domain name list, or the SMF network element may receive the PCC rule from the PCF network element, where the PCC rule includes a domain name list, and wherein the domain name list includes one or more domain names. As long as the domain name included in the DNS query request received by the SMF network element belongs to the domain name list, the SMF network element selects a UPF 2 (PSA-2) and a UL CL/BP, and performs the UL CL/BP insertion procedure.

Optionally, the SMF may further determine, based on the destination address included in the DNS query request, whether to select the first traffic steering node and the first PSA for the terminal apparatus, where the destination address may be understood as the address of the DNS server. When the SMF determines that the address of the DNS server points to a third party (for example, Tencent or Alibaba), and an application server of the third party is deployed in a current location, the SMF determines to select the first traffic steering node and the first PSA for the terminal apparatus. In the foregoing method, if the SMF selects to insert a BP, the SMF further needs to assign a new IPv6 prefix to the terminal apparatus, and send the new IPv6 prefix to the terminal apparatus via PSA-1. Subsequently, the terminal apparatus may access the application server via PSA-2.

S1116. The DNS server determines a corresponding IP address based on the public IP address and the domain name that are included in the DNS query request. For this step, refer to the descriptions in S1108. For brevity, details are not described herein again.

S1117. The DNS server returns the IP address to the SMF via a DNS response message.

S1118. Optionally, the SMF may perform the UL CL/BP insertion procedure based on the DNS query response. For example, the SMF network element may preconfigure an IP address list, or the SMF network element may receive the PCC rule from the PCF network element, where the PCC rule includes an IP address list, and where the IP address list includes one or more IP addresses. As long as the IP address included in the DNS query response received by the SMF network element belongs to the IP address list, the SMF network element selects the UPF 2 (PSA-2) and a UL CL/BP, and performs the UL CL/BP insertion procedure. Alternatively, when the SMF network element determines that UL CL/BP insertion is allowed in the deployment location (for example, the MEC platform 2 in Table 1) of the application server corresponding to the IP address (for example, IP-1 in Table 1), the SMF selects a UPF 2 (PSA-2) and a UL CL/BP, and performs the UL CL/BP insertion procedure. The SMF inserts the UL CL/BP for the terminal apparatus, to optimize a service access path.

Because the terminal apparatus has mobility, if the terminal apparatus moves, after parsing the DNS query request, the SMF/UPF needs to add, based on a latest location of the terminal apparatus, the public network IP address of the MEC platform connected to the current location of the terminal apparatus into the DNS query request. The DNS server determines, based on the public IP address included in the DNS query request, the MEC platform corresponding to the current location of the terminal apparatus, and determines, based on the domain name requested by the terminal apparatus, the IP address corresponding to the application server on the MEC platform. A DNS query procedure in a scenario in which the terminal apparatus moves is similar to that in FIG. 17A and FIG. 17B. A difference lies in that, if the UPF actively adds the location information of the terminal apparatus, once the SMF detects that movement of the terminal apparatus causes a change (for example, a change of the corresponding MEC platform identifier or the corresponding DNAI) of the location of the terminal apparatus, the SMF needs to send a public network IP address connecting to the MEC platform (for example, a new MEC platform identifier or a new DNAI) corresponding to the new location of the terminal apparatus to the UPF. This can ensure that the UPF adds the public IP address corresponding to the latest location of the terminal apparatus after receiving the DNS query request of the terminal apparatus. If the SMF actively adds the location of the terminal apparatus, once the SMF detects the change of the MEC platform identifier or the DNAI caused by the movement of the terminal apparatus, which further causes a change of the public IP address, the SMF needs to add the new public IP address into the DNS query request and send the DNS query request to the DNS server.

According to the domain name query method provided in this embodiment of this application, if NAT translation is used on the N6 interface connected to the MEC platform, the DNS server is enhanced, such that the DNS server stores the correspondence between the deployment location of the application server (for example, the MEC platform identifier or the DNAI), the domain name, and the IP address of the application server, and stores the correspondence between the public IP address at the ingress of the MEC platform of the terminal apparatus and the deployment location of the application server. After parsing the DNS query request, the SMF/UPF actively adds the public IP address pointing to the management platform into the DNS query request, and sends the DNS query request to the DNS server, where the management platform is a management platform on which the application server corresponding to the domain name requested by the terminal apparatus is located. The DNS server returns the IP address of the corresponding application server based on the public IP address and the domain name included in the DNS query request. Further, the SMF/UPF may further trigger, based on the DNS response message, the SMF to insert the UL CL/BP to optimize a local service access path. This can ensure that the terminal apparatus obtains an IP address of an application nearby in a new location, and that the UL CL/BP may be dynamically inserted depending on service access, to implement local traffic steering, optimize a service access path, and improve communication efficiency.

Figure 18A:
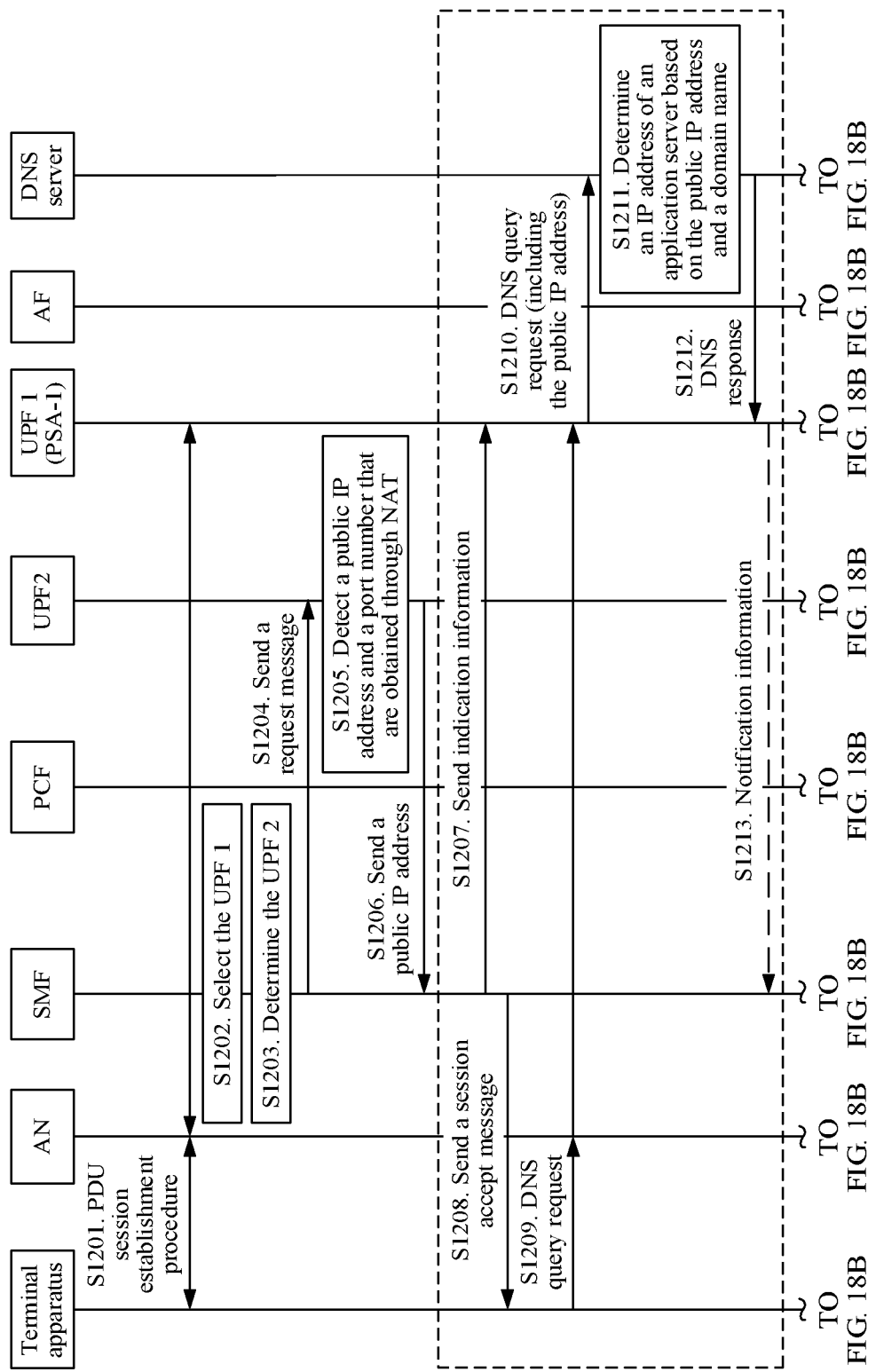
FIG. 18A and FIG. 18B are a schematic interaction diagram of still another domain name system query method according to an embodiment of this application.
Figure 18B:
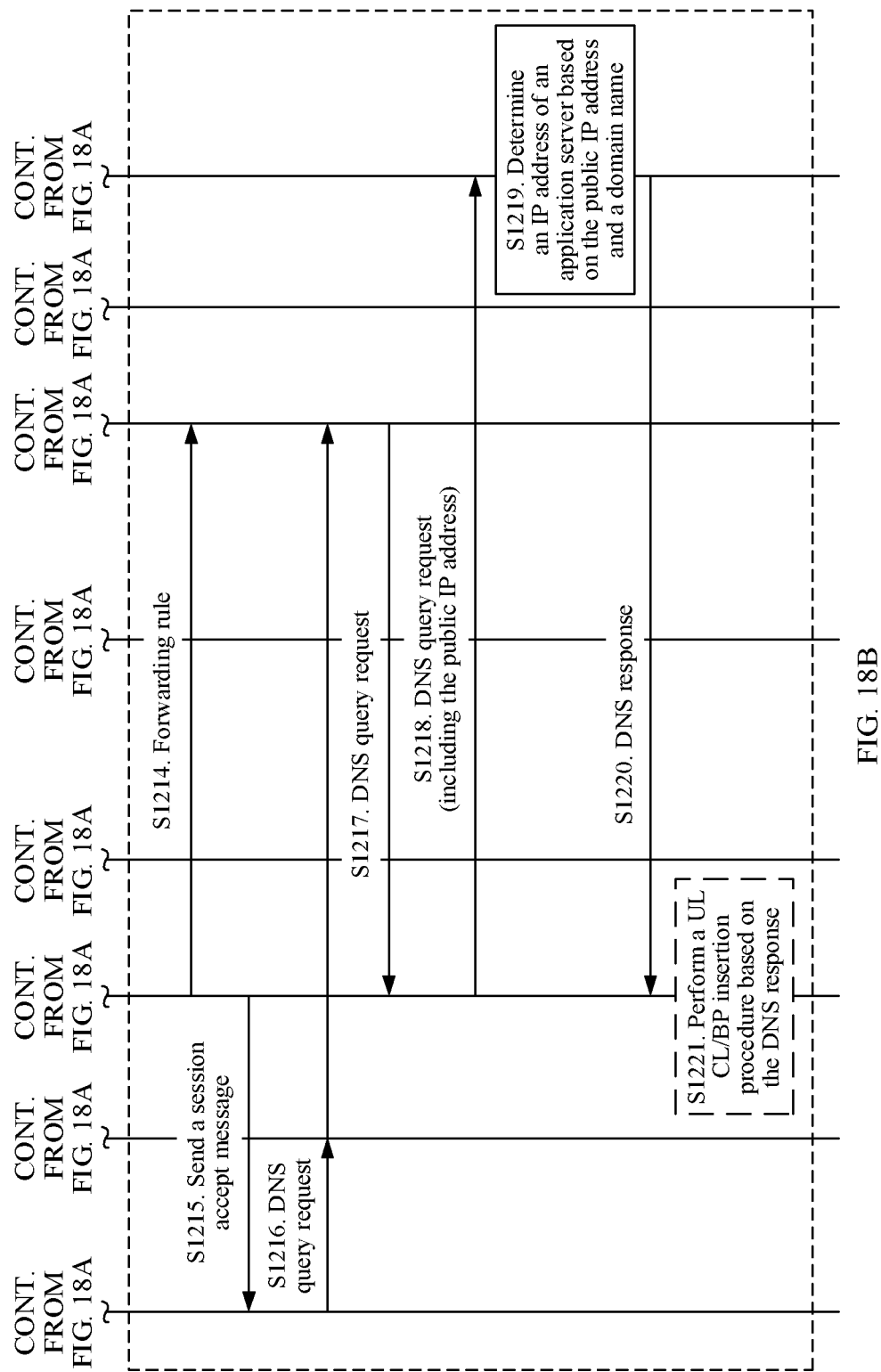

FIG. 18A and FIG. 18B are a schematic flowchart of a domain name system query method 1200 according to an embodiment of this application. The method 1200 may be applied to the architecture shown in FIG. 1. The simple traversal utilities for NAT (STUN) protocol allows a client on the intranet to discover an address translator on the network, to find an external IP address and a port that are configured through NAT. Therefore, an SMF may send a request message to a UPF connected to an MEC platform, to request the UPF to obtain, using the STUN protocol, a public IP address and a port number that are obtained through NAT. The procedure shown in FIG. 18A and FIG. 18B is a procedure in which the UPF obtains, using the STUN protocol, the public IP address obtained through NAT and the port number corresponding to the public IP address, and sends the public IP address or the public IP address and the port number to the SMF. In addition, a DNS server also stores a correspondence between a public IP address at an ingress of the MEC platform and a deployment location (denoted by a DNAI) of an application server. After parsing a DNS packet (a DNS query request), the SMF/UPF actively adds a public IP address pointing to a management platform into the DNS query request, where the management platform is a management platform on which an application server corresponding to a domain name requested by a terminal apparatus is located. The SMF/UPF sends, to a DNS server, the DNS query request including the domain name queried by the terminal apparatus and the public IP address. The DNS server returns an IP address of an application server corresponding to both the domain name and the public IP address based on the DNS query request.

As shown in FIG. 18A and FIG. 18B, the method 1200 includes the following steps.

S1201. An AF stores a deployment location (which, for example, may be represented by an MEC platform identifier or a DNAI) of an application server and a domain name supported by the application server in a UDR via an NEF network element.

A terminal apparatus initiates a PDU session establishment procedure. For example, the terminal apparatus sends parameters such as an identifier of a PDU session, S-NSSAI, and a DNN to an AMF. The AMF selects an SMF based on the S-NSSAI and the DNN, and sends parameters such as an identifier of the SMF network element, a permanent identifier of the terminal apparatus, location information of the terminal apparatus, the identifier of the PDU session, the S-NSSAI, and the DNN to the SMF network element. The location information of the terminal apparatus includes a TAI of the terminal apparatus.

S1202. The SMF selects a UPF 1 for the PDU session, where the UPF 1 may be connected to a DNS server, that is, the UPF 1 may access the DNS server.

S1203. The SMF determines, based on a current location of the terminal apparatus, that the current location corresponds to an MEC platform, and further determines a UPF 2 connected to the MEC platform. Optionally, if there are a plurality of UPFs connected to the MEC platform, herein, the SMF may select any one of the plurality of UPFs as the UPF 2.

S1204. The SMF sends a request message to the UPF 2 connected to the MEC platform, where the request message includes indication information, and the indication information is used to request the UPF 2 to obtain a public IP address and a port number that are obtained through NAT.

S1205. After receiving the indication information, the UPF 2 detects, using the STUN protocol, the public IP address and the port number that are obtained through NAT.

S1206. The UPF 2 sends the public IP address to the SMF network element. The public IP address may also be referred to as a public IP address at an ingress of the MEC platform. Optionally, the UPF 2 further sends the port number corresponding to the public IP address to the SMF If the UPF actively adds the public IP address, a procedure subsequent to S1206 is as follows.

S1207. The SMF sends indication information to the UPF 1, where the indication information includes the public IP address, and where the indication information is used to indicate the UPF 1 to add, after receiving a DNS query request of the terminal apparatus, the public IP address into the DNS query request, where the public IP address is the public IP address at the ingress of the MEC platform that is obtained by the SMF in S1206. Optionally, if the SMF receives the port number corresponding to the public IP address in S1206, the SMF may further send the port number corresponding to the public IP address to the UPF 1, such that the UPF 1 also adds the port number corresponding to the public IP address into the DNS query request.

S1208. The SMF sends a session accept message to the terminal apparatus, where the session accept message carries address information of the DNS server.

S1209. The terminal apparatus sends the DNS query request to the UPF 1 of a core network based on a service requirement of the terminal apparatus via an access network device, to initiate DNS query for an application, where the DNS query request carries a domain name corresponding to the application. Optionally, the DNS query request includes a destination address, and the destination address is an address of the DNS server. The domain name corresponding to the application carried in the DNS query request may be FQDN or a domain name in another form. This is not limited in this application.

S1210. After receiving the DNS query request, the UPF 1 adds, into the DNS query request, the public IP address received from the SMF in S1207, and sends the DNS query request to the DNS server. Optionally, if the UPF 1 receives the port number corresponding to the public IP address in S1207, the UPF 1 may further add the port number into the DNS query request.

Optionally, the UPF 1 may further determine, based on the domain name or the destination address in the DNS query request, whether to send notification information to the SMF, where the notification information is used by the SMF to select a traffic steering node (for example, a UL CL/BP) and an anchor UPF for the terminal apparatus. For example, a method for determining, by the UPF 1, to send the notification information to the SMF may be as follows: The UPF 1 may preconfigure a first rule, or the UPF 1 receives a first rule from the SMF. When the domain name or the destination address meets the first rule, the UPF 1 sends the notification information to the SMF.

For example, the first rule includes a destination address list, and the destination address list includes one or more destination addresses. As long as the destination address included in the DNS query request received by the UPF 1 belongs to the destination address list, the UPF 1 determines to send the notification information to the SMF. In other words, if the UPF 1 determines that the destination address included in the DNS query request meets a condition for sending first notification information to the SMF, the UPF 1 sends the notification information to the SMF. The condition may be that the destination address included in the DNS query request is any destination address included in the first rule.

For another example, the first rule includes a domain name list, and the domain name list includes one or more domain names. As long as the domain name included in the DNS query request received by the UPF 1 belongs to the domain name list, the UPF 1 determines to send the notification information to the SMF. In other words, if the UPF 1 determines that the domain name included in the DNS query request meets a condition for sending the notification information to the SMF, the UPF 1 sends the notification information to the SMF. The condition may be that the domain name included in the DNS query request is any domain name included in the first rule.

If the UPF 1 does not receive the IP address from the SMF in S1207, after the UPF 1 receives the DNS query request, the UPF 1 may send the DNS query request to the DNS server in the following manner.

For example, the manner may be as follows: The UPF 1 may send a notification message to the SMF network element, where the notification message includes the domain name requested by the terminal apparatus. The SMF determines, based on the correspondence between the deployment location of the application server, the domain name, and the IP address of the application server that is obtained in step S1204, the domain name requested by the terminal apparatus, and the TAI of the terminal apparatus, a location of a management platform on which an application server corresponding to the domain name requested by the terminal apparatus is located. The application server may serve the domain name requested by the terminal apparatus, and a deployment location (a location of the management platform) of the application server may be identified by a DNAI. Because the location of the management platform is determined based on the TAI of the terminal apparatus and the domain name requested by the terminal apparatus, the location of the management platform corresponds to the location of the terminal apparatus. Further, the SMF sends the IP address pointing to the management platform to the UPF 1, such that the UPF 1 inserts the IP address into the DNS query and sends the DNS query to the DNS server. The IP address points to the MEC platform on which the application server corresponding to the domain name requested by the terminal apparatus is located. For example, the IP address may be a public IP address, and the public IP address is any public IP address in the public IP address space at the ingress of the MEC platform on which the application server corresponding to the domain name requested by the terminal apparatus is located.

Optionally, after the SMF determines, based on the correspondence between the deployment location of the application server, the domain name, and the IP address of the application server that is obtained in step S802, the domain name requested by the terminal apparatus, and the TAI of the terminal apparatus, the location of the management platform on which the application server corresponding to the domain name requested by the terminal apparatus is located, the SMF may further select a UL CL/BP based on the deployment location (identified by the DNAI) of the application server, to implement local service flow steering of the application, and reduce a delay.

S1211. The DNS server determines a corresponding IP address based on the public IP address and the domain name that are included in the DNS query request. For example, the DNS query request includes the public network IP address, and the DNS server determines, based on the stored correspondence between the MEC platform identifier or the DNAI and the public network IP address, the MEC platform identifier that can be currently accessed by the terminal apparatus or the DNAI that can be currently accessed by the terminal apparatus. Further, the DNS server determines, based on the stored first information and the MEC platform identifier or the DNAI, the IP address corresponding to the domain name.

S1212. The DNS server returns the IP address to the UPF 1 via a DNS response.

S1213. The UPF 1 determines, based on the IP address in the DNS response message, whether to send notification information to the SMF, where the notification information is used to indicate the SMF to insert a UL CL/BP for the terminal apparatus, to optimize a service access path. For example, a method for determining, by the UPF 1, to send the notification information to the SMF may be as follows: The UPF 1 may preconfigure a first rule, or the UPF 1 receives a first rule from the SMF. When the IP address meets the first rule, the UPF 1 sends the first notification information to the session management network element. For example, the first rule includes an IP address list, and the IP address list includes one or more IP addresses. As long as the IP address of the application server in the DNS response belongs to the IP address list, the UPF 1 sends the notification information to the SMF based on the IP address. In other words, if the UPF 1 determines that the IP address in the DNS response message meets a condition for sending the notification information to the SMF, the UPF 1 sends the notification information to the SMF. The condition may be that the IP address of the application server in the DNS response is any IP address included in the first rule.

If the SMF actively adds the public IP address, a procedure subsequent to S1206 is as follows.

S1214. The SMF selects the UPF 1 for the PDU session, and sends a DNS query message forwarding rule to the UPF 1, to indicate the UPF to forward, after receiving a DNS query message of the terminal apparatus, the DNS query message to the SMF.

S1215. The SMF sends a session accept message to the terminal apparatus, where the session accept message carries address information of the DNS server.

S1216. The terminal apparatus sends the DNS query request to a core network based on a service requirement of the terminal apparatus via an access network device, to initiate DNS query for an application, where the DNS query request carries a domain name corresponding to the application. Optionally, the DNS query request may further include a destination address, and the destination address is an address of a DNS server.

S1217. After receiving the DNS query request, the UPF 1 forwards the DNS query request to the SMF.

S1218. After receiving the DNS query request, the SMF determines, based on the correspondence between the deployment location of the application server, the domain name, and the IP address of the application server, the domain name requested by the terminal apparatus, and the TAI of the terminal apparatus, a location of a management platform on which an application server corresponding to the domain name requested by the terminal apparatus is located. The application server may serve the domain name requested by the terminal apparatus, and a deployment location (a location of the management platform) of the application server may be identified by a DNAI. Because a location of the management platform is determined based on the TAI of the terminal apparatus and the domain name requested by the terminal apparatus, the location of the management platform corresponds to a location of the terminal apparatus, and the application server corresponding to the domain name requested by the terminal apparatus is deployed on the management platform.

Further, the SMF adds the public IP address pointing to the management platform into the DNS query request, and sends the DNS query request to the DNS server. The public IP address is obtained in S1206, and the public IP address is any public IP address in the public IP address space at the ingress of the MEC platform corresponding to the current location of the terminal apparatus. Optionally, the SMF may further add the port number corresponding to the public IP address into the DNS query request.

Optionally, the SMF may alternatively determine, based on the domain name included in the DNS query request, whether to perform a UL CL/BP insertion procedure. For example, the SMF network element may preconfigure a domain name list, or the SMF network element may receive the PCC rule from the PCF network element, where the PCC rule includes a domain name list, and where the domain name list includes one or more domain names. As long as the domain name included in the DNS query request received by the SMF network element belongs to the domain name list, the SMF network element selects a UPF 2 (PSA-2) and a UL CL/BP, and performs the UL CL/BP insertion procedure.

Optionally, the SMF may further determine, based on the destination address included in the DNS query request, whether to select the first traffic steering node and the first PSA for the terminal apparatus, where the destination address may be understood as the address of the DNS server. When the SMF determines that the address of the DNS server points to a third party (for example, Tencent or Alibaba), and an application server of the third party is deployed in a current location, the SMF determines to select the first traffic steering node and the first PSA for the terminal apparatus. In the foregoing method, if the SMF selects to insert a BP, the SMF further needs to assign a new IPv6 prefix to the terminal apparatus, and send the new IPv6 prefix to the terminal apparatus via PSA-1. Subsequently, the terminal apparatus may access the application server via PSA-2.

S1219. The DNS server determines a corresponding IP address based on the public IP address and the domain name that are included in the DNS query request. For this step, refer to the descriptions in S1108. For brevity, details are not described herein again.

S1220. The DNS server returns the IP address to the SMF via a DNS response message.

S1221. Optionally, the SMF may perform the UL CL/BP insertion procedure based on the DNS query response. For example, the SMF network element may preconfigure an IP address list, or the SMF network element may receive the PCC rule from the PCF network element, where the PCC rule includes an IP address list, and where the IP address list includes one or more IP addresses. As long as the IP address included in the DNS query response received by the SMF network element belongs to the IP address list, the SMF network element selects the UPF (a PSA) and a UL CL/BP, and performs the UL CL/BP insertion procedure. Alternatively, when the SMF network element determines that UL CL/BP insertion is allowed in the deployment location (for example, the MEC platform 2 in Table 1) of the application server corresponding to the IP address (for example, IP-1 in Table 1), the SMF selects the UPF and the UL CL/BP, and performs the UL CL/BP insertion procedure. The SMF inserts the UL CL/BP for the terminal apparatus, to optimize a service access path.

According to the domain name query method provided in this embodiment of this application, in a scenario in which NAT translation is used on the N6 interface connected to the MEC platform, the DNS server is enhanced, such that the DNS server stores the correspondence between the deployment location of the application server (for example, the MEC platform identifier or the DNAI), the domain name, and the IP address of the application server, and stores the correspondence between the public IP address at the ingress of the MEC platform of the terminal apparatus and the deployment location of the application server. After parsing the DNS query request, the SMF/UPF obtains the public IP address pointing to the management platform, where the management platform is the management platform on which the application server corresponding to the domain name requested by the terminal apparatus is located. The SMF/UPF actively adds the public IP address into the DNS query request and sends the DNS query request to the DNS server, and the DNS server returns the IP address of the corresponding application server based on the public IP address and the domain name included in the DNS query request. Further, the SMF/UPF may further trigger, based on the DNS response message, the SMF to insert the UL CL/BP to optimize a local service access path. This can ensure that the terminal apparatus obtains an IP address of an application nearby in a new location, and that the UL CL/BP may be dynamically inserted depending on service access, to implement local traffic steering, optimize a service access path, and improve communication efficiency.

Figure 19A:
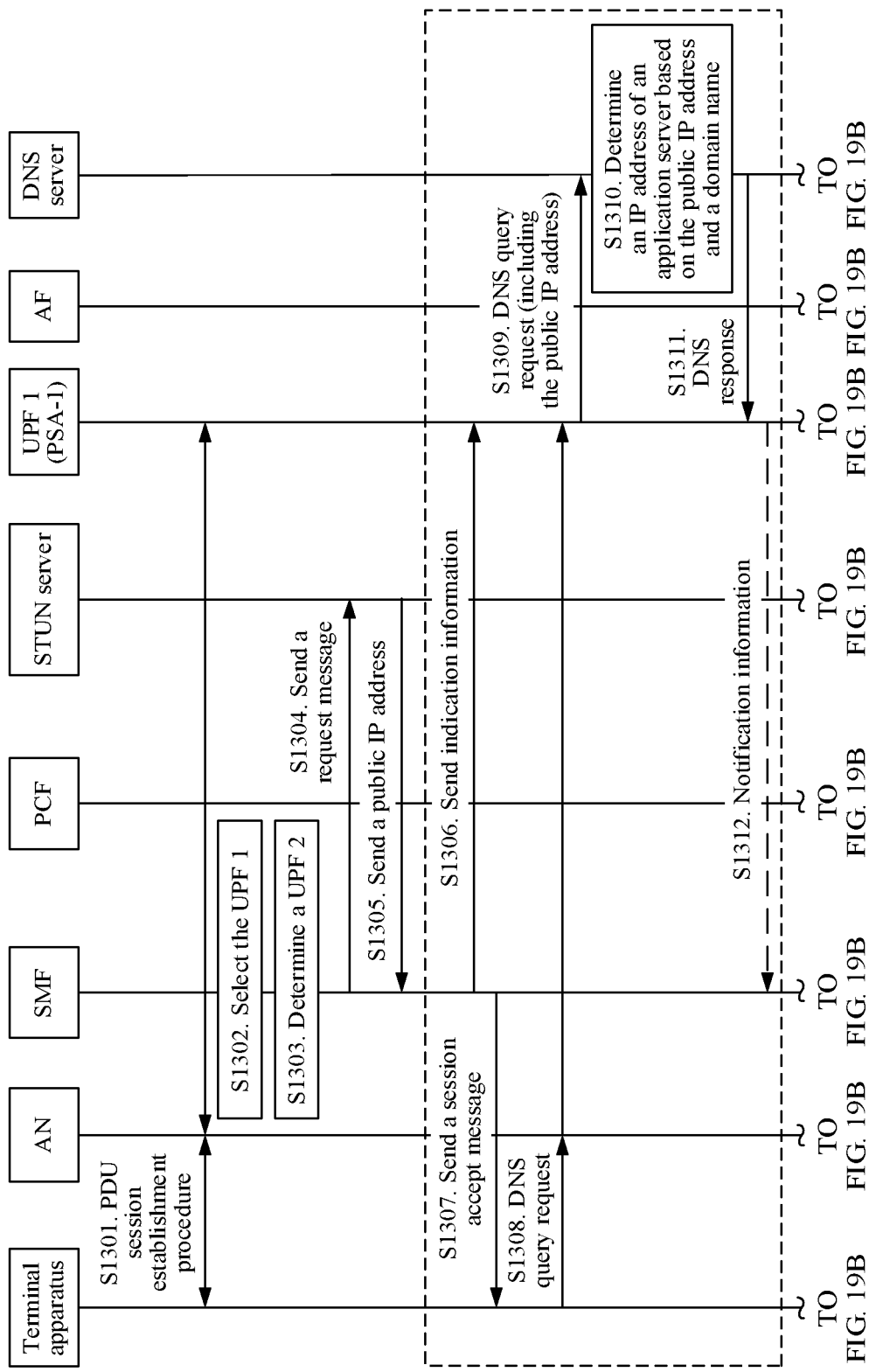
FIG. 19A and FIG. 19B are a schematic interaction diagram of still another domain name system query method according to an embodiment of this application.
Figure 19B:
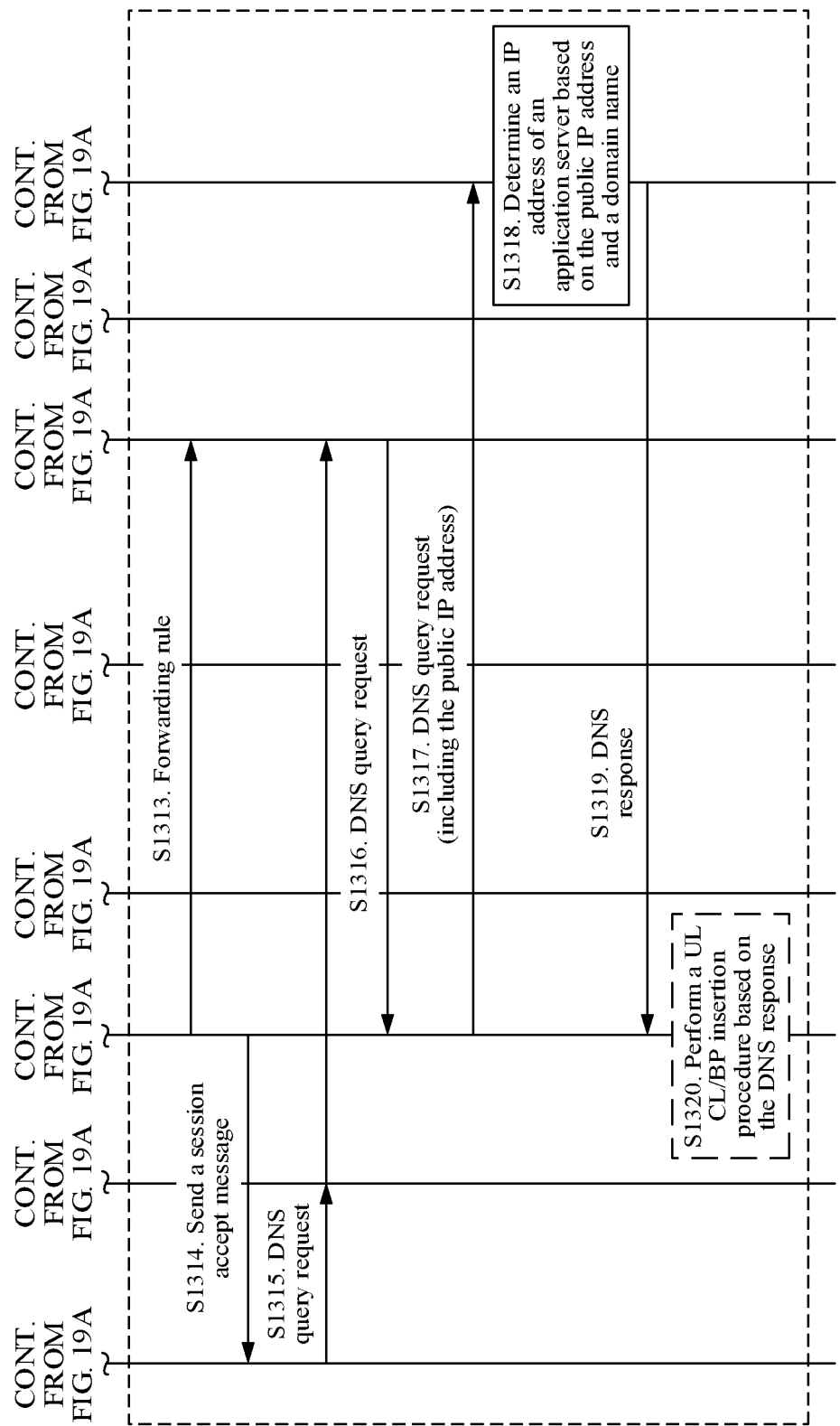

FIG. 19A and FIG. 19B are a schematic flowchart of a domain name system query method 1300 according to an embodiment of this application. The method 1300 may be applied to the architecture shown in FIG. 1. STUN allows a client on the intranet to discover an address translator on the network, to find an external IP address and a port that are configured through NAT. Therefore, the SMF may directly request a STUN server for the public IP address and the port number that are obtained through NAT. In addition, a DNS server also stores a correspondence between a public IP address at an ingress of the MEC platform and a deployment location (denoted by a DNAI) of an application server. After parsing a DNS packet (a DNS query request), the SMF/UPF actively adds a public IP address pointing to a management platform into the DNS query request, where the management platform is a management platform on which an application server corresponding to a domain name requested by a terminal apparatus is located. The SMF/UPF sends, to a DNS server, the DNS query request including the domain name queried by the terminal apparatus and the public IP address. The public IP address may be any public IP address included in the public IP address space at the ingress of the management platform on which the application server corresponding to the domain name requested by the terminal apparatus is located. The DNS server returns an IP address of an application server corresponding to both the domain name and the public IP address based on the DNS query request.

As shown in FIG. 19A and FIG. 19B, the method 1300 includes the following steps.

S1301. A terminal apparatus initiates a PDU session establishment procedure. For example, the terminal apparatus sends parameters such as an identifier of a PDU session, S-NSSAI and a DNN to an AMF. The AMF selects an SMF based on the S-NSSAI and the DNN, and sends parameters such as an identifier of the SMF network element, a permanent identifier of the terminal apparatus, location information of the terminal apparatus, the identifier of the PDU session, the S-NSSAI, and the DNN to the SMF network element. The location information of the terminal apparatus includes a TAI of the terminal apparatus.

S1302. The SMF selects a UPF 1 for the PDU session. The UPF 1 may be connected to a DNS server, that is, the UPF 1 may access the DNS server.

S1303. The SMF determines, based on a current location of the terminal apparatus, that the current location corresponds to an MEC platform, and further determines a UPF 2 connected to the MEC platform. Optionally, if there are a plurality of UPFs connected to the MEC platform, herein, the SMF may select any one of the plurality of UPFs as the UPF 2.

S1304. The SMF sends a request message to an STUN server, where the request message carries an IP address of the UPF 2 connected to the MEC platform, and where the IP address of the UPF 2 is a private IP address in a 3GPP internal network. The STUN server determines, based on the IP address of the UPF 2, a public IP address obtained through NAT. A process may be that the STUN server may configure a one-to-one relationship between the private IP address of the 3GPP internal network and the public IP address. The public IP address may also be referred to as a public IP address at an ingress of the MEC platform. Optionally, the STUN server may further send a port number corresponding to the public IP address to the SMF.

S1305. The STUN server sends the public IP address to the SMF. Optionally, the STUN server may further send the port number corresponding to the public IP address to the SMF.

If the UPF actively adds the public IP address, a procedure subsequent to S1305 is as follows.

S1306. The SMF sends indication information and the public IP address to the UPF 1, where the indication information includes the public IP address, where the indication information is used to indicate the UPF 1 to add, after receiving a DNS query request of the terminal apparatus, the public IP address into the DNS query request, and where the public IP address is the public IP address at the ingress of the MEC platform that is obtained by the SMF in S1305. Optionally, if the SMF receives the port number corresponding to the public IP address in S1206, the SMF may further send the port number corresponding to the public IP address to the UPF 1, such that the UPF 1 also adds the port number corresponding to the public IP address into the DNS query request.

S1307. The SMF sends a session accept message to the terminal apparatus, where the session accept message carries address information of the DNS server.

S1308. The terminal apparatus sends the DNS query request to the UPF 1 of a core network based on a service requirement of the terminal apparatus via an access network device, to initiate DNS query for an application, where the DNS query request carries a domain name corresponding to the application. Optionally, the DNS query request includes a destination address, and the destination address is an address of the DNS server. The domain name corresponding to the application carried in the DNS query request may be FQDN or a domain name in another form. This is not limited in this application.

S1309. After receiving the DNS query request, the UPF 1 adds, into the DNS query request, the public IP address received from the SMF in S1306, and sends the DNS query request to the DNS server. Optionally, if the UPF 1 receives the port number corresponding to the public IP address in S1306, the UPF 1 may further add the port number into the DNS query request.

Optionally, the UPF 1 may further determine, based on the domain name or the destination address in the DNS query request, whether to send notification information to the SMF, where the notification information is used by the SMF to select a traffic steering node (for example, a UL CL/BP) and an anchor UPF for the terminal apparatus. For example, a method for determining, by the UPF 1, to send the notification information to the SMF may be as follows: The UPF 1 may preconfigure a first rule, or the UPF 1 receives a first rule from the SMF. When the domain name or the destination address meets the first rule, the UPF 1 sends the notification information to the SMF.

For example, the first rule includes a destination address list, and the destination address list includes one or more destination addresses. As long as the destination address included in the DNS query request received by the UPF 1 belongs to the destination address list, the UPF 1 determines to send the notification information to the SMF. In other words, if the UPF 1 determines that the destination address included in the DNS query request meets a condition for sending first notification information to the SMF, the UPF 1 sends the notification information to the SMF. The condition may be that the destination address included in the DNS query request is any destination address included in the first rule.

For another example, the first rule includes a domain name list, and the domain name list includes one or more domain names. As long as the domain name included in the DNS query request received by the UPF 1 belongs to the domain name list, the UPF 1 determines to send the notification information to the SMF. In other words, if the UPF 1 determines that the domain name included in the DNS query request meets a condition for sending the notification information to the SMF, the UPF 1 sends the notification information to the SMF. The condition may be that the domain name included in the DNS query request is any domain name included in the first rule.

S1310. The DNS server determines a corresponding IP address based on the public IP address and the domain name that are included in the DNS query request. For example, the DNS query request includes the public network IP address, and the DNS server determines, based on the stored correspondence between the MEC platform identifier or the DNAI and the public network IP address, the MEC platform identifier that can be currently accessed by the terminal apparatus or the DNAI that can be currently accessed by the terminal apparatus. Further, the DNS server determines, based on the stored first information and the MEC platform identifier or the DNAI, the IP address corresponding to the domain name.

S1311. The DNS server returns the IP address to the UPF 1 via a DNS response.

S1312. The UPF 1 determines, based on the IP address in the DNS response message, whether to send notification information to the SMF, where the notification information is used to indicate the SMF to insert a UL CL/BP for the terminal apparatus, to optimize a service access path. For example, a method for determining, by the UPF 1, to send the notification information to the SMF may be as follows: The UPF 1 may preconfigure a first rule, or the UPF 1 receives a first rule from the SMF. When the IP address meets the first rule, the UPF 1 sends the first notification information to the session management network element. For example, the first rule includes an IP address list, and the IP address list includes one or more IP addresses. As long as the IP address of the application server in the DNS response belongs to the IP address list, the UPF 1 sends the notification information to the SMF based on the IP address. In other words, if the UPF 1 determines that the IP address in the DNS response message meets a condition for sending the notification information to the SMF, the UPF 1 sends the notification information to the SMF. The condition may be that the IP address of the application server in the DNS response is any IP address included in the first rule.

If the SMF actively adds the public IP address, a procedure subsequent to S1305 is as follows.

S1313. After selecting a UPF 1, the SMF sends a DNS query message forwarding rule to the UPF 1, to indicate the UPF to forward, after receiving a DNS query message of the terminal apparatus, the DNS query message to the SMF.

S1314. The SMF sends a session accept message to the terminal apparatus, where the session accept message carries address information of the DNS server.

S1315. The terminal apparatus sends the DNS query request to a core network based on a service requirement of the terminal apparatus via an access network device, to initiate DNS query for an application, where the DNS query request carries a domain name corresponding to the application. Optionally, the DNS query request may further include a destination address, and the destination address is an address of a DNS server.

S1316. After receiving the DNS query request, the UPF 1 forwards the DNS query request to the SMF.

S1317. After receiving the DNS query request, the SMF adds the public IP address into the DNS query request, and sends the DNS query request to the DNS server. The public IP address is obtained in S1305, and the public IP address is any public IP address in the public IP address space at the ingress of the MEC platform corresponding to the current location of the terminal apparatus. Optionally, the SMF may further add the port number corresponding to the public IP address into the DNS query request.

Optionally, the SMF may alternatively determine, based on the domain name included in the DNS query request, whether to perform a UL CL/BP insertion procedure. For example, the SMF network element may preconfigure a domain name list, or the SMF network element may receive the PCC rule from the PCF network element, where the PCC rule includes a domain name list, and where the domain name list includes one or more domain names. As long as the domain name included in the DNS query request received by the SMF network element belongs to the domain name list, the SMF network element selects a UPF 2 (PSA-2) and a UL CL/BP, and performs the UL CL/BP insertion procedure.

Optionally, the SMF may further determine, based on the destination address included in the DNS query request, whether to select the first traffic steering node and the first PSA for the terminal apparatus, where the destination address may be understood as the address of the DNS server. When the SMF determines that the address of the DNS server points to a third party (for example, Tencent or Alibaba), and an application server of the third party is deployed in a current location, the SMF determines to select the first traffic steering node and the first PSA for the terminal apparatus. In the foregoing method, if the SMF selects to insert a BP, the SMF further needs to assign a new IPv6 prefix to the terminal apparatus, and send the new IPv6 prefix to the terminal apparatus via PSA-1. Subsequently, the terminal apparatus may access the application server via PSA-2.

S1318. The DNS server determines a corresponding IP address based on the public IP address and the domain name that are included in the DNS query request. For this step, refer to the descriptions in S1108. For brevity, details are not described herein again.

S1319. The DNS server returns the IP address to the SMF via a DNS response message.

S1320. Optionally, the SMF may perform the UL CL/BP insertion procedure based on the DNS query response. For example, the SMF network element may preconfigure an IP address list, or the SMF network element may receive the PCC rule from the PCF network element, where the PCC rule includes an IP address list, and where the IP address list includes one or more IP addresses. As long as the IP address included in the DNS query response received by the SMF network element belongs to the IP address list, the SMF network element selects the UPF (a PSA) and a UL CL/BP, and performs the UL CL/BP insertion procedure. Alternatively, when the SMF network element determines that UL CL/BP insertion is allowed in the deployment location (for example, the MEC platform 2 in Table 1) of the application server corresponding to the IP address (for example, IP-1 in Table 1), the SMF selects the UPF and the UL CL/BP, and performs the UL CL/BP insertion procedure. The SMF inserts the UL CL/BP for the terminal apparatus, to optimize a service access path.

According to the domain name query method provided in this embodiment of this application, in a scenario in which NAT translation is used on the N6 interface connected to the MEC platform, the DNS server is enhanced, such that the DNS server stores the correspondence between the deployment location of the application server (for example, the MEC platform identifier or the DNAI), the domain name, and the IP address of the application server, and stores the correspondence between the public IP address at the ingress of the MEC platform of the terminal apparatus and the deployment location of the application server. After parsing the DNS query request, the SMF/UPF obtains the public IP address corresponding to the location of the terminal apparatus, actively adds the public IP address corresponding to the location of the terminal apparatus into the DNS query request, and sends the DNS query request to the DNS server. The DNS server returns the corresponding IP address based on the public IP address and the domain name included in the DNS query request. Further, the SMF/UPF may further trigger, based on the DNS response message, the SMF to insert the UL CL/BP to optimize a local service access path. This can ensure that the terminal apparatus obtains an IP address of an application nearby in a new location, and that the UL CL/BP may be dynamically inserted depending on service access, to implement local traffic steering, optimize a service access path, and improve communication efficiency.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, some steps in the foregoing method 200 to method 1300 may be unnecessary, or some steps may be newly added. Alternatively, any two or more of the foregoing embodiments are combined. A modified, changed, or combined solution also falls within the scope of the embodiments of this application.

It should be understood that, in the embodiments of this application, the "first", the "second", and the like are merely intended to indicate that a plurality of objects are different. For example, the first network element and the second network element are merely intended to indicate different network elements, and should impose no impact on the network elements and the quantities thereof. First, second, and the like described above should not impose any limitation on the embodiments of this application.

It should be further understood that the division of the manners, cases, categories, and embodiments in the embodiments of this application is merely intended for ease of description, and should not constitute a particular limitation. The features in the manners, categories, cases, and embodiments may be combined without contradiction.

It should be further understood that numerals used in the embodiments of this application are differentiated merely for ease of description, but are not used to limit the scope of the embodiments of this application. The sequence numbers of the foregoing processes do not mean execution sequences. The execution sequences of the processes should be determined according to functions and internal logic of the processes, and should not be construed as any limitation on the implementation processes of the embodiments of this application.

It should be further understood that the foregoing descriptions of the embodiments of this application emphasize differences between the embodiments. For same or similar parts that are not mentioned, refer to the embodiments. For brevity, details are not described herein again.

It should be further understood that in the embodiments of this application, "predefinition" may be implemented by pre-storing corresponding code or a corresponding table in a device (for example, including a terminal apparatus and a network device) or in another manner that can be used to indicate related information. An implementation of "predefinition" is not limited in this application.

The foregoing describes in detail the domain name system query methods in the embodiments of this application with reference to FIG. 1 to FIG. 19B. The following describes in detail communication apparatuses in the embodiments of this application with reference to FIG. 20 to FIG. 23.

Figure 20:
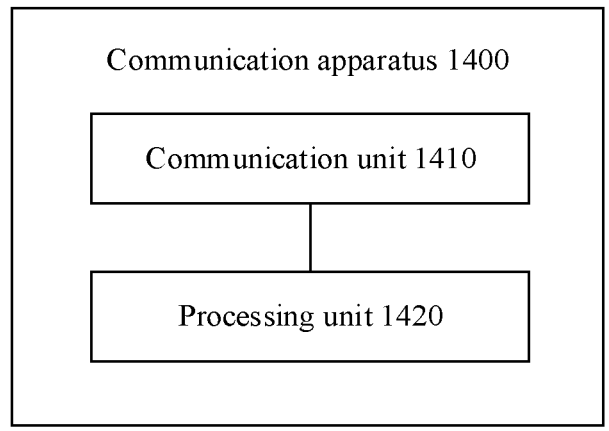
FIG. 20 is a schematic diagram of a communication apparatus according to an embodiment of this application.

FIG. 20 is a schematic block diagram of a communication apparatus 1400 according to an embodiment of this application. The communication apparatus 1400 may correspond to the first network element described in the method 200, or may be a chip or a component used in the first network element. In addition, modules or units in the communication apparatus 1400 are separately configured to perform actions or processing processes performed by the first network element in the method 200. As shown in FIG. 20, the communication apparatus 1400 may include a communication unit 1410 and a processing unit 1420.

The communication unit 1410 is configured to receive a DNS query request from a terminal apparatus, where the DNS query request includes a first domain name, and where the DNS query request is used to request an IP address corresponding to the first domain name.

The processing unit 1420 is configured to generate first request information, where the first request information includes location information of the terminal apparatus and the first domain name.

The communication unit 1410 is further configured to send the first request information to a second network element.

The communication unit 1410 is further configured to receive first response information sent by the second network element in response to the first request information, where the first response information includes the IP address.

The communication unit 1410 is further configured to send the IP address to the terminal apparatus.

The communication apparatus provided in this application adds the location information of the terminal apparatus into the DNS query request and sends the DNS query request to the second network element, such that the second network element determines the IP address of the application server corresponding to both the location of the terminal apparatus and the requested domain name. The communication apparatus feeds back the IP address to the terminal apparatus. In this way, the terminal apparatus accesses a service nearby via the application server. This avoids a problem that a service is limited or some services cannot be accessed when the terminal apparatus accesses services via an application server that is far from the terminal apparatus, improving service access quality of the terminal apparatus. In addition, because the terminal apparatus can access the service nearby, a service access delay of the terminal apparatus is reduced, and communication efficiency is improved.

Optionally, in some embodiments of this application, the DNS query request further includes a destination address, the destination address is an address of a DNS server, and the first request information further includes the destination address.

Optionally, in some embodiments of this application, the communication apparatus is a user plane function network element, the second network element is any one of a policy control function network element, an application function network element, or a DNS server, and the communication unit 1110 is further configured to send first notification information to a session management network element. The first notification information is used by the session management network element to select a first traffic steering point and a first protocol data unit session anchor PSA for the terminal apparatus.

Optionally, in some embodiments of this application, the communication apparatus is a session management network element, the second network element is any one of a policy control function network element, an application function network element, or a DNS server, and the processing unit 1120 is further configured to: select a first traffic steering node and a first protocol data unit session anchor PSA for the terminal apparatus based on any one of the first domain name, the destination address, or the IP address corresponding to the first domain name, where the destination address is the address of the DNS server.

Optionally, in some embodiments of this application, the communication apparatus is the user plane function network element, the second network element is any one of the policy control function network element, the application function network element, or the DNS server, and the communication unit 1410 is further configured to receive the location information of the terminal apparatus sent by the session management network element.

Optionally, in some embodiments of this application, the communication unit 1410 is further configured to receive a first rule sent by the session management network element, where any one of the first domain name, the destination address, or the IP address corresponding to the first domain name meets the first rule, and where the destination address is the address of the DNS server.

Optionally, in some embodiments of this application, the location information of the terminal apparatus includes at least one of a TAI of the terminal apparatus, a DNAI, identification information of a fourth network element, or a first IP address. The fourth network element includes a user plane function network element or a radio access network element. The first IP address points to the management platform on which the application server corresponding to the first domain name is located, and the location of the management platform corresponds to the location of the terminal apparatus.

It should be understood that, for a process in which the units in the communication apparatus 1400 perform the foregoing corresponding steps, refer to the foregoing descriptions related to the first network element with reference to FIG. 4 to FIG. 8 and the related embodiments in the method 200. For brevity, details are not described herein again.

In a possible design, the communication apparatus 1400 may be the user plane function network element (which, for example, may be an anchor user plane function network element, PSA, etc.) or the session management network element (for example, an SMF) in the foregoing method embodiments, or may be a chip configured to implement a function of the session management network element or a function of the user plane function network element in the foregoing method embodiments. For example, the communication apparatus 1100 may correspond to the SMF, the UPF 1, the I-SMF, or the I-UPF in the methods 400, 500, 600, 700, 800, 900, 1000, 1100, 1200, and 1300 according to the embodiments of this application. The communication apparatus 1400 may include units configured to perform the methods performed by the SMF, the UPF 1, the I-SMF, or the I-UPF in the method 400 to the method 1300 in FIG. 10A to FIG. 19B. In addition, the foregoing and other operations and/or functions of the units in the communication apparatus 1400 are separately used to implement corresponding procedures of the method 400 to the method 1300 in FIG. 10A to FIG. 19B. It should be understood that, a process in which each unit performs the foregoing corresponding step has been described in detail in the foregoing method embodiments. For brevity, details are not described herein again.

Optionally, the communication unit 1410 may include a receiving unit (module) and a sending unit (module) configured to perform steps of receiving information and sending information by the first network element in the foregoing method embodiments. Optionally, the communication apparatus 1400 may further include a storage unit configured to store instructions executed by the processing unit 1420 and the communication unit 1410. The processing unit 1420, the communication unit 1410, and the storage unit are in communication connection. The storage unit stores the instructions. The processing unit 1420 is configured to execute the instructions stored in the storage unit. The communication unit 1410 is configured to send or receive a specific signal under driving of the processing unit 1420.

Figure 21:
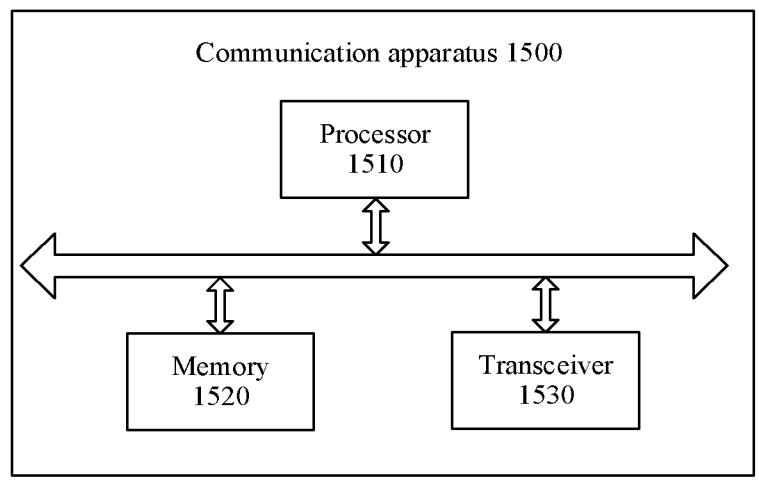
FIG. 21 is a schematic diagram of another communication apparatus according to an embodiment of this application.

It should be understood that the communication unit 1410 may be a transceiver, an input/output interface, an interface circuit, or the like. The storage unit may be a memory. The processing unit 1420 may be implemented by a processor. As shown in FIG. 21, a communication apparatus 1500 may include a processor 1510, a memory 1520, and a transceiver 1530.

The communication apparatus 1400 shown in FIG. 20 or the communication apparatus 1500 shown in FIG. 21 can implement steps performed by the first network element in the embodiments of the foregoing method 200 and related embodiments in FIG. 4 to FIG. 8, or can implement steps performed by the SMF, the UPF 1, the I-SMF, or the I-UPF in the method 400 to the method 1000 in FIG. 10A to FIG. 19B. For similar descriptions, refer to the descriptions in the foregoing corresponding methods. To avoid repetition, details are not described herein again.

Figure 22:
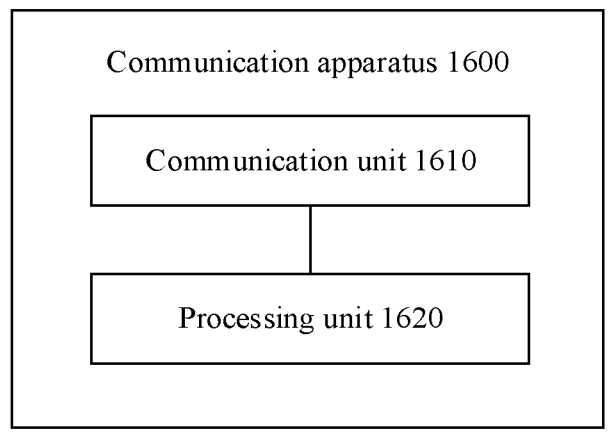
FIG. 22 is a schematic diagram of a communication apparatus according to an embodiment of this application.

FIG. 22 is a schematic block diagram of a communication apparatus 1600 according to an embodiment of this application. The communication apparatus 1600 may correspond to the third network element described in the method 300, or may be a chip or a component used in the third network element. In addition, modules or units in the communication apparatus 1600 are separately configured to perform actions or processing processes performed by the third network element in the method 300. As shown in FIG. 22, the communication apparatus 1600 may include a communication unit 1610 and a processing unit 1620.

The communication unit 1610 is configured to receive a first domain name and location information of a terminal apparatus.

The processing unit 1620 is configured to determine, based on at least the first domain name and the location information of the terminal apparatus, the IP address corresponding to the first domain name, where the IP address corresponds to the location of the terminal apparatus.

The communication unit 1610 is further configured to send the IP address.

The communication apparatus provided in this application determines, based on the location of the terminal apparatus and a requested domain name, an IP address of an application server corresponding to both the location of the terminal apparatus and the requested domain name, and feeds back the IP address to the terminal apparatus. In this way, the terminal apparatus can access a service nearby via the application server. This avoids a problem that a service is limited or some services cannot be accessed when the terminal apparatus accesses services via an application server that is far from the terminal apparatus, improving service access quality of the terminal apparatus. In addition, because the terminal apparatus can access the service nearby, a service access delay of the terminal apparatus is reduced, and communication efficiency is improved.

Optionally, in some embodiments of this application, the processing unit 1620 is further configured to determine, based on the first domain name and the location information of the terminal apparatus, the IP address corresponding to the first domain name. The first information includes at least one domain name, a deployment location of an application corresponding to each domain name in the at least one domain name, and an IP address corresponding to the deployment location of the application, and the at least one domain name includes the first domain name.

Optionally, in some embodiments of this application, the first information may further include a correspondence between a first IP address and a deployment location of an MEC platform or a deployment location of an application server.

Optionally, in some embodiments of this application, the communication apparatus is any one of a session management network element, a policy control function network element, an application function network element, or a DNS server, and the communication apparatus stores the first information.

Optionally, in some embodiments of this application, the communication apparatus is a DNS server, and the communication unit 1310 is further configured to receive the location information of the terminal apparatus sent by a policy control function network element or an application function network element.

Optionally, in some embodiments of this application, the communication apparatus is a DNS server, and the communication unit 1310 is configured to receive second request information sent by a session management network element or a user plane function network element, where the second request information includes the first domain name.

Optionally, in some embodiments of this application, the second request information further includes the location information of the terminal apparatus.

Optionally, in some embodiments of this application, the location information of the terminal apparatus includes at least one of a TAI of the terminal apparatus, a DNAI, identification information of a fourth network element, or a first IP address. The first IP address points to the management platform on which the application server corresponding to the first domain name is located, and the location of the management platform corresponds to the location of the terminal apparatus. The fourth network element includes a user plane function network element or a radio access network element.

It should be understood that, for a process in which the units in the communication apparatus 1600 perform the foregoing corresponding steps, refer to the foregoing descriptions related to the third network element with reference to FIG. 9 and the related embodiments in the method 300. For brevity, details are not described herein again.

In a possible design, the communication apparatus 1600 may be any one of a policy control function network element, an application function network element, a session management network element, or a DNS server in the foregoing method embodiments, or may be a chip configured to implement a function of the policy control function network element, a function of the application function network element, a function of the session management network element, or a function of the DNS server in the foregoing method embodiments. For example, the communication apparatus 1300 may correspond to the SMF, the I-SMF, the PCF, the AF, or the DNS server in the methods 400, 500, 600, 700, 800, 900, 1000, 1100, 1200, and 1300 according to the embodiments of this application. The communication apparatus 1600 may include a unit configured to perform the method performed by the SMF, the I-SMF, the PCF, the AF, or the DNS server in the method 400 to the method 1300 in FIG. 10A to FIG. 19B. In addition, the foregoing and other operations and/or functions of the units in the communication apparatus 1600 are separately used to implement corresponding procedures of the method 400 to the method 1300 in FIG. 10A to FIG. 19B. It should be understood that, a process in which each unit performs the foregoing corresponding step has been described in detail in the foregoing method embodiments. For brevity, details are not described herein again.

Optionally, the communication unit 1610 may include a receiving unit (module) and a sending unit (module) configured to perform steps of receiving information and sending information by the third network element in the foregoing method embodiments. Optionally, the communication apparatus 1600 may further include a storage unit configured to store instructions executed by the processing unit 1620 and the communication unit 1610. The processing unit 1620, the communication unit 1610, and the storage unit are in communication connection. The storage unit stores the instructions. The processing unit 1620 is configured to execute the instructions stored in the storage unit. The communication unit 1610 is configured to send or receive a specific signal under driving of the processing unit 1620.

Figure 23:
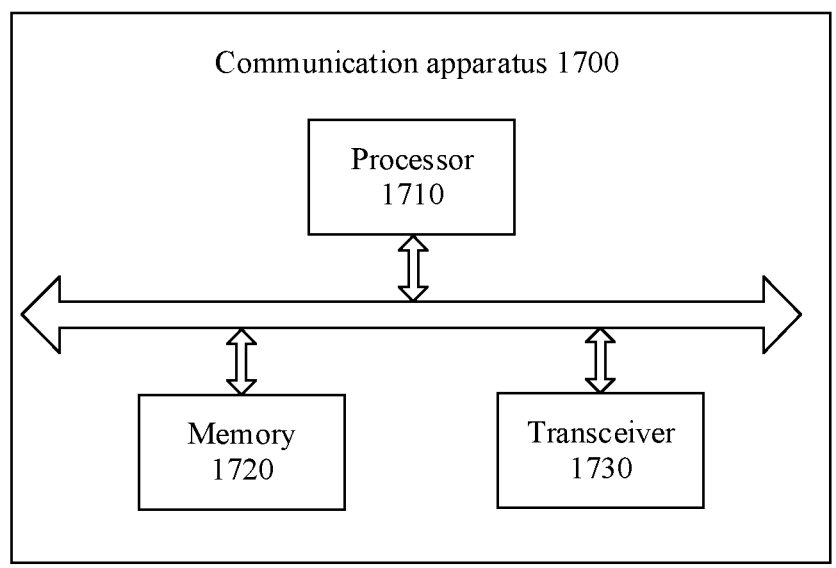
FIG. 23 is a schematic diagram of another communication apparatus according to an embodiment of this application.

It should be understood that the communication unit 1610 may be a transceiver, an input/output interface, an interface circuit, or the like. The storage unit may be a memory. The processing unit 1620 may be implemented by a processor. As shown in FIG. 23, a communication apparatus 1700 may include a processor 1710, a memory 1720, and a transceiver 1730.

The communication apparatus 1600 shown in FIG. 22 or the communication apparatus 1700 shown in FIG. 23 can implement steps performed by the third network element in the embodiments of the foregoing method 300 and related embodiments in FIG. 9, or can implement steps performed by the SMF, the I-SMF, the PCF, the AF, or the DNS server in the method 400 to the method 1300 in FIG. 10A to FIG. 19B. For similar descriptions, refer to the descriptions in the foregoing corresponding methods. To avoid repetition, details are not described herein again.

It should be further understood that division into the units in the apparatus is merely logical function division. During actual implementation, all or some of the units may be integrated into one physical entity, or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the steps in the foregoing method or the foregoing units may be implemented using a hardware integrated logic circuit in the processing element, or may be implemented in a form of software invoked by the processing element.

For example, a unit in any one of the foregoing apparatuses may be one or more integrated circuits configured to implement the foregoing method, for example, one or more application-specific integrated circuits (ASICs), one or more digital signal processors (DSPs), one or more field programmable gate arrays (FPGAs), or a combination of at least two of these types of integrated circuits. For another example, when a unit in the apparatus is implemented by scheduling a program by a processing element, the processing element may be a general-purpose processor, for example, a central processing unit (CPU) or another processor that can invoke the program. For still another example, the units may be integrated and implemented in a form of a system-on-a-chip (SOC).

An embodiment of this application further provides a communication system. The communication system includes: the first network element and the second network element described above. Optionally, the communication system further includes one or more of the terminal apparatus, the third network element, or the access network device described above. Alternatively, the communication system includes the third network element and the first network element described above. Optionally, the communication system further includes one or more of the terminal apparatus, the second network element, or the access network device described above.

An embodiment of this application further provides a computer-readable storage medium configured to store computer program code. The computer program code includes instructions used to perform the domain name system query methods in the embodiments of this application in the method 200 to the method 1300. The readable medium may be a read-only memory (ROM) or a random-access memory (RAM). This is not limited in the embodiments of this application.

This application further provides a computer program product. The computer program product includes instructions. When the instructions are executed, the first network element, the second network element, the third network element, or the session management network element performs an operation performed by the first network element, the second network element, the third network element, or the session management network element corresponding to the foregoing methods.

An embodiment of this application further provides a chip in a communication apparatus. The chip includes a processing unit and a communication unit. The processing unit may be, for example, a processor, and the communication unit may be, for example, an input/output interface, a pin, or a circuit. The processing unit may execute computer instructions, such that the communication apparatus is enabled to perform any domain name system query method provided in the foregoing embodiments of this application.

Optionally, the computer instructions are stored in a storage unit.

Optionally, the storage unit is a storage unit in the chip, for example, a register or a cache; or the storage unit may be a storage unit in the terminal but outside the chip, for example, a read-only memory (ROM), another type of static storage device capable of storing static information and instructions, or a random access memory (RAM). The processor mentioned in any one of the foregoing descriptions may be a CPU, a microprocessor, an ASIC, or one or more integrated circuits used to control program execution of the feedback information transmission method. The processing unit and the storage unit may be decoupled, separately disposed on different physical devices, and connected in a wired or wireless manner to implement functions of the processing unit and the storage unit respectively, to support the system chip in implementing various functions in the foregoing embodiments. Alternatively, the processing unit and the memory may be coupled on one device.

It may be understood that the memory in the embodiments of this application may be a volatile memory or a non-volatile memory, or may include both a volatile memory and a non-volatile memory. The non-volatile memory may be a ROM, a programmable ROM (PROM), an erasable programmable erasable PROM (EPROM), an electrically erasable programmable read-only memory (EEPROM), or a flash memory. The volatile memory may be a RAM and is used as an external cache. There are a plurality of different types of RAMs, such as a static random access memory (SRAM), a dynamic random access memory (DRAM), a synchronous dynamic random access memory (SDRAM), a double data rate (DDR) synchronous dynamic random access memory (SDRAM), an enhanced SDRAM (ES-DRAM), a synchlink DRAM (SLDRAM), and a direct rambus (DR) RAM.

The terms "system" and "network" may be used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

The term "uplink" or "downlink" in this application is used to describe a data/information transmission direction in a specific scenario. For example, an "uplink" direction is usually a direction in which data/information is transmitted from a terminal to a network side, or a direction in which data/information is transmitted from a distributed unit to a centralized unit; and a "downlink" direction is usually a direction in which data/information is transmitted from a network side to a terminal, or a direction in which data/information is transmitted from a centralized unit to a distributed unit. It can be understood that "uplink" or "downlink" is merely used to describe a data/information transmission direction, without limiting a specific starting or ending device of data/information transmission.

In this application, names may be assigned to various objects such as messages, information, devices, network elements, systems, apparatuses, actions, operations, procedures, and concepts. It can be understood that the specific names do not constitute a limitation on the related objects. The assigned names may vary with factors such as scenarios, contexts, or usage habits. Understanding of technical meanings of technical terms in this application should be determined mainly based on functions and technical effects embodied or performed by the technical terms in the technical solutions.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

All or some of the methods in the embodiments of this application may be implemented by software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on the computer, the procedures or functions according to the embodiments of this application are completely or partially generated. The computer may be a general-purpose computer, a dedicated computer, a computer network, or another programmable apparatus. The computer programs or instructions may be stored in a computer-readable storage medium, or may be transmitted using the computer-readable storage medium. The computer-readable storage medium may be any usable medium accessible by a computer, or a data storage device, such as a server, integrating one or more usable media.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a readable storage medium, and includes several instructions for instructing a computer device (which may be a personal computer, a server, or a network device) to perform all or some of the steps of the methods described in the embodiments of this application. The foregoing readable storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A domain name system query method, comprising:
    receiving, by a first network element, a domain name system query request from a terminal apparatus, wherein the domain name system query request comprises a first domain name, and wherein the domain name system query request requests an Internet Protocol (IP) address corresponding to the first domain name;
    sending, by the first network element, first request information to a second network element, wherein the first request information comprises location information of the terminal apparatus and the first domain name;
    receiving, by the first network element, first response information from the second network element, wherein the first response information comprises the IP address;
    sending, by the first network element, first notification information to a session management network element, wherein the first notification information comprises at least one of the IP address or the first domain name, and wherein the first notification information is for selection of a first traffic steering node and a first protocol data unit session anchor for the terminal apparatus; and
    sending, by the first network element, the IP address to the terminal apparatus.

2. The domain name system query method of claim 1, wherein the second network element is a domain name system server.

3. The domain name system query method of claim 1, wherein the first network element is a user plane function network element.

4. The domain name system query of claim 1, further comprising: receiving, by the first network element, the location information of the terminal apparatus from the session management network element.

5. The domain name system query method of claim 1, wherein sending the first notification information comprises sending, by the first network element, the first notification information to the session management network element when determining that the first domain name or the IP address meets a first rule.

6. The domain name system query method of claim 5, further comprising receiving, by the first network element, the first rule from the session management network element.

7. The domain name system query method of claim 5, wherein the first rule comprises a domain name list or an IP address list, and wherein determining that the first domain name or the address meets the first rule comprises:
    determining that the first domain name is in the domain name list; or
    determining that the IP address is in the IP address list.

8. The domain name system query method of claim 1, wherein the location information of the terminal apparatus comprises a first IP address, wherein the first IP address corresponds to a data network access identifier representing a deployment location of an application server corresponding to the first domain name, and wherein the deployment location of the application server corresponds to a location of the terminal apparatus.

9. The domain name system query method of claim 1, wherein the IP address is based on the location information of the terminal apparatus and the first domain name.

10. A method, comprising:
    receiving, by a session management network element, first notification information from a first network element, wherein the first notification information comprises at least one of a first domain name or an Internet Protocol (IP) address corresponding to the first domain name; and
    selecting, by the session management network element based on the first notification information, a first traffic steering node and a first protocol data unit session anchor.

11. The method of claim 10, further comprising sending, by the session management network element, a first rule to the first network element, wherein the first domain name or the IP address meets the first rule.

12. The method of claim 11, wherein the first rule comprises a domain name list or an IP address list, and wherein the first domain name or the IP address meets when: the first domain name is in the domain name list; or the IP address is in the IP address list.

13. The method of claim 10, wherein selecting the first traffic steering node and the first protocol data unit session anchor based on the first notification information comprises selecting, by the session management network, the first traffic steering node and the first protocol data unit session anchor in response to determining that an insertion of the first traffic steering node is allowed for a data network access identifier corresponding to the IP address, and wherein the method further comprises inserting, by the session management network element, the first traffic steering node and the first protocol data unit session anchor in a data path of a protocol data unit session.

14. A communication apparatus, comprising
    a memory configured to store instructions; and
    at least one processor coupled to the memory and configured to execute the instructions to:
        receive a domain name system query request from a terminal apparatus, wherein the domain name system query request comprises a first domain name, and wherein the domain name system query request requests an Internet Protocol (IP) address corresponding to the first domain name;

send first request information to a domain name system server, wherein the first request information comprises location information of the terminal apparatus and the first domain name;

receive first response information from the domain name system server, wherein the first response information comprises the IP address;

send first notification information to a session management network element, wherein the first notification information comprises at least one of the IP address or the first domain name, and wherein the first notification information is for selection of a first traffic steering node and a first protocol data unit session anchor for the terminal apparatus; and send the IP address to the terminal apparatus.

15. The communication apparatus of claim 14, wherein the communication apparatus is a user plane function network element.

16. The communication apparatus of claim 14, wherein the at least one processor is further configured to execute the instructions to receive the location information of the terminal apparatus from the session management network element.

17. The communication apparatus of claim 14, wherein the at least one processor is configured to execute the instructions to send the first notification information to the session management network element in response to determining that the first domain name or the IP address meets a first rule.

18. The communication apparatus of claim 17, wherein the at least one processor is further configured to execute the instructions to receive the first rule from the session management network element.

19. The communication apparatus of claim 17, wherein the first rule comprises a domain name list or an IP address list, and wherein the first domain name or the IP address meets the first rule when: the first domain name is in the domain name list; or the IP address is in the IP address list.

20. The communication apparatus of claim 14, wherein the location information of the terminal apparatus comprises a first IP address, wherein the first IP address corresponds to a data network access identifier representing a deployment location of an application server corresponding to the first domain name, and wherein the deployment location of the application server corresponds to a location of the terminal apparatus.

21. The communication apparatus of claim 14, wherein the first traffic steering node is an uplink classifier or a branching point.

22. A communication apparatus, comprising:
a memory configured to store instructions; and
at least one processor coupled to the memory and configured to execute the instructions to
receive first notification information from a first network element, wherein the first notification information comprises at least one of a first domain name or an Internet Protocol (IP) address corresponding to the first domain name; and
select, based on the first notification information, a first traffic steering node and a first protocol data unit session anchor.

23. The communication apparatus of claim 22, wherein the at least one processor is further configured to execute the instructions to send a first rule to the first network element, and wherein the first domain name or the IP address meets the first rule.

24. The communication apparatus of claim 23, wherein the first rule comprises a domain name list or an IP address list, and wherein the first domain name or the IP address meets the first rule when the first domain name is in the domain name list; or the IP address is in the IP address list.

25. The communication apparatus of claim 22, wherein selecting, based on the first notification information, the first traffic steering node and the first protocol data unit session anchor comprises: selecting the first traffic steering node and the first protocol data unit session anchor in response to determining that an insertion of the first traffic steering node is allowed for a data network access identifier corresponding to the IP address, and wherein the at least one processor is further configured to execute the instructions to insert the first traffic steering node and the first protocol data unit session anchor in a data path of a protocol data unit session.

26. The communication apparatus of claim 22, wherein the first traffic steering node is an uplink classifier or a branching point.

27. The communication apparatus of claim 22, wherein the communication apparatus is a session management network element.

* * * * *

UNITED STATES PATENT AND TRADEMARK OFFICE
CERTIFICATE OF CORRECTION

PATENT NO. : 11,689,496 B2
APPLICATION NO. : 17/675301
DATED : June 27, 2023
INVENTOR(S) : Fangyuan Zhu, Yan Li and Hui Ni It is certified that error appears in the above-identified patent and that said Letters Patent is hereby corrected as shown below:

In the Claims

Claim 22, Column 90, Line 10: "instructions to" should read "instructions to:"

Claim 24, Column 90, Line 26: "when the" should read "when: the"

Claim 25, Column 90, Line 31: "comprises: selecting" should read "comprises selecting"

Signed and Sealed this
Eighth Day of August, 2023

Katherine Kelly Vidal
*Director of the United States Patent and Trademark Office*